United States Patent
Rustomji et al.

(10) Patent No.: US 12,315,886 B2
(45) Date of Patent: *May 27, 2025

(54) ELECTROCHEMICAL DEVICES COMPRISING COMPRESSED GAS SOLVENT ELECTROLYTES

(71) Applicant: THE REGENTS OF THE UNIVERSITY OF CALIFORNIA, Oakland, CA (US)

(72) Inventors: Cyrus Rustomji, San Diego, CA (US); Sungho Jin, San Diego, CA (US); Taekyoung Kim, La Jolla, CA (US); Jungmin You, San Diego, CA (US); Joseph Wang, San Diego, CA (US); Duyoung Choi, La Jolla, CA (US)

(73) Assignee: South 8 Technologies, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/900,338

(22) Filed: Sep. 27, 2024

(65) Prior Publication Data
US 2025/0023107 A1   Jan. 16, 2025

Related U.S. Application Data

(63) Continuation of application No. 18/594,433, filed on Mar. 4, 2024, now abandoned, which is a
(Continued)

(51) Int. Cl.
*H01M 10/0569* (2010.01)
*C25D 3/42* (2006.01)
(Continued)

(52) U.S. Cl.
CPC .......... *H01M 10/0569* (2013.01); *C25D 3/42* (2013.01); *C25D 3/44* (2013.01); *C25D 3/50* (2013.01);
(Continued)

(58) Field of Classification Search
CPC .......... H01M 10/0569; H01M 10/052; H01M 10/0525; H01M 10/0564; C25D 3/42;
(Continued)

(56) References Cited

U.S. PATENT DOCUMENTS

| | | | |
|---|---|---|---|
| 2012/0107650 A1* | 5/2012 | Kritzer | H01G 11/78 137/527 |
| 2015/0072248 A1* | 3/2015 | Watanabe | H01M 4/38 429/188 |

* cited by examiner

Primary Examiner — James Lee
(74) Attorney, Agent, or Firm — Manuel de la Cerra

(57) ABSTRACT

Disclosed are novel electrolytes, and techniques for making and devices using such electrolytes, which are based on compressed-gas solvents. Unlike conventional electrolytes, the disclosed electrolytes are based on "compressed-gas solvents" mixed with various salts, referred to as "compressed gas electrolytes." Various embodiments of a compressed-gas solvent includes a material that is in a gas phase and has a vapor pressure above atmospheric pressure at a room temperature. The disclosed compressed-gas electrolytes can have wide electrochemical potential windows, high conductivity, low temperature capability and/or high-pressure solvent properties. Examples of a class of compressed gases that can be used as solvent for electrolytes include hydrofluorocarbons, in particular fluoromethane, difluoromethane, tetrafluoroethane, and pentafluoroethane. Also disclosed are battery structures and supercapacitor structures that use compressed gas solvent-based electrolytes, and techniques for constructing such energy storage devices. Techniques for electroplating difficult-to-deposit materials using compressed-gas electrolytes as an electroplating bath are also disclosed.

14 Claims, 50 Drawing Sheets

Related U.S. Application Data continuation of application No. 16/793,190, filed on Feb. 18, 2020, which is a continuation of application No. 15/036,763, filed as application No. PCT/US2014/066015 on Nov. 17, 2014, now Pat. No. 10,608,284.

(60) Provisional application No. 61/972,101, filed on Mar. 28, 2014, provisional application No. 61/905,057, filed on Nov. 15, 2013.

(51) Int. Cl.
| | | |
|---|---|---|
| *C25D 3/44* | (2006.01) | |
| *C25D 3/50* | (2006.01) | |
| *C25D 3/54* | (2006.01) | |
| *C25D 5/00* | (2006.01) | |
| *C25D 9/08* | (2006.01) | |
| *C25D 17/02* | (2006.01) | |
| *H01G 11/22* | (2013.01) | |
| *H01G 11/46* | (2013.01) | |
| *H01G 11/60* | (2013.01) | |
| *H01G 11/78* | (2013.01) | |
| *H01G 11/86* | (2013.01) | |
| *H01M 10/052* | (2010.01) | |
| *H01M 10/0525* | (2010.01) | |
| *H01M 10/0564* | (2010.01) | |
| *C25D 21/00* | (2006.01) | |
| *H01G 11/62* | (2013.01) | |
| *H01M 4/38* | (2006.01) | |

(52) U.S. Cl.
CPC .............. *C25D 3/54* (2013.01); *C25D 5/003* (2013.01); *C25D 9/08* (2013.01); *C25D 17/02* (2013.01); *H01G 11/22* (2013.01); *H01G 11/46* (2013.01); *H01G 11/60* (2013.01); *H01G 11/78* (2013.01); *H01G 11/86* (2013.01); *H01M 10/052* (2013.01); *H01M 10/0525* (2013.01); *H01M 10/0564* (2013.01); *C25D 21/00* (2013.01); *H01G 11/62* (2013.01); *H01M 4/382* (2013.01); *H01M 2300/0028* (2013.01); *H01M 2300/0031* (2013.01); *H01M 2300/0034* (2013.01); *Y02E 60/13* (2013.01)

(58) Field of Classification Search
CPC ... C25D 3/44; C25D 3/50; C25D 3/54; C25D 5/003; C25D 9/08; C25D 17/02; H01G 11/22; H01G 11/46; H01G 11/60; H01G 11/78; H01G 11/86
See application file for complete search history.

COMPARATIVE PROPERTIES OF SOLVENTS

| | Melting pt (°C) | Boiling pt (°C) | Viscosity at 25 °C (cP) | Dielectric at 25 °C | Dipole Moment (D) | Density (g/cc) | Molecular Weight (g/mol) |
|---|---|---|---|---|---|---|---|
| Ethylene Carbonate (EC) | 36 | 248 | 1.90 (40 °C) | 90 | 4.61 | 1.31 | 88 |
| Propylene Carbonate (PC) | -49 | 242 | 2.53 | 65 | 4.81 | 1.20 | 102 |
| Dimethylcarbonate (DMC) | 5 | 91 | 0.59 (20 °C) | 3.1 | 0.76 | 1.06 | 90 |
| Diethylcarbonate (DEC) | -74 | 126 | 0.75 | 2.8 | 0.96 | 0.97 | 118 |
| Ethylmethylcarbonate (EMC) | -53 | 110 | 0.65 | 2.9 | 0.89 | 1.01 | 104 |
| Acetonitrile (ACN) | -45 | 82 | 0.34 | 37 | 3.92 | 0.79 | 41 |
| Difluoromethane (DFM) | -136 | -52 | 0.11 | 15 | 1.97 | 0.96 | 52 |

FIG. 3

COMPARATIVE PROPERTIES OF COMPRESSED GAS SOLVENTS

| | Melting Pt (°C) | Boiling Pt (°C) | Tc (°C) | Pc (psi) | Vapor pressure (psi) | Global Warming potential |
|---|---|---|---|---|---|---|
| Fluoromethane | -138 | -78 | 45 | 910 | 478 | 92 |
| Difluoromethane | -136 | -52 | 78 | 780 | 220 | 675 |
| Fluoroethane | -143 | -37 | 102 | 730 | 110 | 12 |
| Difluoroethane | -117 | -25 | 114 | 652 | 74 | 124 |
| Tetrafluoroethane | -103 | -26 | 101 | 589 | 83 | 1430 |

FIG. 4

Stability, Dipole Moment and Global Warming Potential of Compressed Gas Solvents including Fluorine-Containing Solvents Low GWP solvents of interest

| HYDROCARBON BASE | CHEMICAL FORMULA | CHEMICAL NAME | STABILITY | DIPOLE MOMENT | GWP |
|---|---|---|---|---|---|
| METHANE | CH4 | METHANE | GOOD | 0 | 25 |
| | CH3F | FLUOROMETHANE | GOOD | 1.85 | 92 |
| | CH2F2 | DIFLUOROMETHANE | GOOD | 1.97 | 675 |
| | CHF3 | TRIFLUOROMETHANE | GOOD | 1.65 | 14800 |
| | CF4 | PERFLUOROMETHANE | GOOD | 0 | 7390 |
| ETHANE | C2H6 | ETHANE | GOOD | 0 | 5.5 |
| | C2H5F | FLUOROETHANE | GOOD | 1.94 | 12 |
| | C2H4F2 | DIFLUOROETHANE | GOOD | 2.27 | 124 |
| | C2H3F3 | TRIFLUOROETHANE | GOOD | 2.32 | 1430 |
| | C2H2F4 | TETRAFLUOROETHANE | GOOD | N/A, MODERATE? | 1430 |
| | C2HF5 | PENTAFLUOROETHANE | GOOD | 1.54 | 3500 |
| | C2F6 | PERFLUOROETHANE | GOOD | 0 | 12200 |
| PROPANE | C3H8 | PROPANE | GOOD | 0 | 3.3 |
| | C3H7F | FLUOROPROPANE | GOOD | 2.05 | N/A, MODERATE? |
| | C3H6F2 | DIFLUOROPROPANE | GOOD | N/A, MODERATE? | N/A, MODERATE? |
| | C3H5F3 | TRIFLUOROPROPANE | GOOD | N/A, MODERATE? | PROBABLY HIGH |
| | C3H4F4 | TETRAFLUOROPROPANE | GOOD | N/A, HIGH? | LIKELY HIGH |
| | C3H3F5 | PENTAFLUOROPROPANE | GOOD | N/A, MODERATE? | 1030 |
| | C3H2F6 | HEXAFLUOROPROPANE | GOOD | N/A, MODERATE? | 3220 |
| | C3HF7 | HEPTAFLUOROPROPANE | GOOD | 1.62 | 3350 |
| | C3F8 | PERFLUOROPROPANE | GOOD | 0 | 8830 |
| ETHYLENE | C2H4 | ETHYLENE | MODERATE | 0 | 3.7 |
| | C2H3F | FLUOROETHYLENE | MODERATE | 1.43 | N/A, LOW? |
| | C2H2F2 | TRANS-1,2-DIFLUOROETHYLENE | MODERATE | 0 | N/A, LOW? |
| | C2H2F2 | CIS-1,2-DIFLUOROETHYLENE | MODERATE | N/A, MODERATE? | N/A, LOW? |
| | C2H2F2 | 1,1-DIFLUOROETHYLENE | MODERATE | 2.42 | N/A, LOW? |
| | C2HF3 | TRIFLUOROETHYLENE | MODERATE | 1.38 | N/A, LOW? |
| | C2F4 | TETRAFLUOROETHYLENE | MODERATE | 1.4 | N/A, LOW? |
| PROPENE (HFOs) | C3H2F4 | 2,3,3,3-TETRAFLUOROPROPENE | MODERATE | N/A, MODERATE? | N/A, LOW? |
| | C3H2F4 | 1,3,3,3-TETRAFLUOROPROPENE | MODERATE | N/A, MODERATE? | N/A, LOW? |
| ACETYLENE | C2H2 | ACETYLENE | BAD | 0 | 0 |
| | C2HF | FLUOROACETYLENE | BAD | 0.73 | 0 |
| | C2F2 | DIFLUOROACETYLENE | BAD | 0 | 0 |

FIG. 12

Fluoromethane:
Li(s) + $CH_3F$ → (LiF) + ($CH_3Li$) + ($C_2H_6$)

Difluoromethane:
Li(s) + $CH_2F_2$ → (LiF) + ($CH_2LiF$) + ($CH_2F$-$CH_2F$)

Tetrafluoroethane:
Li(s) + $CH_2F_4$ → (LiF) + ($CH_2Li$-$CF_3$) + ($CH_2F$-$CF_2Li$) + ($CH_2$=$CF_3$) + (MANY POLYMER CONFIGURATIONS)

FIG. 37

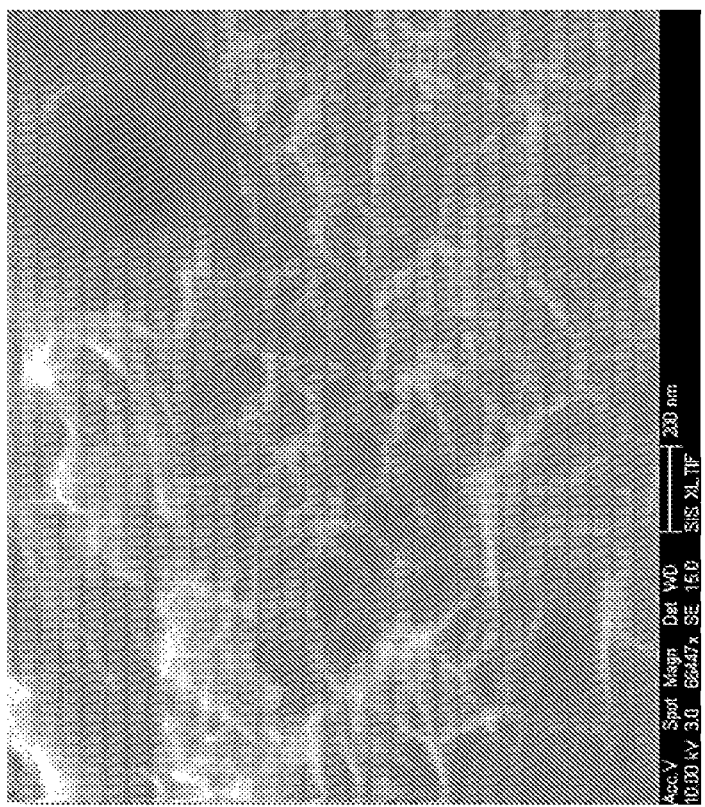
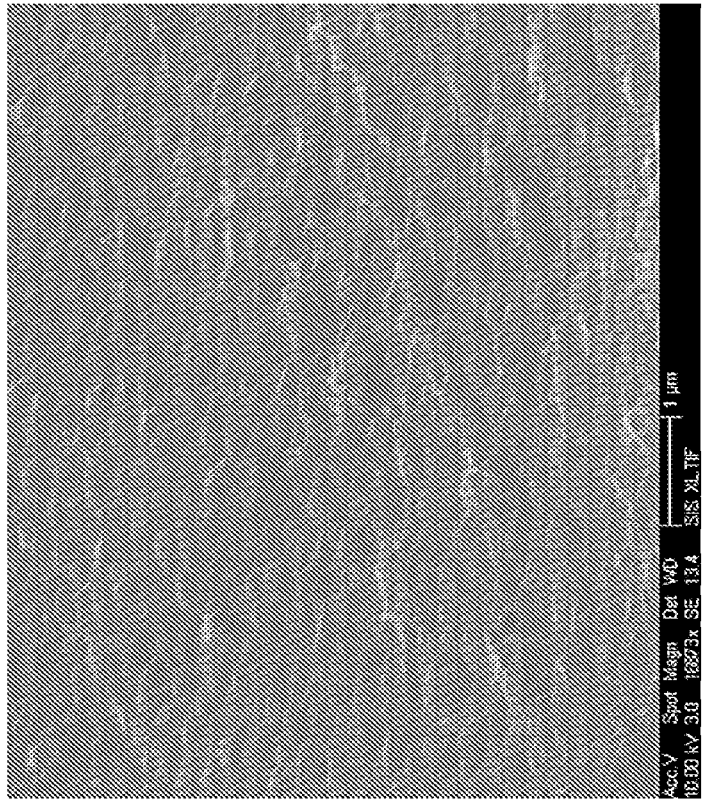
FIG. 39

ELECTROCHEMICAL DEVICES COMPRISING COMPRESSED GAS SOLVENT ELECTROLYTES

PRIORITY CLAIM AND RELATED PATENT APPLICATION

This patent claims priority as a continuation to U.S. patent application Ser. No. 18/594,433 filed on Mar. 4, 2024 and entitled "ELECTROCHEMICAL DEVICES COMPRISING COMPRESSED GAS SOLVENT ELECTROLYTES", which claims priority as a continuation to U.S. patent application Ser. No. 16/793,190 filed on Feb. 18, 2020 and entitled "ELECTROCHEMICAL DEVICES COMPRISING COMPRESSED GAS SOLVENT ELECTROLYTES", which claims priority as a continuation to U.S. patent application Ser. No. 15/036,763 filed on May 13, 2016 and entitled "ELECTROCHEMICAL DEVICES COMPRISING COMPRESSED GAS SOLVENT ELECTROLYTES", which is the 35 USC 371 National Stage application of International Application No PCT/US2014/066015 filed on Nov. 17, 2014 and entitled "ELECTROCHEMICAL DEVICES COMPRISING COMPRESSED GAS SOLVENT ELECTROLYTES", which claims priorities to U.S. Patent Application No. 61/905,057 filed on Nov. 15, 2013 and entitled "ELECTROCHEMICAL ENERGY STORAGE DEVICES BASED ON COMPRESSED GAS ELECTROLYTES," and U.S. Patent Application No. 61/972,101 filed Mar. 28, 2014 and entitled "ELECTROCHEMICAL ENERGY STORAGE DEVICES BASED ON COMPRESSED GAS ELECTROLYTES", the entire contents of which are incorporated by reference in this document.

This application is related to the following applications and patents, each of which is hereby incorporated by reference in its entirety: U.S. Pat. No. 10,608,284 issued on Mar. 31, 1920; U.S. Pat. No. 10,998,143 issued on May 4, 1921; U.S. Pat. No. 10,784,532 issued on Sep. 22, 1920; U.S. Pat. No. 11,088,396 issued Aug. 10, 1921; U.S. Pat. No. 10,873,070 issued on Dec. 22, 2020; U.S. Pat. No. 11,342,615 issued on May 24, 1922; U.S. Pat. No. 11,049,668 issued Jun. 29, 1921; U.S. Pat. No. 11,342,615 issued on May 24, 1922; U.S. Pat. No. 10,784,532 issued on Sep. 22, 1920; U.S. Pat. No. 11,984,614 issued on May 14, 1924; U.S. Pat. No. 11,958,679 issued on Apr. 16, 1924; PCT/US22/31594 filed on May 31, 1922; PCT/US23/17720 filed on Apr. 6, 2023; PCT/US23/28104 filed on Jul. 19, 1923; PCT/US23/28105 filed on Jul. 19, 1923; PCT/US24/16784 filed on Feb. 21, 1923; PCT/US24/18746 filed on Mar. 6, 1924; PCT/US24/33428 filed on Jun. 11, 1924; PCT/US24/25771 filed on Apr. 23, 1924; PCT/US24/31912 filed on May 31, 1924; U.S. Application 63/534,213 filed on Aug. 22, 1923; U.S. Application 63/418,703 filed on Oct. 24, 1922; PCT/US24/27501 filed on May 2, 1924; PCT/US24/31325 filed on May 29, 1924; U.S. Application 63/652,616 filed on May 28, 1924; PCT/US24/40203 filed on Jul. 30, 1924; U.S. application Ser. No. 18/788,809 filed on Jul. 30, 1924; U.S. application Ser. No. 18/643,134 filed on Apr. 23, 1924; U.S. application Ser. No. 18/807,938 filed Aug. 17, 1924; and U.S. Application 63/684,297 filed on Aug. 16, 1924.

STATEMENT REGARDING FEDERALLY SPONSORED RESEARCH OR DEVELOPMENT

This invention was made with United States government support by the Department of Energy's Advanced Research Projections Agency-Energy (ARPA-E), under award number DE-AR0000379. The government has certain rights in the invention.

TECHNICAL FIELD

This patent document relates to conductive electrolytes, such as ionically conductive electrolytes, which may be used in electrochemical energy storage devices, electroplating, or electrochemical sensing, and further relates to devices and systems that use such electrolytes.

BACKGROUND OF THE INVENTION

The energy density of batteries is proportional to their operating voltage. In supercapacitors (i.e., electrochemical double-layer capacitors), the energy density is proportional to voltage squared. With a greater demand for increased energy densities in electrochemical energy storage devices, significant improvements can be made by increasing the voltage ratings of such devices. An important contributing factor to the voltage limitation of electrochemical energy storage devices is the stability of the electrolyte solvent. At increased voltages, the electrolyte solvent may break down and cause an increase in resistance. As a result, loss of charge storage capability (capacity), gassing and device end-of-life may be reached. Therefore, improving the voltage rating of such devices is highly dependent on the electrolyte system used. Increasing the oxidation resistance of solvents may widen the potential window of the electrolyte, defined as the potential difference between which significant oxidation and reduction current occurs, and can thus be very useful in electrochemical applications such as batteries, supercapacitors, chemical sensing and common reduction-oxidation electrochemistry.

SUMMARY OF THE INVENTION

Disclosed are novel electrolytes, and techniques for making and devices using such electrolytes, which are based on compressed-gas solvents. Unlike conventional electrolytes, disclosed electrolytes are based on "compressed-gas solvents" mixed with various salts, referred to as "compressed-gas electrolytes." Various embodiments of a compressed-gas solvent include a material that is in a gas phase and has a vapor pressure above atmospheric pressure at room temperature. Electrochemical devices such as rechargeable batteries and supercapacitors that use such compressed-gas electrolytes are also disclosed. Also disclosed are techniques for electroplating difficult-to-deposit metals or alloys using compressed-gas electrolytes as an electroplating bath. The disclosed compressed-gas electrolytes can have wide electrochemical potential windows, high conductivity, low or high temperature operation capability, high oxidation resistance, and beneficial high-pressure solvent forming properties or solid electrolyte interfaces (SEI) forming properties.

Conventional electrolytes use solvents that are in the liquid phase under normal atmospheric conditions, which are defined as a pressure of 100 kPa, or one atmosphere, and a temperature of 293.15 K, or room temperature. In contrast, disclosed compressed-gas electrolytes use a "compressed gas solvent" that has a vapor pressure above atmospheric pressure of 100 kPa at room temperature of 293.15 K. Hence, without a proper pressurized environment, such a compressed-gas solvent is often in the gas phase, which is not suitable for forming electrolytes.

The disclosed techniques of making compressed-gas electrolytes include placing a compressed-gas solvent at a given temperature under a compressive pressure equal to, or greater than the compressed gas solvent's vapor pressure at that temperature. In some embodiments, compressed gas-electrolytes are placed inside a rigid container to maintain a sufficiently high pressure to keep the compressed-gas solvent in the liquid phase. The pressure required to maintain the liquid phase can be applied either by the compressed gas solvent's own vapor pressure inside the rigid container, by an externally-applied pressure inside the rigid container, or by both of the above. Furthermore, compressed-gas electrolytes can use a single chemical solvent or a solvent composed of multiple different chemicals, wherein at least one of the composing chemicals is a compressed gas solvent. Moreover, one or more types of compressed-gas solvents can be mixed with any number of solid or liquid chemicals to form a compressed-gas solvent mixture. As commonly known, mixtures of various chemicals may greatly change the boiling, freezing or critical points associated with individual component of the mixture. Furthermore, the compressed-gas solvent can also be made of mixtures that are liquid under atmospheric conditions if at least one of the components in the mixture is a compressed gas solvent. In some embodiments, to form the disclosed compressed gas electrolyte, any of the above-described compressed-gas solvents or compressed-gas solvent mixtures is mixed with one or more types of salts. The compressed-gas electrolyte can then be used in various of devices as described below.

Electrochemical energy storage devices such as rechargeable batteries and supercapacitors use compressed-gas electrolytes are also disclosed. A disclosed electrochemical energy storage device can include a pair of conducting electrodes and an ionically conducting electrolyte separating the pair of conducting electrodes. The electrolyte further comprises a compressed-gas solvent mixed with one or more types of salts, forming a "compressed gas electrolyte." The compressed-gas solvent used in the disclosed electrochemical energy storage device has the various properties as described above. For example, the compressed-gas solvent has a vapor pressure above atmospheric pressure of 100 kPa at room temperature of 293.15 K. Moreover, the pair of conducting electrodes and the compressed-gas electrolyte are contained inside a rigid housing which maintains a sufficiently high pressure to keep the compressed-gas solvent in the liquid phase. For example, the required high pressure is achieved either by the compressed gas solvent's own vapor pressure inside the rigid housing or by an externally-applied pressure inside the rigid container, or by both of the above.

In some embodiments, the disclosed electrochemical energy storage device is a supercapacitor that includes an electrochemical electrode assembly that comprises:

a negative current collector; negative electrode material coated on the negative current collector; a positive current collector; positive electrode material coated on the positive current collector; and an electrically-insulating separator. This electrochemical electrode assembly is placed inside the rigid housing together with the compressed-gas electrolyte to form an electrochemical cell.

In some embodiments, one or both of the negative electrode material and the positive electrode material include nanostructured material to form high surface area electrode, which includes one or more of: nanofibers; nanopillars; nanoparticle aggregates; nanoporous structures; and a combinations thereof.

In some embodiments, to construct an electrochemical energy storage device based on the disclosed compressed-gas electrolytes, a compressed-gas electrolyte is first formed by mixing a compressed-gas solvent and one or more types of salts inside a high-pressure container. Next, the compressed-gas electrolyte is inserted into the electrochemical electrode assembly inside the rigid housing to form an operating electrochemical cell. Alternatively, to construct an electrochemical energy storage device based on the disclosed compressed-gas electrolytes, a salt is first inserted into the electrochemical electrode assembly inside the rigid housing to form a salt loaded electrochemical electrode assembly. Next, a compressed-gas solvent is introduced into the salt loaded electrochemical electrode assembly to be mixed with the salt to create the compressed-gas electrolyte inside the rigid housing, thereby form an operating electrochemical cell.

Also disclosed are techniques for electroplating difficult-to-deposit metals or alloys using compressed-gas electrolytes as an electroplating bath. In some embodiments, to electroplate a difficult-to-deposit material on an object, a compressed-gas electrolyte is first prepared by mixing a compressed-gas solvent and one or more types of salts, wherein the compressed-gas solvent used has the various properties as described above. Next, using the compressed gas electrolyte as an electrodepositing bath, an anode made of at least the hard-to-electroplate material is immersed in the compressed gas electrolyte. A cathode, made of an object that requires electroplating of the hard-to-electroplate material, is also immersed in the compressed gas electrolyte. Next, a proper voltage is applied to the anode and to the cathode to allow the transferring of the difficult-to-deposit material from the anode to the cathode through the compressed gas electrolyte. Moreover, the compressed gas electrolyte, the anode and the cathode are placed inside a pressure chamber to provide the required pressure to keep the compressed-gas solvent in the liquid phase.

In one aspect, a disclosed electrochemical device includes an ionically conducting electrolyte that comprises a compressed-gas solvent and one or more types of salts. The compressed-gas solvent includes a material that is in the gas phase and has a vapor pressure above an atmospheric pressure at room temperature. The disclosed electrochemical device also includes a housing that encloses the ionically conducting electrolyte and is structured to provide a pressurized condition to the compressed gas solvent. The disclosed electrochemical device additionally includes a pair of conducting electrodes in contact with the ionically conducting electrolyte.

The disclosed compressed-gas electrolytes can have wide electrochemical potential windows, high conductivity, low temperature capability, and high-pressure solvent properties. Examples of a class of chemicals that can be used as solvents for electrolytes include hydrofluorocarbons, in particular fluoromethane, difluoromethane, tetrafluoroethane, pentafluoroethane, among others. Other classes of chemicals may be used as solvents for electrolytes as well, e.g., hydrofluoroolefins, hydrofluorochlorocarbons, chlorofluorocarbons, among others. In some embodiments, compressed-gas solvents having a composition that gives rise to high electronegativity (e.g., fluorine, chlorine, oxygen, nitrogen, etc.), high polarity, and oxidation resistance are desirable. Generally, any chemical having the above-described properties of a compressed-gas solvent and having sufficiently high relative permittivity and suitable solubility for salts to create a conductive electrolyte solution may be used. Applications of the disclosed compressed-gas electrolytes include electrochemical energy storage, electroplating and electrochemical sensing, among others.

BRIEF DESCRIPTION OF THE DRAWINGS

FIG. 3 presents a table listing detailed properties of commonly available solvents compared with a proposed compressed gas solvent, difluoromethane, which is a fluorinated compressed-gas solvent in accordance with some embodiments.

FIG. 4 presents a table listing detailed properties of some of the proposed compressed-gas solvents that may be good candidates for wider-potential-window electrochemical energy storage devices, and plating and sensing application, in accordance with some embodiments.

FIG. 12 presents a table listing stability, dipole moment and GWP of various proposed compressed-gas solvents, including fluorine-containing solvents in accordance with some embodiments.

FIG. 37 shows example reactions and reaction products from different compressed-gas solvents and lithium-metal chemical reactions. These products are only some of the possible products from the possible chemical reactions in accordance with some embodiments.

FIG. 39 shows SEM images of the surface of lithium metal after submersion into difluoromethane for five days at room temperature, in accordance with some embodiments.

DETAILED DESCRIPTION OF THE INVENTION

Introduction

Figure 1:
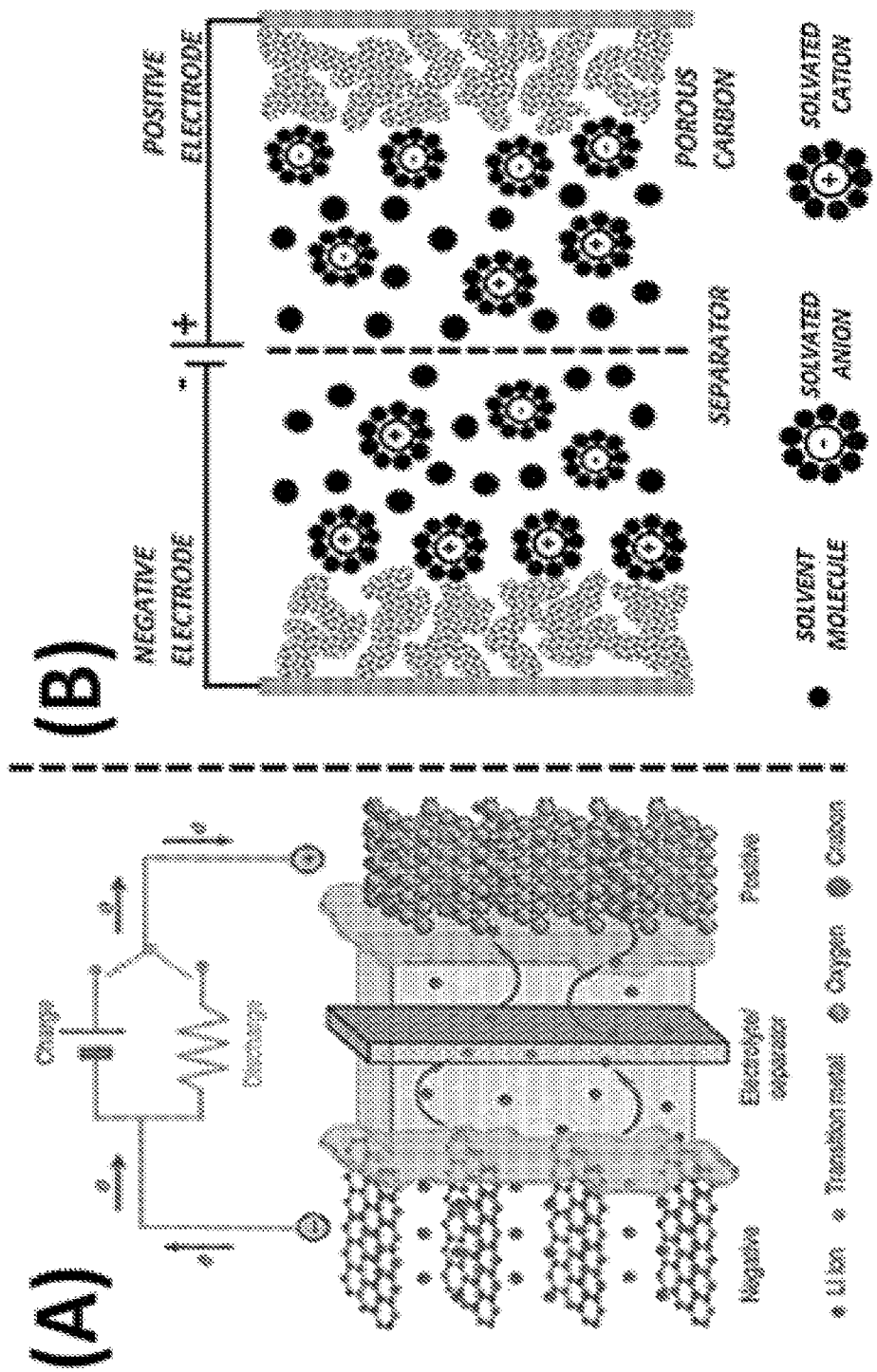
FIG. 1 illustrates schematics of (A) an exemplary lithium-ion battery and (B) an exemplary electrochemical double-layer capacitor (supercapacitor) featuring two charged electrodes separated by the electrolyte.

It is generally agreed that a limiting factor to further extending electrochemical capabilities of electrochemical energy storage devices, such as rechargeable Lithium (Li)-ion batteries (LIB) and electrochemical double-layer capacitors (EDLC), is the electrolyte, and intense efforts are being made to improve these systems by expanding the potential window and conductivity over a wide temperature range. Properties that make up a good solvent for electrolytes (e.g., solvent viscosity, permittivity, reduction and oxidation potentials, conductivity, etc.) are well-known and studied for numerous solvents. However, potential windows, defined as the potential difference between which significant oxidation and reduction currents occur, are typically limited to less than ~4.5 V for the existing electrolyte-based systems. Ionic liquid-based electrolytes offer a promising approach to electrochemical systems but are still difficult to handle, manufacture and often do not perform as well as traditional organic electrolytes. High energy-density cathodes that have been developed for next generation of Li-ion batteries have yet to be implemented because of the lack of a suitable electrolyte system. Electrochemical double-layer capacitors are similarly limited in their energy density due to limited potential window of the electrolytes.

The vast majority of research efforts on new electrolytes target systems using chemicals that are liquid at room temperature and atmospheric pressure, herein referred to as "liquid solvents." While convenient to work with, these liquid solvents may not offer the best properties. The use of low molecular weight compressed-gas solvents based on hydrofluorocarbon solvents molecules can be promising candidate solvents in the next generation of electrolytes. These solvents generally exhibit high oxidation resistance, due to the highly electronegative fluorine groups of these hydrofluorocarbon molecules. Optimization of the conductivity of these compressed-gas solvent systems, which would enable utilization of these electrolytes in batteries and electrochemical double-layer capacitors, has not been done. According to some embodiments of this patent disclosure, new data obtained has shown that these electrolyte systems can actually be made highly conductive over a surprisingly broad range of temperatures, enabling the use of these novel solvents in next-generation, significantly higher-capacity energy storage devices.

Large capacity energy storage devices such as Li-ion batteries or supercapacitors are important devices essential for modern engineering and communications devices as well as for consumer markets. These devices are described below.

Supercapacitors (or electrochemical capacitors) are made up of two electrodes physically separated by an ion-permeable membrane (often called a separator), immersed in an electrolyte which electrically connects the two electrodes (i.e., cathode and anode). When a voltage is applied and the electrodes are polarized, ions in the electrolyte form electric double layers of opposite polarity to the electrode's polarity. Thus, a positively polarized electrode will have a layer of negative ions forming at the interface between the electrode and the electrolyte. For charge-balancing, a layer of positive ions adsorbs onto the negative layer. For the negatively polarized electrode, the opposite situation is developed.

Typically, the energy density of batteries increases with the operating voltage, and with the quantity of energy stored electrochemically inside the electrode. In supercapacitors (also referred to as "electrochemical double-layer capacitors" or sometimes as "ultracapacitors"), the energy density is proportional to capacitance times voltage squared, i.e., $E=(½)CV^2$, and energy is stored in the electrostatic attraction between opposite charges in the electrode and in the electrolyte. Therefore, a higher operating voltage is important for achieving higher power in energy storage devices such as supercapacitors and batteries. With a greater demand for increased energy densities in electrochemical energy storage devices, significant improvements can be made by increasing the voltage ratings of such devices.

Based on electrode design, three types of supercapacitors are often used. (1) Electrochemical double-layer capacitors (EDLC) typically use carbon electrodes or related materials. EDLCs exhibit much higher electrostatic double-layer capacitance than electrochemical pseudocapacitance. (2) Electrochemical pseudocapacitors typically use metal oxide or conducting polymer electrodes. (3) Hybrid capacitors have asymmetric electrodes--for example, having one electrode exhibiting mostly electrostatic capacitance while the other electrode shows mostly electrochemical capacitance.

Supercapacitors have energy densities that are only approximately one-tenth of the energy density of conventional batteries, but with fast charge/discharge cycles, their power density can be 10 to 100 times greater than that of the batteries. Such a higher power density can be useful, for example, when starting automobile engines. Acetonitrile-based electrolytes are advanced electrolytes for EDLC supercapacitors, but they are often flammable and can release cyanide gas upon ignition. Consequently, acetonitrile-based electrolytes are not preferred for general automotive applications. Propylene carbonate is considered a good all-around solvent, but has a limitation of minimum operating temperature of −25° C. Other electrolytes being developed use ionic liquids. Such electrolytes are very expensive to manufacture, and their low temperature performance tends to be very poor.

The energy density of both Li-ion batteries and supercapacitors is strongly dependent on operating voltage. Additionally, there are some other important aspects that require innovative new concepts to overcome the current barriers. The disclosed compressed gas solvent-based electrolytes provide solutions to overcome these barriers, which are described below.

(1) A major contributing factor to the voltage limitation of electrochemical energy storage devices is the stability of the electrolyte's solvent. At high oxidizing or reducing voltages, the solvent may break down and increase its resistance, and as a result one or more of a loss of charge storage capability (capacity), gassing and device end of life may be reached. Hence, improving the stability of such devices is highly dependent on the electrolyte system used, and the disclosed compressed gas solvent-based electrolyte system enables a higher-voltage operation of the electrochemical energy storage devices.

(2) The ionic conductivity of electrolytes is often lowered by highly viscous solvents or with relatively high melting-point solvents. Hence, identifying a solvent, or a mixture of solvents having a low viscosity and a low melting point is important to improving the ionic conductivity of electrolyte systems. The disclosed compressed gas solvent-based electrolyte system offers improved ionic conductivity.

(3) The solid-electrolyte-interface (SEI) is known to be an important component in common electrochemical energy storage devices, of which the solvent in the electrolyte plays an important role. The SEI is a complex, yet very thin layer (e.g., 10-100 nm in thickness) that forms on the electrode surface from the decomposition products from the battery's electrolyte, often due to side reactions caused mainly by reduction or oxidation of solvents at the surface. SEI is very sensitive to water and to oxygen, and battery degradation with time and cycles is often attributed to the properties of the SEI layer. Identifying solvents that play a beneficial role in the SEI layer formation, producing SEI layers that are less detrimental to the battery operational cycles and long-term battery stability, is desired. The disclosed compressed gas solvent-based electrolyte system offers a possibility of more stable SEI layer formation.

(4) Many electrochemical device applications such as supercapacitors require a high surface area electrode, with nanopores that are often inaccessible to the electrolyte due to high surface tension, trapped gas or generated gas within the electrode. An electrolyte with improved accessibility to these nanopores is beneficial to the overall system performance. The disclosed compressed gas solvent-based electrolyte system offers an easier penetration of electrolytes into nanoporous surfaces by virtue of the higher pressure employed in the compressed gas solvent-based devices.

(5) Electrodeposition of difficult-to-electroplate metals and alloys such as Ti, Al, Si, and W can be enabled with larger potential windows in electrochemical systems, and therefore it is desirable to find solvents and electrolyte compositions that can enable electroplating of such metals for a myriad of industrial applications, which also include improved redox electrochemistry and chemical sensing. Enabling of electrodeposition of semiconductors such as Si can offer significant manufacturing and economic advantages for the electronics industry. Enabling the electrodeposition of aluminum, titanium, tungsten and their alloys can have significant industrial and economic impact toward easier and inexpensive surface passivation (e.g., via anodization coating formation for protective or decorative surfaces), corrosion resistance, wear resistance, and environmental cleaning (e.g., in the case of utilizing the advantageous effect of titanium or titanium oxide surface coating for enhanced decomposition of toxic materials or for water purification). The disclosed technology enables electroplating or sensing with higher electrochemical potential windows.

The disclosed technology can increase the potential window of the electrolyte, improve ionic conductivity over a wide temperature range, improve the SEI layers, and improve electrolyte accessibility to nanopores, all of which can be very useful in electrochemical applications such as batteries, supercapacitors, electroplating, chemical sensing and common reduction-oxidation electrochemistry.

Overview

Disclosed are novel and advantageous electrolytes, techniques for making, structures and devices using such electrolytes, which are based on compressed-gas solvents, in combination with metal-ion containing salt and/or non-metal-ion containing salt.

In the examples in this document, a compressed gas solvent-based electrolyte or "compressed-gas electrolyte" is a mixture of electrolyte that includes a compressed-gas solvent portion and a salt portion, which are mixed together under a pressurized condition to form the compressed-gas electrolyte. The compressed-gas solvent is made of a solvent material typically in the gas phase under normal atmospheric conditions, i.e., at a pressure of 100 kPa, or one atmosphere, and at the ambient or room temperature (e.g., a temperature around 293.15 K). In many implementations, when used as solvent in the compressed-gas electrolyte, this solvent material is pressurized at a pressure much higher than one atmospheric pressure (for example, at a pressure from 100 psi to 500 psi) so that the solvent material is in the liquid phase (i.e., the compressed gas solvent) to provide a suitable solubility for salts to create a conductive electrolyte. To maintain the pressure so that the solvent material stays in the liquid phase, the compressed-gas electrolyte is generally placed inside a sealed container that can effectuate a high pressure. In other implementations, the solvent material for the compressed-gas electrolyte may be in a phase other than the liquid phase. For example, in some circumstances, the compressed-gas solvent can in a super-critical phase in the compressed-gas electrolyte. More specifically, under proper temperature and pressure conditions, the solvent material forms a super-critical phase to provide a suitable solubility for salts to create a conductive electrolyte, typically above the solvent material's critical temperature and critical pressure, commonly known as "critical points." In various applications, such a desired solvent material for the compressed-gas solvent may exhibit a relatively high dielectric constant, a relatively low viscosity, and relatively low boiling and melting points. Some of the exemplary solvent materials for the compressed-gas solvents include: trifluoromethane, difluoromethane, fluoromethane, tetrafluoroethane, and pentafluoroethane, among others. For example, difluoromethane can have the following properties: a melting point of −136° C., a boiling point of −52° C., a viscosity at 25° C. of 0.11, a dielectric constant at 25° C. of 15, and a dipole moment of 1.9.

Compressed gas solvent-based electrolytes can have wide electrochemical potential windows, high conductivity, low-temperature capability, high oxidation resistance, and high-pressure solvent properties. Examples of a class of compressed gases that can be used as solvent for electrolytes include hydrofluorocarbons, in particular fluoromethane, difluoromethane, tetrafluoroethane, pentafluoroethane, among others. Other classes of compressed gases may be used as solvent for electrolytes as well, e.g., hydrofluoroolefins, hydrofluorochlorocarbons, chlorofluorocarbons, among others. In some embodiments, compressed-gas solvents having a composition that gives rise to high electronegativity (e.g., fluorine, chlorine, oxygen, nitrogen, etc.), high polarity, and oxidation resistance is desirable. Generally, any compressed gas having sufficiently high relative permittivity and suitable solubility for salts to create a conductive electrolyte may be used. Thus, non-fluorine-containing compressed-gas solvents such as those based on chlorine, or a compressed-gas solvents having two or more mixed gases, are also included in this patent disclosure. Applications of the disclosed compressed gas-based electrolytes include electrochemical energy storage, electroplating and electrochemical sensing, among others.

Also disclosed in this patent document are electrochemical energy storage devices such as battery structures and supercapacitor structures that use compressed gas solvent-based electrolytes, and techniques for constructing such energy storage devices. Further, techniques for electroplating difficult-to-deposit metals or alloys using compressed-gas electrolytes as an electroplating bath are disclosed.

Typically, electrolytes used in electrochemical energy storage devices, such as battery and supercapacitors, are composed of various salts and solvents. These solvents are typically in the liquid phase under normal atmospheric conditions, which are typically defined as having a pressure of 100 kPa, or one atmosphere, and a temperature of 293.15 K, or room temperature. Some exceptions to this general rule include, most notably, ethylene carbonate, which is in the solid phase under normal atmospheric conditions, but which may typically be used as a mixture with one or more co-solvents to form a liquid phase.

In some embodiments of this patent disclosure, electrolytes based on compressed-gas solvents mixed with various salts, referred to as "compressed-gas electrolytes", and devices comprising such compressed-gas electrolytes are disclosed. The disclosed compressed-gas electrolytes can have wide electrochemical potential windows, high conductivity, low or high-temperature operation capability, high oxidation resistance, and beneficial high-pressure solvent forming properties or beneficial solid electrolyte interfaces (SEI) forming properties.

In some embodiments, the compressed-gas solvent component of the proposed compressed-gas electrolyte includes a chemical having a vapor pressure greater than atmospheric pressure of 100 kPa at room temperature of 293.15K, or having a boiling point temperature less than room temperature. In various embodiments, four phases of a given compressed-gas solvent may be used: solid phase, liquid phase, gas phase, and super-critical phase. The use of a mixture of these phases is not excluded from this patent disclosure. For example, a compressed-gas solvent component in liquid phase may be at least 50%, preferably at least 80% of the total weight of the electrolyte weight, while other components of solid phase, gas phase, supercritical phase or their mixture can be less than 50%, preferably less than 20% in weight. The solid phase can be used when the compressed-gas solvent is under temperature and pressure conditions causing the solvent material to condense into a solid phase, typically below the compressed-gas solvent's freezing point. Similarly, the liquid phase can be used when the compressed-gas solvent is under temperature and pressure conditions causing the solvent material to condense into a liquid phase, typically above the compressed-gas solvent's freezing point. Furthermore, the gas phase can be used when the compressed-gas solvent is under temperature and pressure conditions causing the solvent material to form a gas phase, typically above the solvent's boiling point. Moreover, the super-critical phase can be used when the compressed-gas solvent is under temperature and pressure conditions that cause the solvent material to form a super-critical phase, typically above the solvent's critical temperature and critical pressure, commonly known as "critical points." While the disclosed compressed-gas electrolyte may use the solvent in any of these four phases, in some implementations, it is preferable to use the solvent in the liquid or super-critical phase to allow for desirable electrolyte properties. In some implementations, it is more preferable to use the solvent in the liquid phase.

When used in the liquid phase, the compressed-gas solvent at a given temperature is typically under compressive pressure equal to, or greater than the compressed-gas solvent's vapor pressure at that temperature. At temperatures below the compressed-gas solvent's boiling point, this pressure will typically be below atmospheric pressure. At temperatures above the compressed-gas solvent's boiling point, this pressure will typically be greater than atmospheric pressure. At pressures greater than atmospheric pressure, a rigid container is typically used to maintain a sufficiently high pressure to keep the compressed-gas solvent in the liquid phase. Hence, according to some embodiments of this patent disclosure, the pressures required to maintain the liquid phase can be applied either by the compressed-gas solvent's own vapor pressure or by an externally applied pressure, or a combination of both of the above. Furthermore, the compressed-gas solvent may be composed of one chemical or multiple different chemicals, where at least one of the composing chemicals is a compressed gas-solvent, according to some embodiments of this patent disclosure. Moreover, one or more types of compressed-gas solvents can be mixed with any number of solid or liquid chemicals to form a compressed-gas solvent mixture. As commonly known, mixtures of various chemicals may greatly change the boiling, freezing or critical points associated with individual component of the mixture. Furthermore, the compressed-gas solvent can also be made of mixtures that are liquid under atmospheric conditions if at least one of the components in the mixture is a compressed-gas solvent. In some embodiments, to form the disclosed compressed-gas electrolyte, any of the above-described compressed-gas solvents or compressed-gas solvent mixtures is mixed with one or more types of salts. The compressed-gas electrolyte can then be used in various of devices, as described in more detail below.

Examples of a class of chemicals that can be used as solvent for compressed-gas electrolytes include fluorinated hydrocarbon alkanes, in particular fluoromethane, difluoromethane, trifluoromethane, fluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, 1-fluoropropane, 2-fluoropropane, 1,1-difluoropropane, 1,2-difluoropropane, 2,2-difluoropropane, 1,1,1-trifluoropropane, 1,1,2-trifluoropropane, 1,2,2-trifluoropropane, and isomers of the above, and other similar longer chained fluorinated hydrocarbon alkanes.

Other chemicals that can be used as solvent for electrolytes include fluorinated hydrocarbon alkenes such as fluoroethylene, cis-1,2-fluoroethylene, 1,1-fluoroethylene, 1-fluoropropylene, 2-propylene, and isomers of the above and other similar longer-chained fluorinated-hydrocarbon alkenes. Moreover, fluorinated hydrocarbon alkynes may be used, including fluoroethyne or another fluorinated ethyne with an extended radical group. Furthermore, a class of chemicals that can be used as solvent for electrolytes may be similar in structure to any of the above-described compressed-gas solvents but having a different halogenated component such as chlorine, bromine or iodine. Moreover, another class of chemicals that can be used as solvent for electrolytes may have a dissimilar structure to the above-described compressed-gas solvents, such as ammonia or nitrous oxide, molecular oxygen, molecular nitrogen, carbon dioxide, carbon monoxide, hydrogen fluoride or hydrogen chloride. In some embodiments, a disclosed compressed-gas solvent is associated with some or all of the following properties: a relatively high dielectric constant, high polarity, high resistance to reduction and oxidation, nontoxicity, non-flammability, and low environmental impact. Generally, any compressed-gas solvent that can solubilize salts to form an ionically-conductive electrolyte solution may be used, according to some embodiments of this patent disclosure.

Solvents of high oxidation resistance are often required in electrochemical studies or applications. Addition of highly electronegative fluorine to common hydrocarbons often creates a polar solvent capable of solubilizing salts and increases solvent-oxidation resistance. The higher oxidation resistance may allow for applications as a solvent in high-voltage batteries, high-voltage electrochemical capacitors, chemical sensing and common reduction-oxidation electrochemistry.

Conventional electrochemical energy storage devices, such as batteries or electrochemical double-layer capacitors (also known as "supercapacitors") using liquid solvents, are well-known to those skilled in the art. Generally, such an energy storage device is comprised of two electrically-conducting electrodes; each of the electrodes further comprises a current collector and an active material layer, which is coated on the inner surface of the current collector. Supercapacitors typically have electrodes comprised of activated-carbon-based materials, such as porous carbon, which have a high surface area per unit volume or per unit mass. Batteries typically have electrodes composed of material allowing for the intercalation of ions into the electrode material. In both batteries and supercapacitors, typically the two conducting electrodes are immersed in a conductive solution, i.e., the electrolyte. The electrodes are also separated by an electrically non-conducting separator, which typically has porous structure to allow passage of ions within the electrolyte.

For example, FIG. 1 illustrates schematics of (A) an exemplary lithium-ion battery and (B) an exemplary electrochemical double-layer capacitor (supercapacitor) including two charged electrodes separated by the electrolyte. Note that in the supercapacitor, the electrolyte further comprises anions (negatively charged ions) and cations (positively charged ions) solvated in a solvent.

Figure 2:
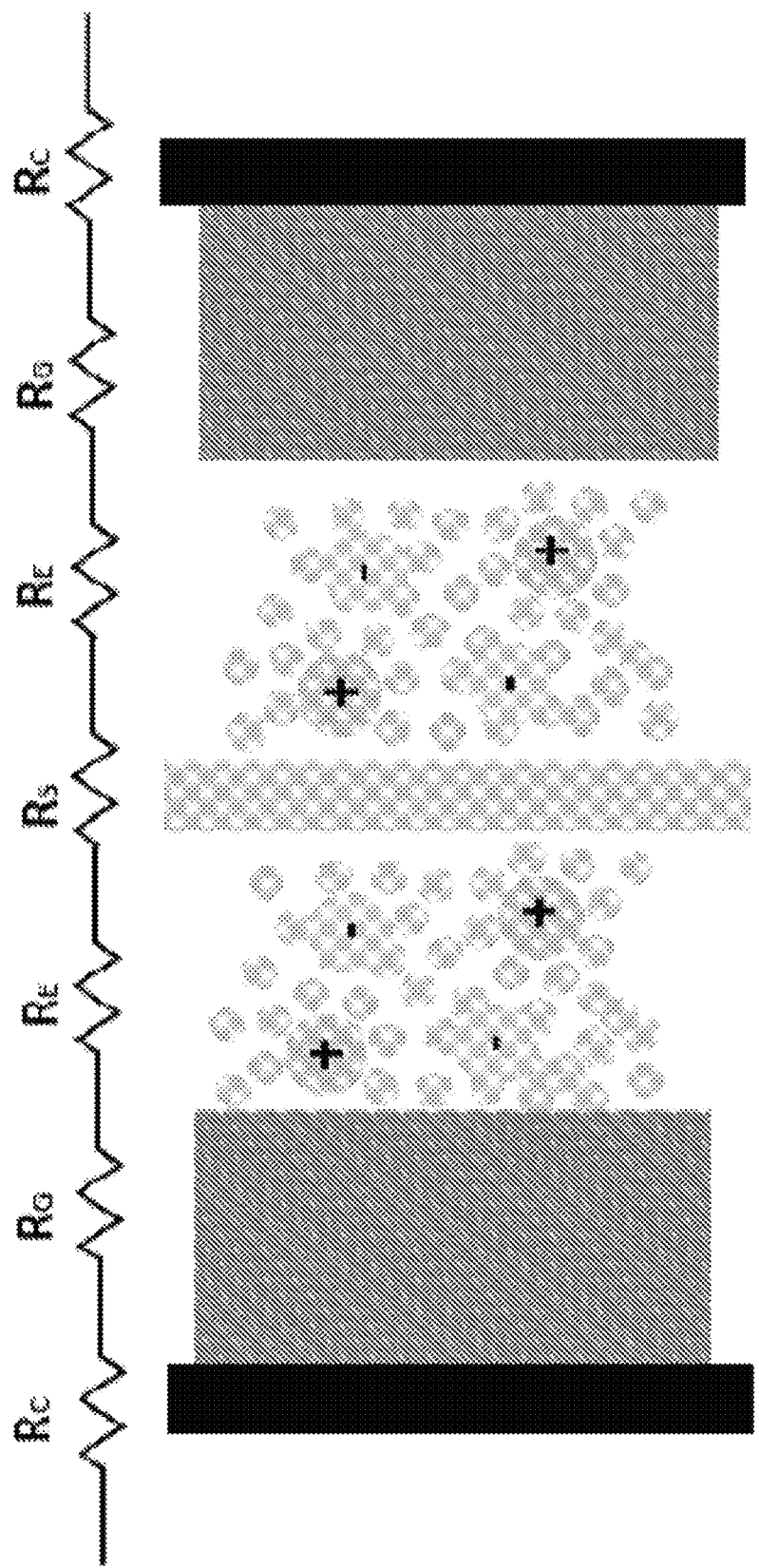
FIG. 2 shows a schematic of a common supercapacitor device and equivalent resistances coupled in series, each corresponding to a respective component of the supercapacitor device, where RC is contact series electrical resistance, RG is electrode electrical resistance, RE electrolyte Ionic Resistance, and RS is separator ionic resistance.

The power capability of electrochemical storage devices is dependent on the conductivities of many of its components, including the electrolyte. FIG. 2 shows a schematic of a common supercapacitor device and equivalent resistances coupled in series, each corresponding to a respective component of the supercapacitor device. It is generally accepted that electrolyte solvent viscosity is one of the determining factors in the conductivity of the electrolyte. Typically, the viscosity is also related to the temperature of the solvent. The conductivity of the electrolyte system typically drops rapidly when the operating temperature cools down and reaches the freezing point of the electrolyte system. Consequently, improving the power capability of electrochemical storage devices is highly dependent on the viscosity and the freezing point of the electrolyte system used in these devices.

It should also be noted that in some electrochemical storage devices, such as supercapacitors, energy storage is partly determined by access to nano-sized pores in the active material layers. Many electrolyte systems do not have access to these pores because of high surface tension between the electrolyte and electrode surface or trapped air within the pores, limiting the possible energy density of the device. A desirable electrolyte would have low surface tension and would allow access to the micro pores on an electrode surface.

Solvents of high oxidation resistance (such as dichloromethane or acetonitrile) are often desired for more practical electrochemical applications. Typically, solvents of high oxidation resistance contain atoms of high electronegativity. The addition of, or substitution of other highly electronegative elements with, fluorine in these solvents as described in this patent disclosure typically lowers the boiling point significantly, often rendering the solvent gaseous at room temperature. However, the addition of the highly-electronegative fluorine to these solvents makes them highly oxidation-resistant. The increased oxidation resistance widens the potential window of the electrolyte and can be very useful in electrochemical applications such as batteries, electrochemical capacitors, chemical sensing and common reduction-oxidation electrochemistry.

Various embodiments of this patent document disclose electrolytes based on one or more types of compressed-gas solvents mixed with one or more types of salts to form an ionically-conducting mixture, referred to as "compressed-gas solvent-based electrolytes" or simply "compressed gas electrolytes," and devices comprising such compressed gas electrolytes. The disclosed compressed gas electrolytes can have wide electrochemical potential windows, high oxidation resistance, high conductivity, low- or high-temperature operability, and beneficial high-pressure solvent or SEI-forming properties.

FIG. 3 presents a table listing detailed properties of commonly available solvents compared with a proposed compressed-gas solvent, difluoromethane, which is a fluorinated compressed-gas solvent in accordance with some embodiments. As can be seen in FIG. 3, the compressed-gas solvent shows significantly lower viscosity, potentially allowing for higher charge carrier, or ion mobility, thereby leading to high ionic conductivity when used to form salt solutions. Notably, the melting point of the compressed-gas solvent is significantly lower than that of those common liquid solvents. This property allows for high ionic conductivity and device operation down to very low temperatures, which is not available to common liquid solvents. Some embodiments of this patent disclosure utilize this property to construct improved energy storage devices, perform wider-potential-window electrochemical deposition and electrochemical sensing.

Figure 5:
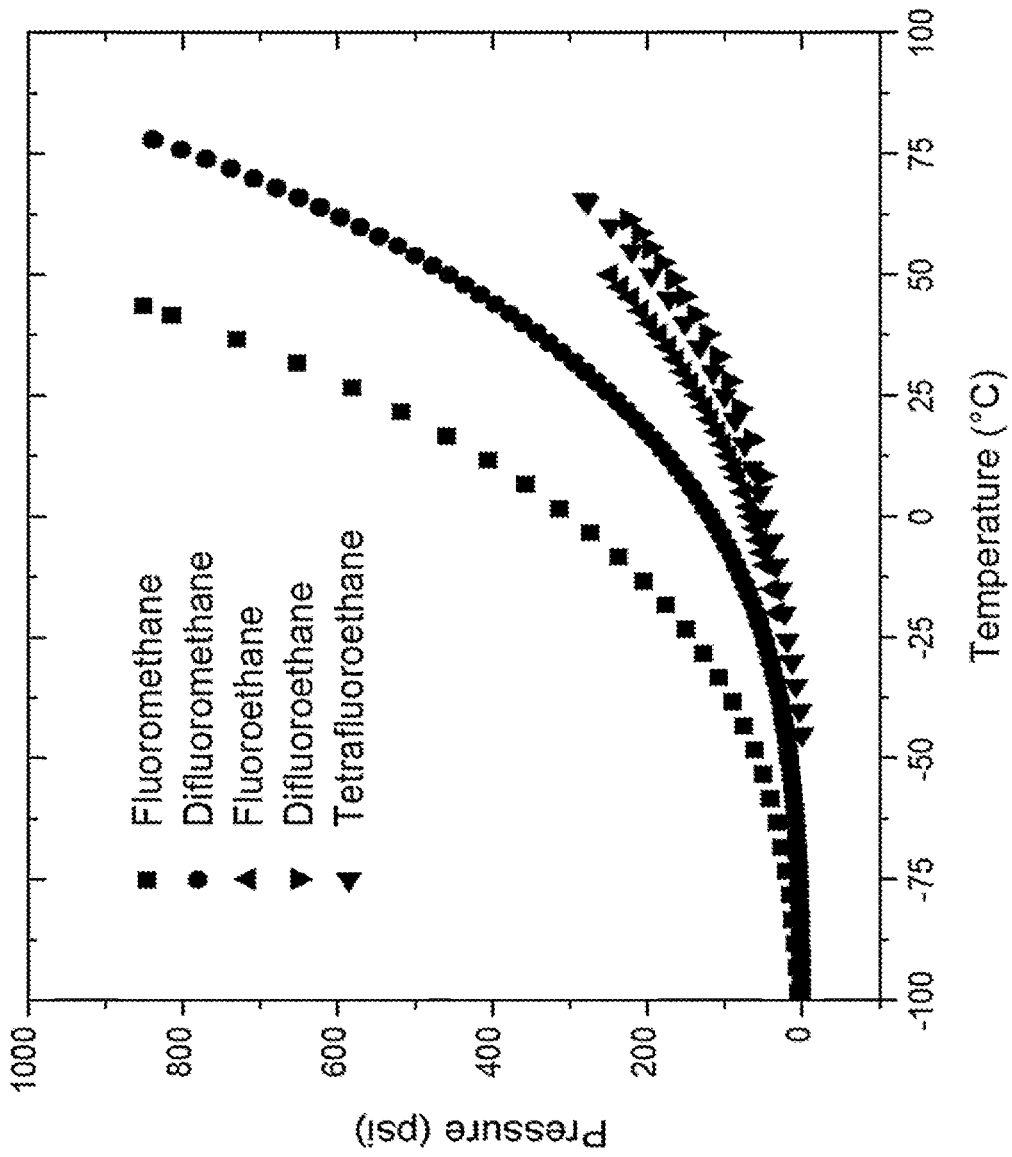
FIG. 5 shows a plot comparing vapor pressures of various proposed compressed-gas solvents over a wide temperature range, in accordance with some embodiments.

FIG. 4 presents a table listing detailed properties of some of the proposed compressed-gas solvents which may be good candidates for wider-potential-window electrochemical energy storage devices, and plating and sensing application, in accordance with some embodiments. As can be seen in FIG. 4, the table includes vapor pressures of the proposed compressed-gas solvents at room temperature. In more detail, FIG. 5 shows a plot comparing vapor pressures of the compressed-gas solvents listed in FIG. 4 over a wide temperature range in accordance with some embodiments. In some embodiments, a compressed-gas solvent with relatively higher vapor pressure in a group of candidate compressed-gas solvents is selected to facilitate achieving higher ion access to nano pores in highly porous electrodes, a property which can be beneficial to the energy storage device operation.

Figure 6:
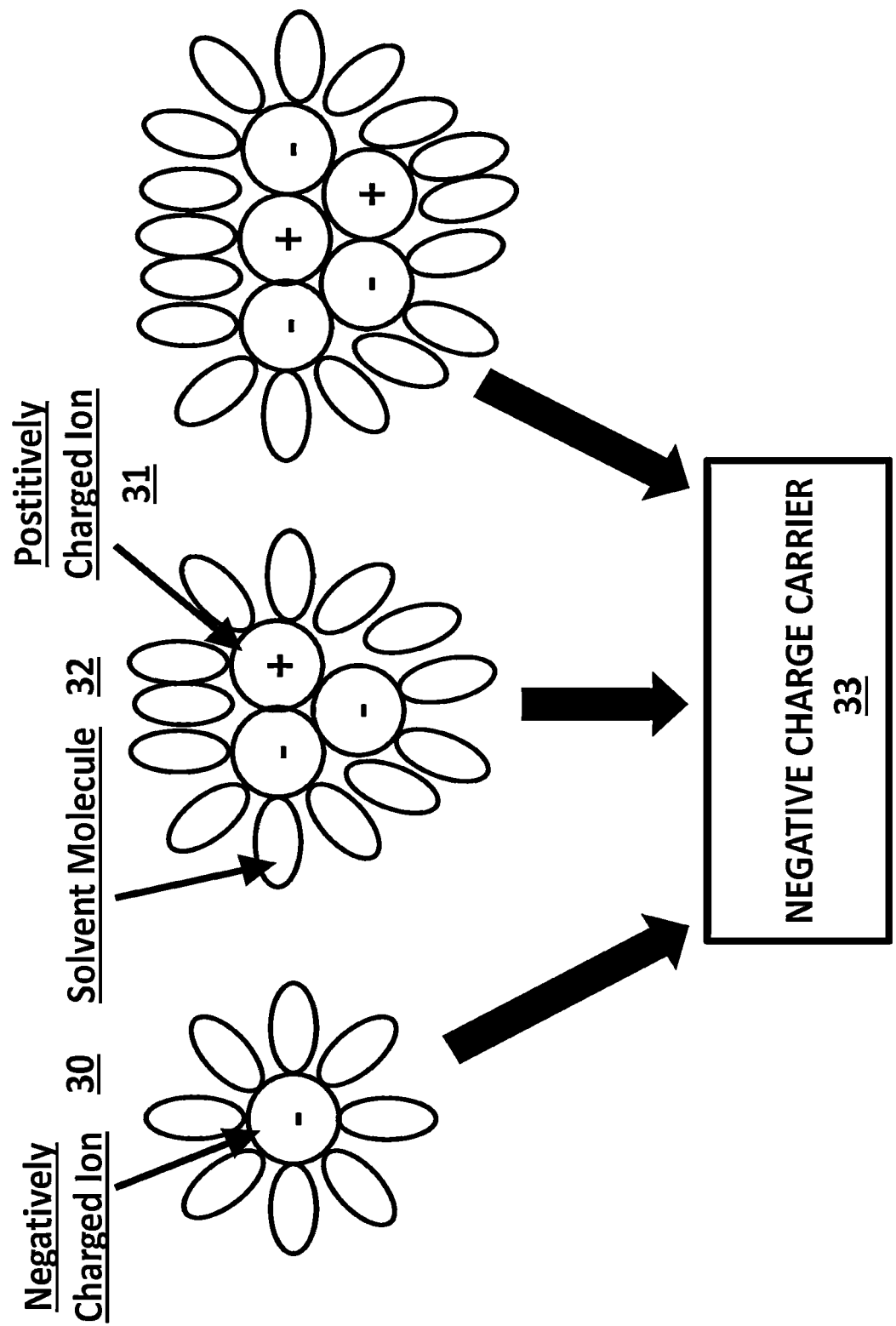
FIG. 6 illustrates an example of salt ions (with more negatively charged ions than positively charged ions) solvated in solvent molecules to form negative charge carriers including both a solvated single ion and solvated ion aggregates.
Figure 7:
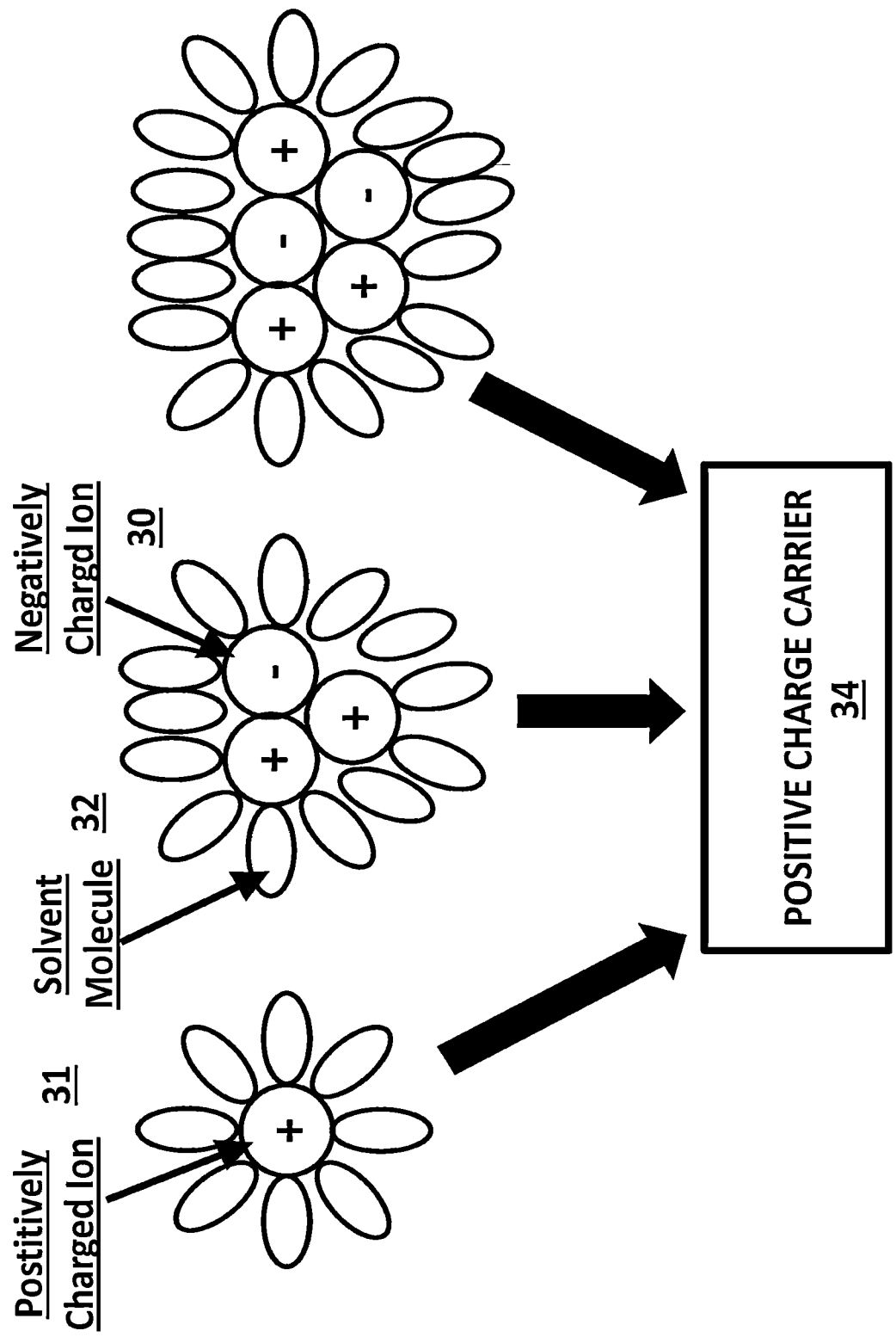
FIG. 7 illustrates an example of salt ions (with more positively charged ions than negatively charged ions) solvated in solvent molecules to form positive charge carriers, including both a solvated single ion and solvated ion aggregates.

The solubility of salts in some proposed compressed-gas solvents may be limited due to typically low dielectric constants and molecular polarity of these solvents. FIG. 6 and FIG. 7 illustrate schematically examples which salt ions can be solvated in a lower dielectric solvent, but also can form higher solvated-ion aggregates in the lower dielectric solvent. More specifically, FIG. 6 illustrates an example of salt ions (with more negatively-charged ions 30 than positively-charged ions 31) solvated in solvent molecules 32 to form negative-charge carriers 33, including both a solvated single ion and solvated ion aggregates. FIG. 7 illustrates an example of salt ions (with more positively-charged ions 31 than negatively-charged ions 30) solvated in solvent molecules 32 to form positive-charge carriers 34, including both a solvated single ion and solvated ion aggregates. While larger in size and lower in mobility, these solvated ion aggregates can still contribute to the ionic conductivity of the solution.

Figure 8:
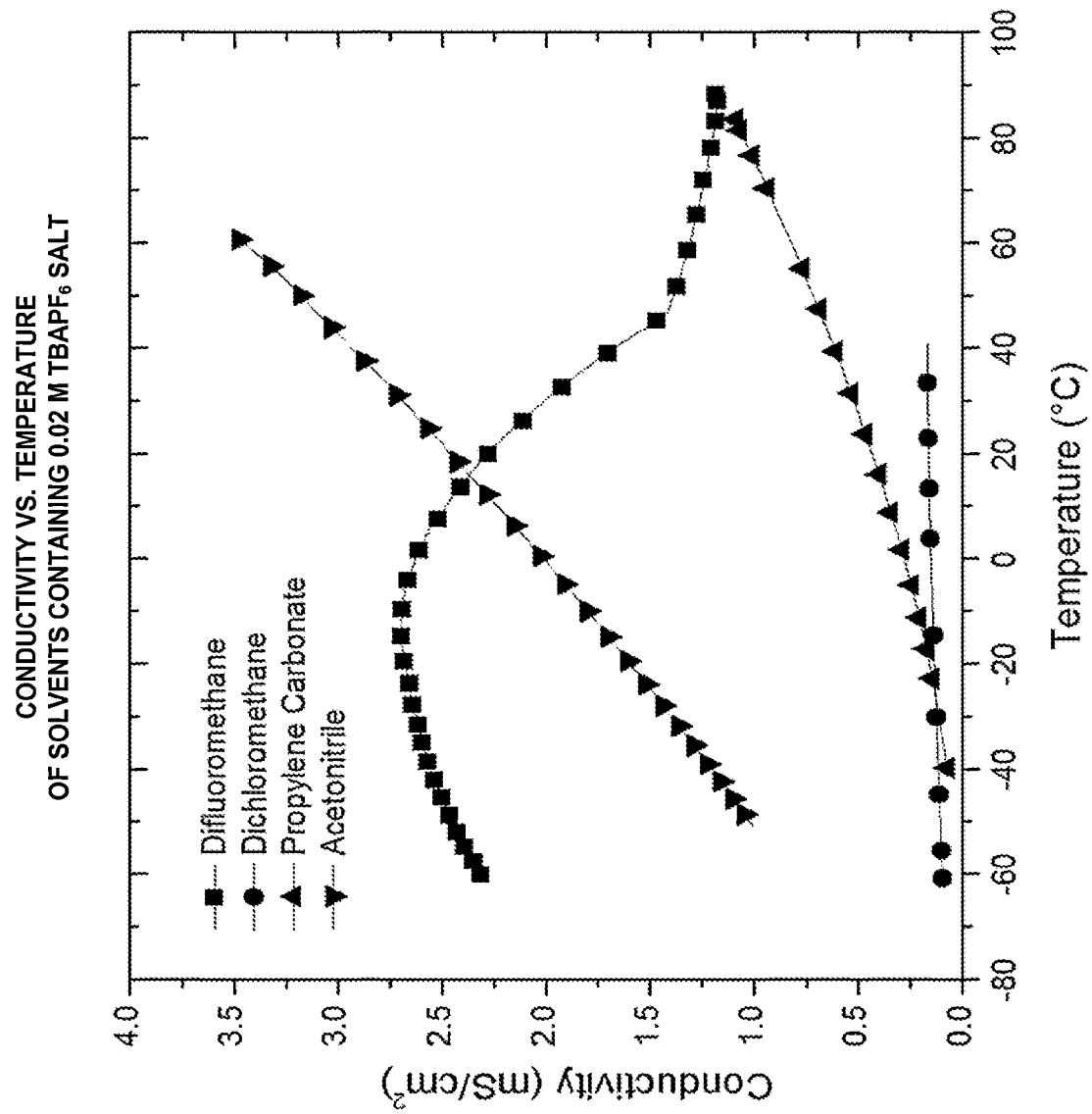
FIG. 8 shows conductivity vs. temperature plots of various electrolyte systems containing various solvents and the same salt, e.g., 0.02M of TBAPF6 salt, in accordance with some embodiments.

FIG. 8 shows conductivities vs. temperature plots of various electrolyte systems containing various solvents and the same salt, e.g., 0.02M of TBAPF6 salt, in accordance with some embodiments. As shown in FIG. 8, the compressed-gas solvent difluoromethane shows superior low-temperature capability and significantly higher conductivity than its liquidus halogenated counterpart, liquid dichloromethane. The fluorinated compressed-gas-solvents proposed in the patent document display a remarkably high electrolytic conductivity when mixed with commonly used tetra-alkyl-ammonium salts as shown in the data plot. Although dichloromethane and difluoromethane are closely related structurally with a simple substitution of chlorine for more electronegative fluorine, there are significant differences in the electrolytic conductivity. Difluoromethane shows more than an order-of-magnitude higher conductivity over dichloromethane. Furthermore, difluoromethane shows superior conductivity over acetonitrile at temperatures below ~20° C., while showing exceptional conductivity at temperatures as low as −60° C. The non-linear shape to the conductivity vs. temperature curve for the difluoromethane compressed-gas electrolyte is thought to arise from the changing viscosity of the compressed-gas solvent and ion-aggregation effects over temperature. Hence, in some embodiments, fluorinated compressed-gas-solvents difluoromethane and related solvents are desirable solvents for constructing higher conducting electrolytes for electrochemical energy storage devices.

In the discussion below, the following chemical acronyms may be used: TEA=tetraethylammonium, TBA=tetrabutylammonium, ClO4=perchlorate, BF4=tetrafluoroborate, PF6=hexafluorophosphate, TFSI=bis-trifluoromethanesulfonimidate, EMI=1-ethyl-3-methylimidazolium, and LiTFSI=lithium bis-trifluoromethanesulfonimide, among other.

Figure 9:
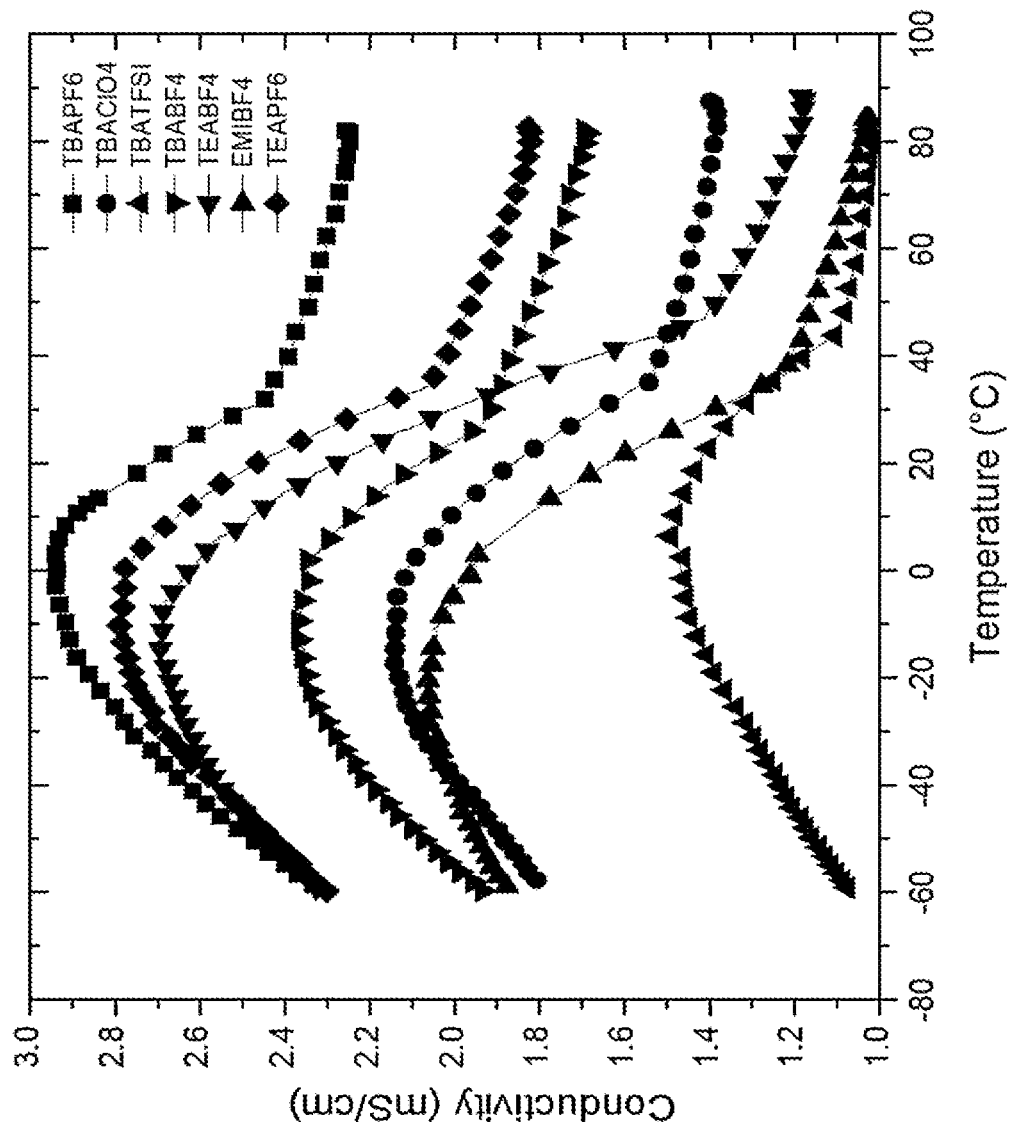
FIG. 9 shows conductivity vs. temperature plots of the compressed-gas solvent difluoromethane with 0.02 M of various salts forming conductive compressed-gas electrolyte systems in accordance with some embodiments.

FIG. 9 shows conductivity vs. temperature plots of compressed-gas solvent difluoromethane with 0.02 M of various salts forming conductive compressed-gas electrolyte systems, in accordance with some embodiments. As shown in FIG. 9, electrolytes based on certain salts provide higher conductivities at various temperatures in the same compressed-gas solvent medium.

Figure 10:
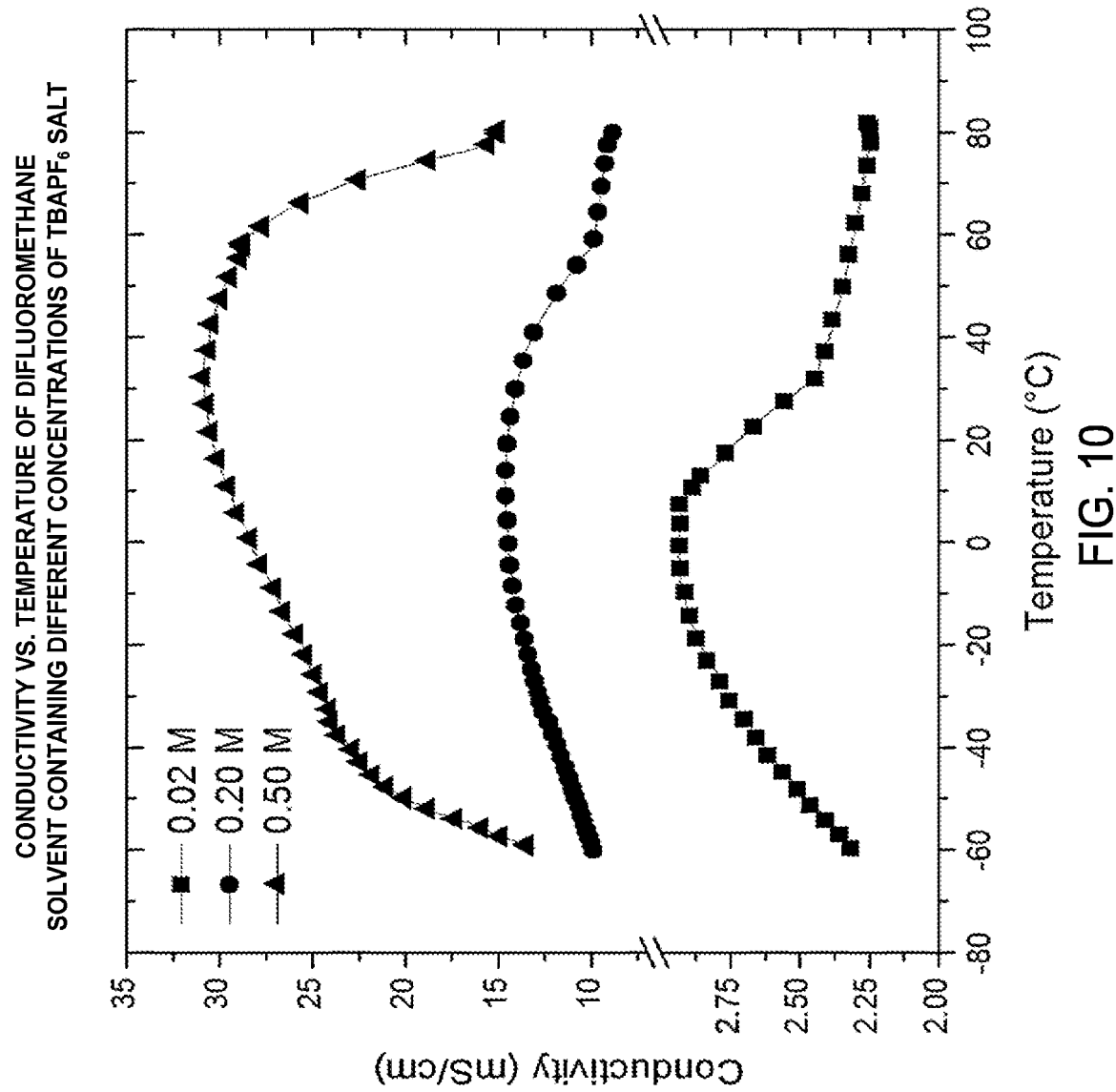
FIG. 10 shows conductivity vs. temperature plots of the compressed-gas solvent difluoromethane with different concentrations of tetrabutylammonium hexafluorophosphate (TBAPF6) salt in accordance with some embodiments.

FIG. 10 shows conductivity vs. temperature plots of compressed-gas solvent difluoromethane with different concentrations of tetrabutylammonium hexafluorophosphate (TBAPF6) salt, in accordance with some embodiments. Note that an increase in conductivity is associated with an increasing concentration of the salt. Hence, the conductivity values can be further improved by adjusting, e.g., increasing the concentration of salt, as needed for batteries or super-capacitor applications.

Figure 11:
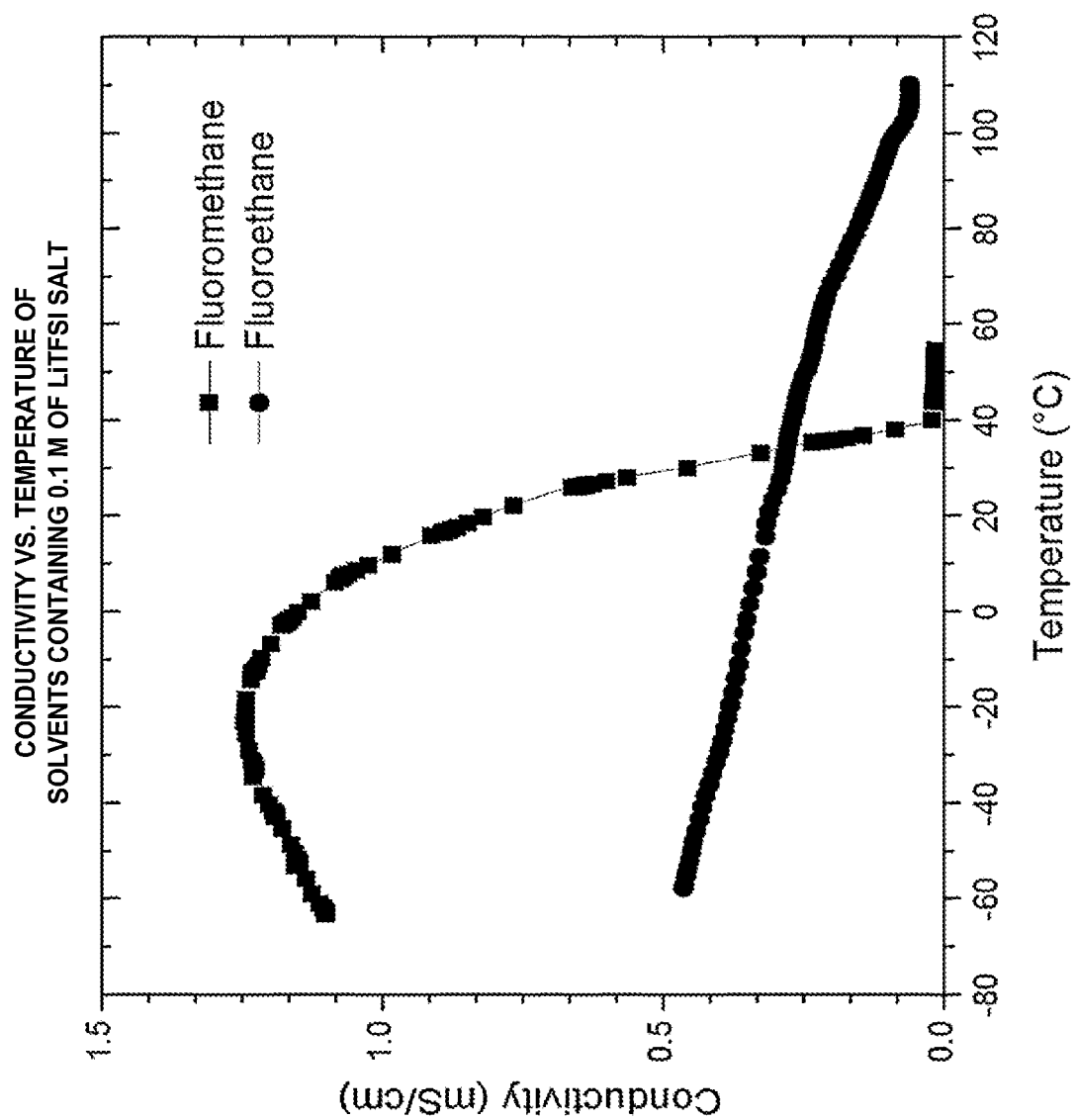
FIG. 11 shows conductivity vs. temperature plots of electrolyte systems containing fluoromethane and fluoroethane compressed-gas solvents and lithium bis-trifluoromethanesulfonimide (LiTFSI) salt in accordance with some embodiments.

FIG. 11 shows conductivity vs. temperature plots of electrolyte systems containing fluoromethane and fluoroethane compressed-gas solvents and lithium bis-trifluoromethanesulfonimide (LiTFSI) salt, in accordance with some embodiments. These electrolyte systems can be used in lithium battery electrochemical-energy storage devices operated with compressed-gas solvent-based electrolytes. These two compressed-gas solvents, fluoromethane and fluoroethane, exhibit desirable stability, sufficient dielectric properties and relatively low global warming potential (GWP).

FIG. 12 presents a table listing stability, dipole moment and GWP of various proposed compressed-gas solvents including fluorine-containing solvents in accordance with some embodiments. The GWP is a relative measure of how much heat a gas identified to be a greenhouse gas traps in the atmosphere, relative to $CO_2$ (carbon dioxide), and hence the lower the GWP value is, the better and less environmentally hazardous the gas is. As shown in the table, the GWP of fluoromethane is 92, which is in the same order of magnitude as the GWP of 25 for methane, while the GWP of fluoroethane (one of the hydrofluorocarbon-compressible gases in this invention) is only 12.

In some embodiments, the desirable energy storage devices contain a compressed-gas solvent having the GWP value desirably less than 1,000, preferably less than 100, and even more preferentially less than 20. In some other embodiments, the energy-storage devices containing compressed-gas solvent are well-sealed so that the solvent gas is substantially not leaked into the air, desirably less than 10%, preferably less than 5%, and even more preferably less than 1% of the solvent content per year.

Figure 13:
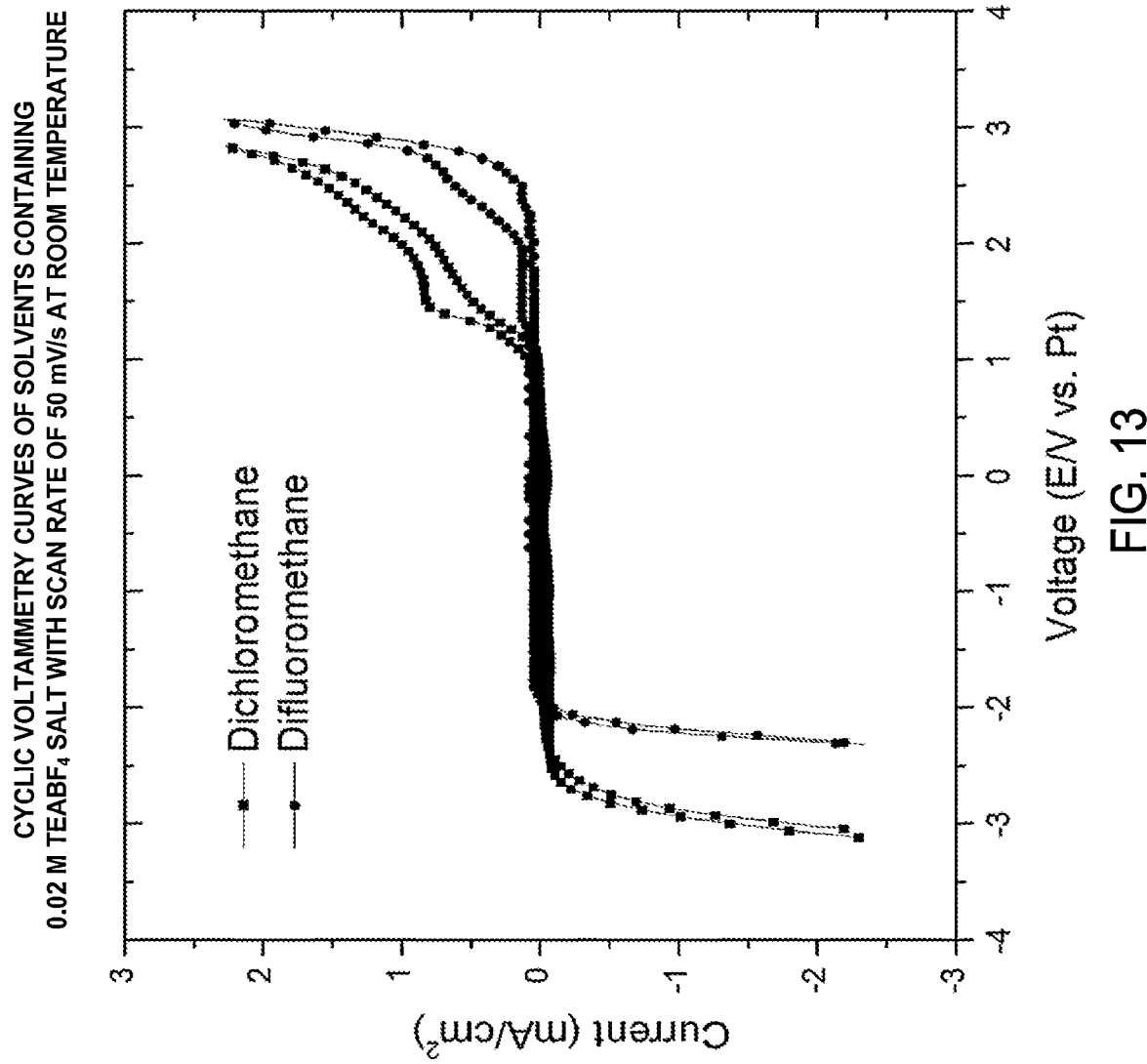
FIG. 13 shows cyclic voltammetry curves of electrolyte systems based on both dichloromethane and difluoromethane solvents containing 0.02 M TEABF4 salt under a scan rate of 50 mV/s at room temperature, in accordance with some embodiments.
Figure 14:
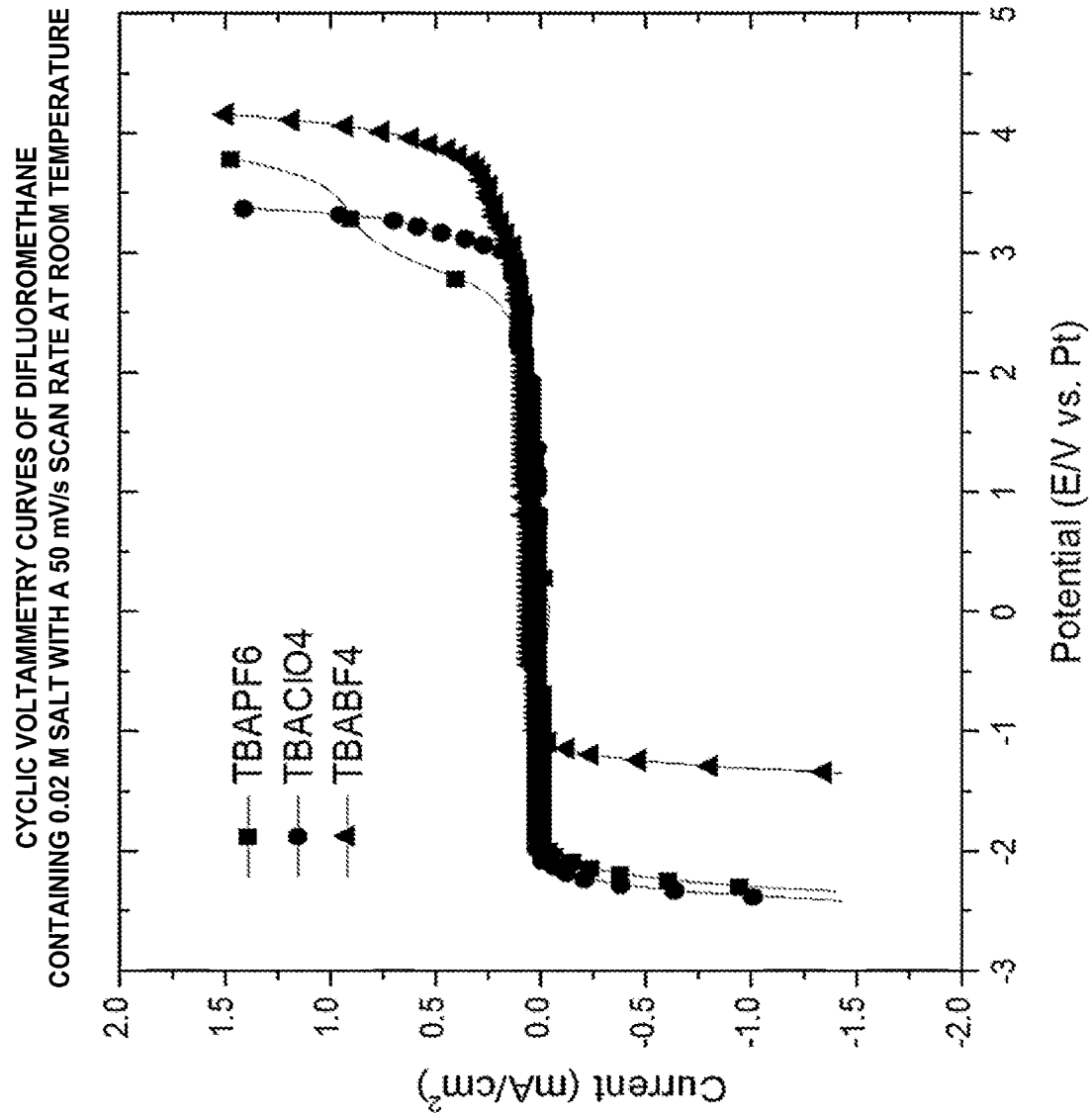
FIG. 14 shows cyclic voltammetry curves of difluoromethane containing 0.02 M of different salts with a scan rate of 50 mV/s at room temperature, in accordance with some embodiments.
Figure 15:
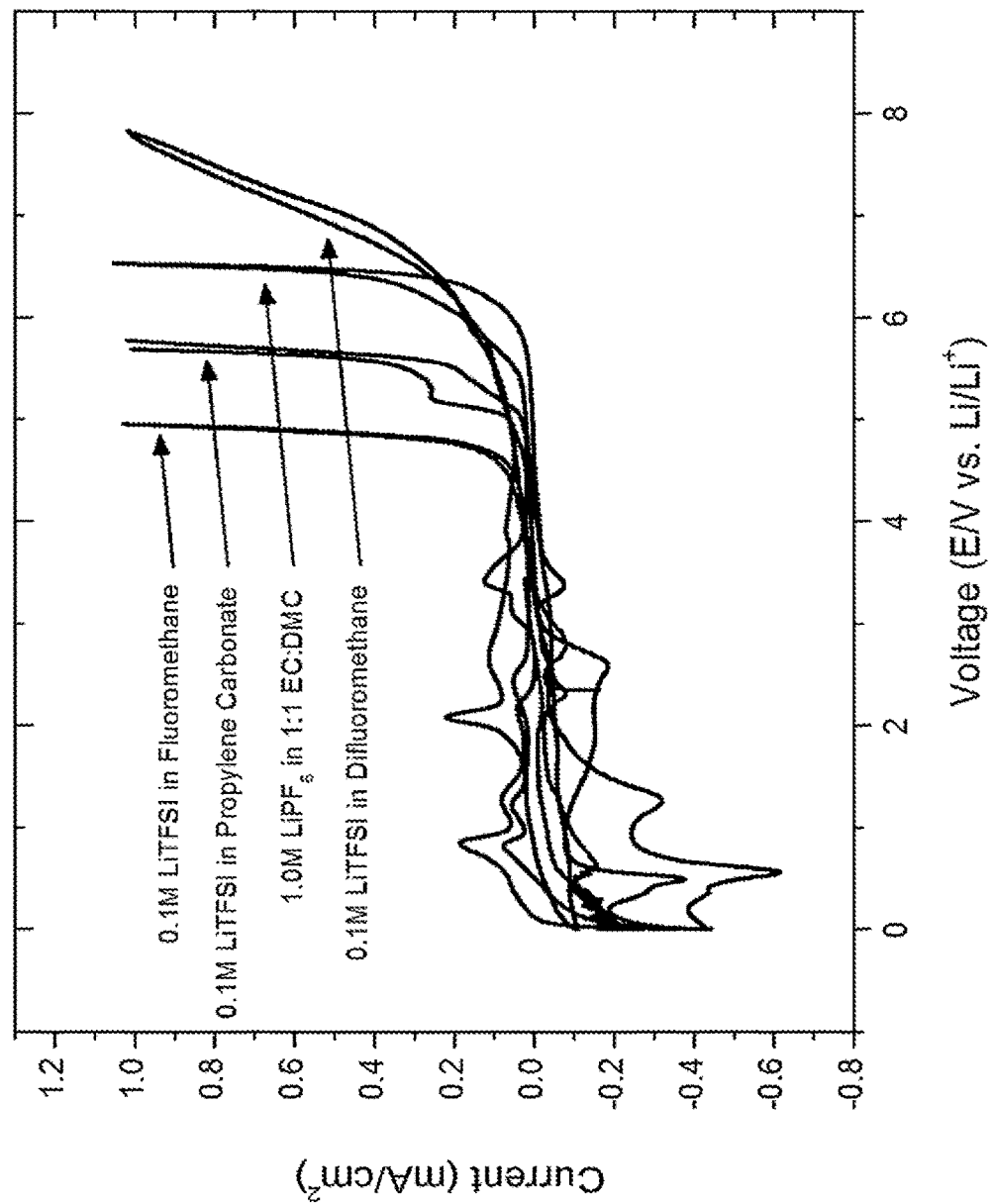
FIG. 15 shows cyclic voltammetry curves for different solvent systems using LiTFSI or LiPF6 based salt with a scan rate of 100 mV/s at room temperature, in accordance with some embodiments.

FIG. 13 shows cyclic voltammetry curves of electrolyte systems based on both dichloromethane and difluoromethane solvents containing 0.02 M TEABF4 salt under a scan rate of 50 mV/s at room temperature in accordance with some embodiments. As can be seen in FIG. 13, though similar in structure, the high electronegativity of the fluorine gives rise to higher oxidation resistance to the solvent, and therefore shifts the oxidation potential (i.e., where the current is reduced to zero) approximately 1 V higher when compared to the oxidation potential of the fluorine-free dichloromethane solvent. These properties can be beneficial in many electrochemical devices requiring a more oxidation-resistant solvent, including batteries, supercapacitors, electroplating systems and sensors. FIG. 14 shows cyclic voltammetry curves of difluoromethane containing 0.02 M of different salts with a scan rate of 50 mV/s at room temperature, in accordance with some embodiments. This plot shows the salt used may have the effect of increasing, decreasing, or shifting the potential window of the compressed gas electrolyte, which exhibits desirable trends for higher potential windows, and higher energy-capacity energy-storage devices. FIG. 15 shows cyclic voltammetry curves for different solvent systems using LiTFSI or LiPF6 based salt with a scan rate of 100 mV/s at room temperature in accordance with some embodiments. It can be observed that a difluoromethane-based system has relatively high oxidation potential compared to other solvent systems, up to approximately 6 V vs. Li/Li+, as shown by the rapid increase in current at 6 V vs a lithium reference. This value shows a desirably widened potential window, according to some embodiments of this patent disclosure, by employing compressed-gas solvent electrolytes. Some oxidation current below this voltage is thought to be due to impurities in the solvent.

In some embodiments, the electrochemical energy-storage device based on Li-ion battery system containing compressed-gas electrolyte exhibits a wider potential window of at least 4.5V, preferably at least 4.8V, even more preferentially at least 5.2V. In some other embodiments, the electrochemical energy-storage device based on supercapacitor structure containing compressed-gas electrolyte exhibits wider potential window of at least 2.8V, preferably at least 3.0V, even more preferentially at least 3.3V.

Figure 16:
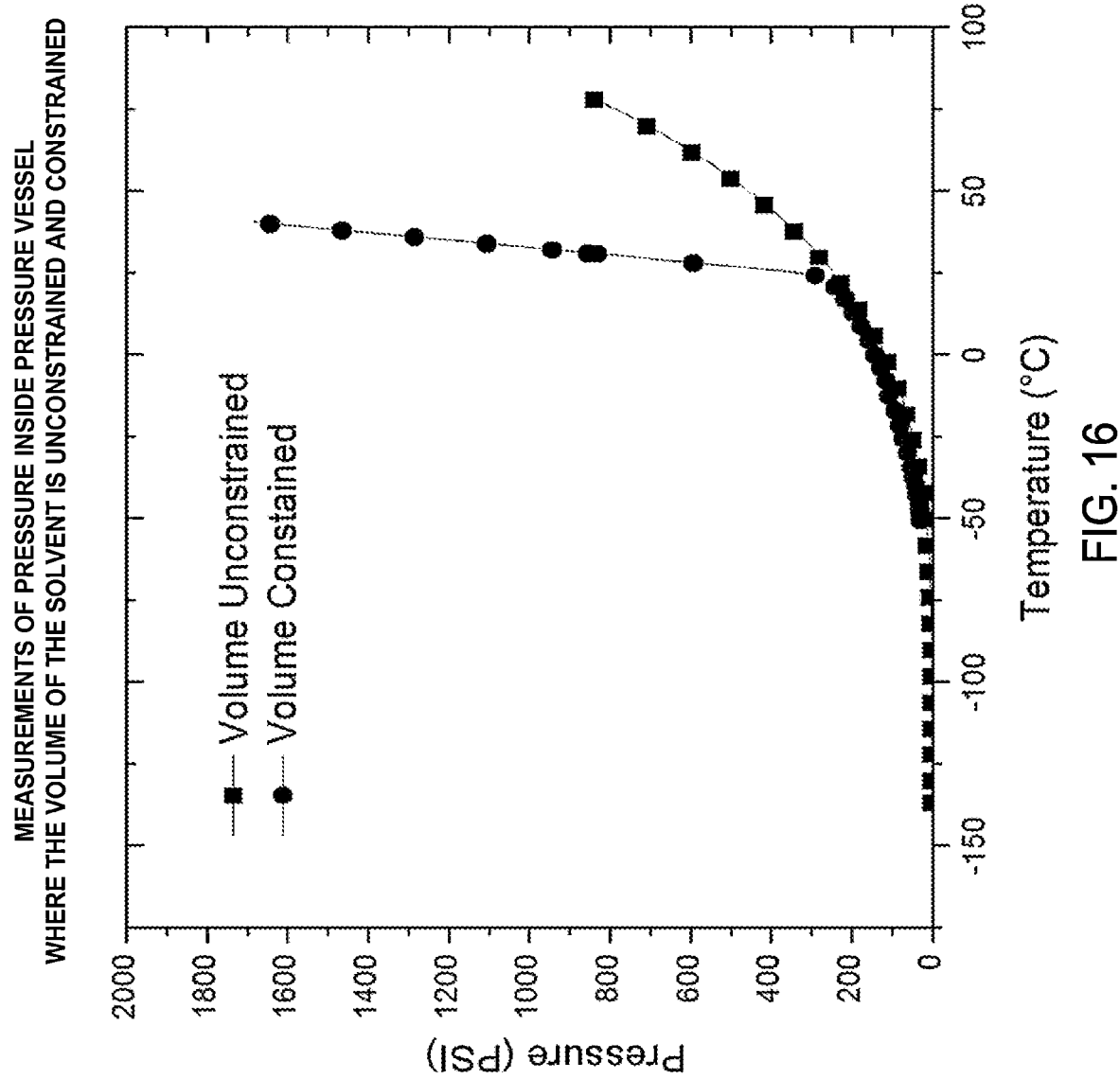
FIG. 16 shows measurements of pressure inside a pressure vessel containing volumes of solvent for both isochoric increase in pressure in a volume-constrained system and a purely vapor pressure-based volume-unconstrained system, in accordance with some embodiments.

If the liquid volume of the compressed-gas solvent expands with temperature and at a certain temperature, is not allowed to further expand, then there is an isochoric (i.e., constant-volume situation, or "volume-constrained") increase in pressure on the system above the solvent's normal vapor pressure. FIG. 16 shows measurements of pressure inside a pressure vessel containing volumes of solvent for both an isochoric increase in pressure in a volume-constrained system and a purely vapor pressure-based volume-unconstrained system, in accordance with some embodiments. As can be seen, in the volume-constrained system (filled circles), when the solvent is not allowed to increase further in volume, the pressure increases rapidly with increasing temperature. Common compressed-gas solvents may suffer from lower conductivity at higher temperatures due to lower ion mobility caused by lower dielectric constant of the solvent and by higher ion-ion interaction.

Figure 17:
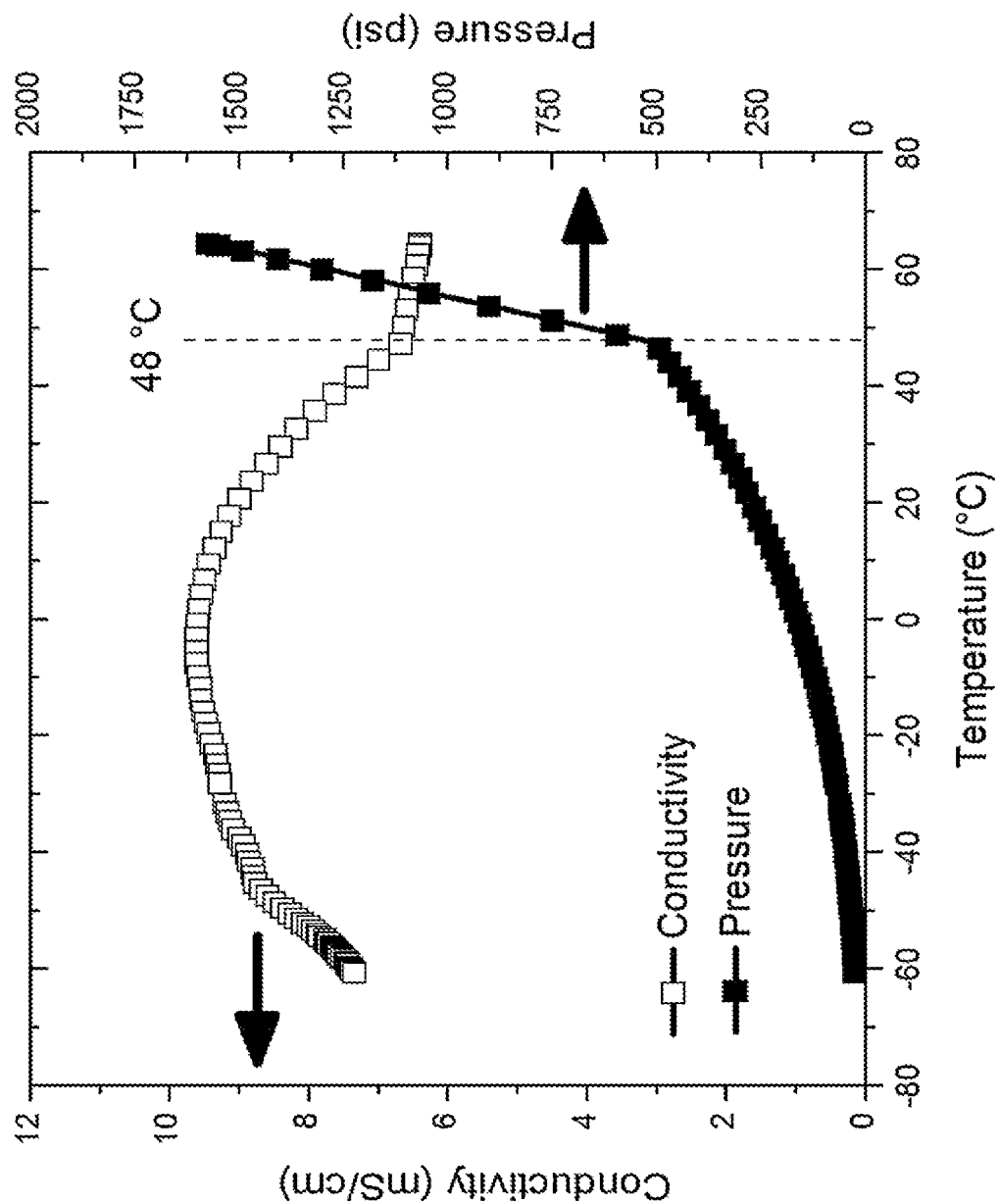
FIG. 17 shows conductivity and pressure vs. temperature measurements of a difluoromethane solvent containing 0.1 M $TBAPF_6$ salt under isochoric increase in pressure of the solvent system, in accordance with some embodiments.

FIG. 17 shows conductivity and pressure vs. temperature measurements of a difluoromethane solvent containing 0.1 M $TBAPF_6$ salt under isochoric increases in pressure of the solvent system, in accordance with some embodiments. As can be seen in FIG. 17, in this system, the difluoromethane solvent is shown to have a sharp increase in pressure due to isochoric increase in solvent pressure at ~48° C., and the conductivity curve is shown to have a sharp change in conductivity (i.e., rapid slowdown of conductivity decreasing rate) at the same temperature. The sudden change in conductivity is thought to be due to an increase in the local dielectric constant of the compressed-gas solvent, which may decrease the ion-ion interaction and increase ionic conductivity. This technique of utilizing isochoric increase in pressure may be optimized to provide a higher-conducting electrolyte over a wide temperature range, or at least minimize the loss of conductivity at higher temperature. Hence, this described isochoric increase in pressure and its associated conductivity enhancement is another aspect of the disclosed technology, which can be exploited for improvement of battery and supercapacitor performances through optimal design and pressure control in the compressed-gas solvent chamber.

Figure 18:
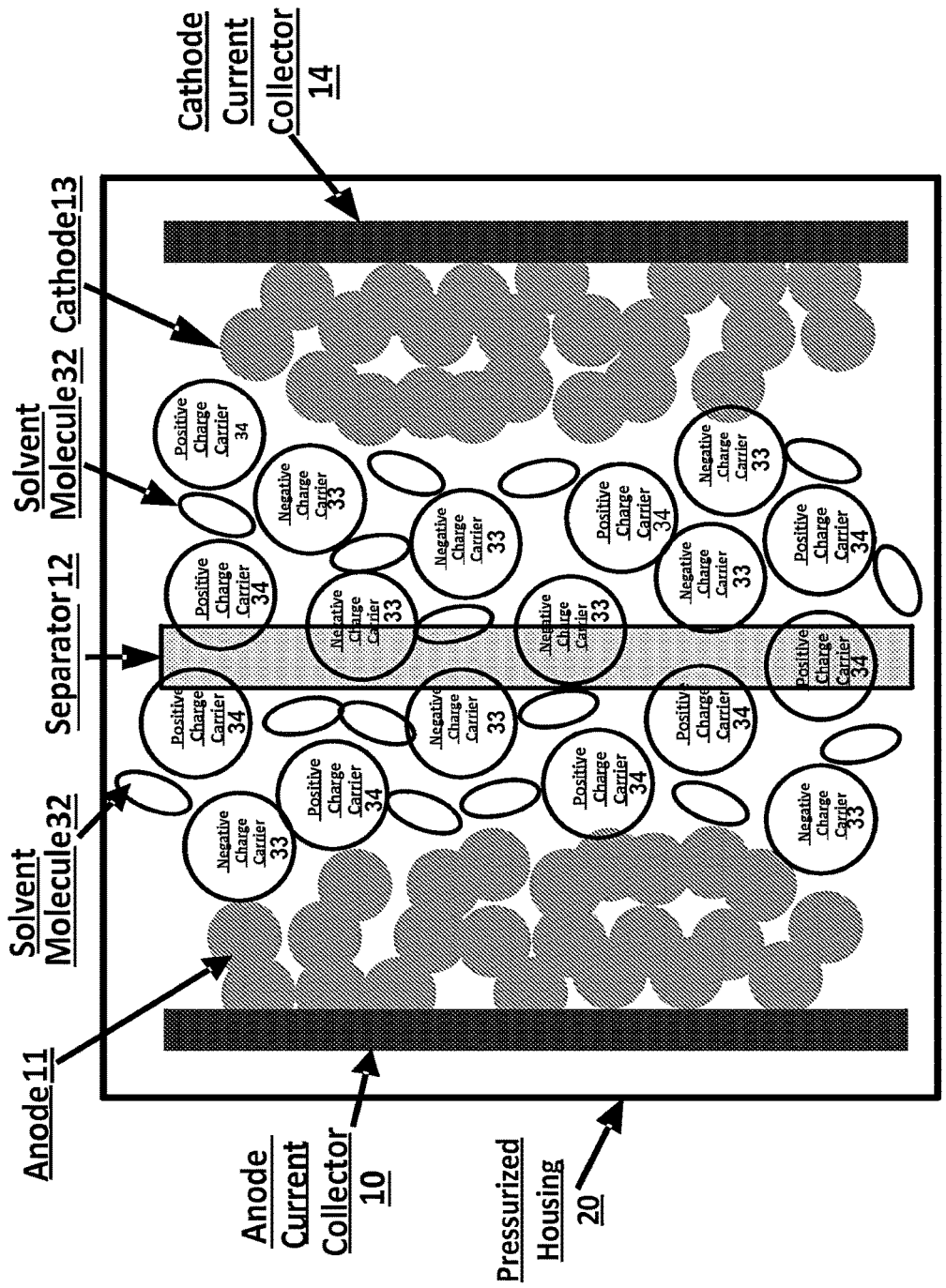
FIG. 18 illustrates an ionically-conducting electrolyte composed of a mixture of salt and solvent inside a pressurized housing to form an electrochemical cell, in accordance with some embodiments.

FIG. 18 illustrates an ionically-conducting electrolyte composed of a mixture of salt and solvent inside a pressurized housing to form an electrochemical cell 40, in accordance with some embodiments. As can be seen in FIG. 18, the ionically-conducting electrolyte includes negative-charge carriers 33 and positive-charge carriers 34 of one or more types of salt surrounded by solvent molecules 32 of a compressed-gas solvent. This compressed-gas solvent is in the gas phase and has a vapor pressure above an atmospheric pressure at room temperature. The electrochemical cell 40 also includes a pressured housing 20 that encloses solvent molecules 32, negative-charge carriers 33 and positive-charge carriers 34, and is structured to provide a pressurized condition to the compressed-gas solvent. The electrochemical cell 40 also includes a pair of conducting electrodes in contact with the ionically-conducting electrolyte. The pair of conducting electrodes further includes a negative-current collector 10, negative-electrode material 11, ionically-conducting porous separator 12, positive-electrode material 13, and positive-current collector 14. The electrode materials 11 and 13 may vary among different battery and electrochemical capacitor systems, but they are typically materials which allow for a high degree of lithium intercalation for use in lithium batteries and high-surface area carbon electrodes in electrochemical capacitors.

Because the performance of electrochemical devices such as supercapacitors and Li-ion batteries are dependent on total surface area of the electrodes, it is highly desirable to incorporate large-surface-area structures, e.g., by utilizing nanostructured anodes and cathodes. In addition to the increased total surface area, nanostructured electrode materials can also offer more robust mechanical properties to accommodate strains and stresses, for example with significant volume changes occurring as Li atoms are intercalated in and out of the electrodes during charge-discharge cycling. In some exemplary electrochemical devices based on compressed-gas solvent electrolytes, the desired electrode structures have a large surface area, with the surface area being at least 100 $m^2/g$, preferably at least 500 $m^2/g$, and even more preferably at least 2,000 $m^2/g$. The surface areas of the electrode structures can be determined by well-known Brunauer-Emmett-Teller (BET) surface area analysis utilizing the measurements of gas adsorption. In some embodiments, an exemplary electrochemical device of FIG. 18 uses an electrochemically active polymer or metal oxide for one or both negative-electrode material 11 and positive-electrode material 13.

In the embodiments where a nanostructured electrode configuration is desired, the exemplary supercapacitors and batteries can optionally have nanostructures selected from nanofibers, nanopillars, nanoparticle aggregates, nanoporous structures, or combinations of the above. The configuration can feature a dimension of diameter or pore-size less than 500 nm, preferably less than 50 nm, and even more preferably less than 5 nm. In some embodiments, the preferable dimension is about 1 nm, with the pore-size being made similar in size to that of the unsolvated ions in the electrolyte.

Figure 19:
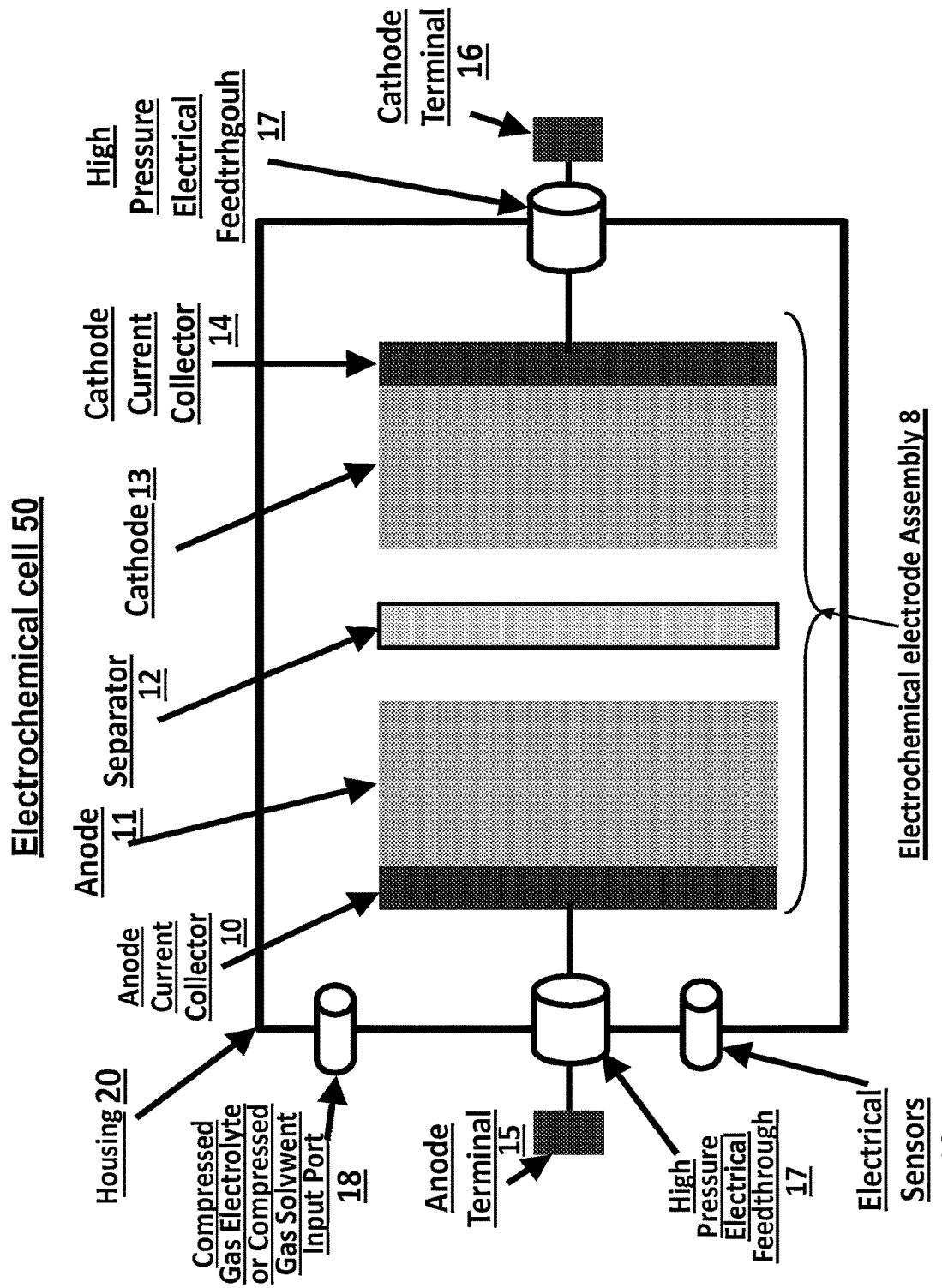
FIG. 19 illustrates an electrochemical electrode assembly being packaged inside a device package to form an electrochemical cell, in accordance with some embodiments.

FIG. 19 illustrates an electrochemical electrode assembly 8 being packaged inside a device package to form an electrochemical cell 50, in accordance with some embodiments. As can be seen in FIG. 19, the electrochemical electrode assembly 8 comprising an anode-current collector 10, an anode-electrode material 11, a separator 12, a cathode-electrode material 13, and cathode-current collector 14. The electrochemical electrode assembly 8 is placed inside a device package to make handling easier. The device package further includes a negative (anode) terminal 15 and a positive (cathode) terminal 16 electrically coupled to the respective current collectors 10 and 14 through a mechanical device housing 20. The electrical terminals 15 and 16 can pass through electrically-insulating or electrically-conducting feedthroughs 17. The housing 20 may be metallic or insulating, or metallic with an insulating inner and/or outer surface. When used with compressed-gas solvents, it is desirable that the housing 20 be rigid enough to safely contain the high-pressure electrolyte (i.e., housing 20 being a high-pressure housing). Also located within the device package is a port 18, through which a compressed-gas solvent or a compressed-gas electrolyte can be filled into the device. In some embodiments, there is also a second port, through which it is possible to purge the electrochemical cell 50, or to completely fill the cell with no trapped gas. Further, within the electrochemical cell 50 there can be a sensor or group of sensors 19 to determine the environment and conditions of the cell assembly such as pressure, temperature, solvent level, voltage, charge capacity, or other quantities that may be useful to monitor.

Figure 20:
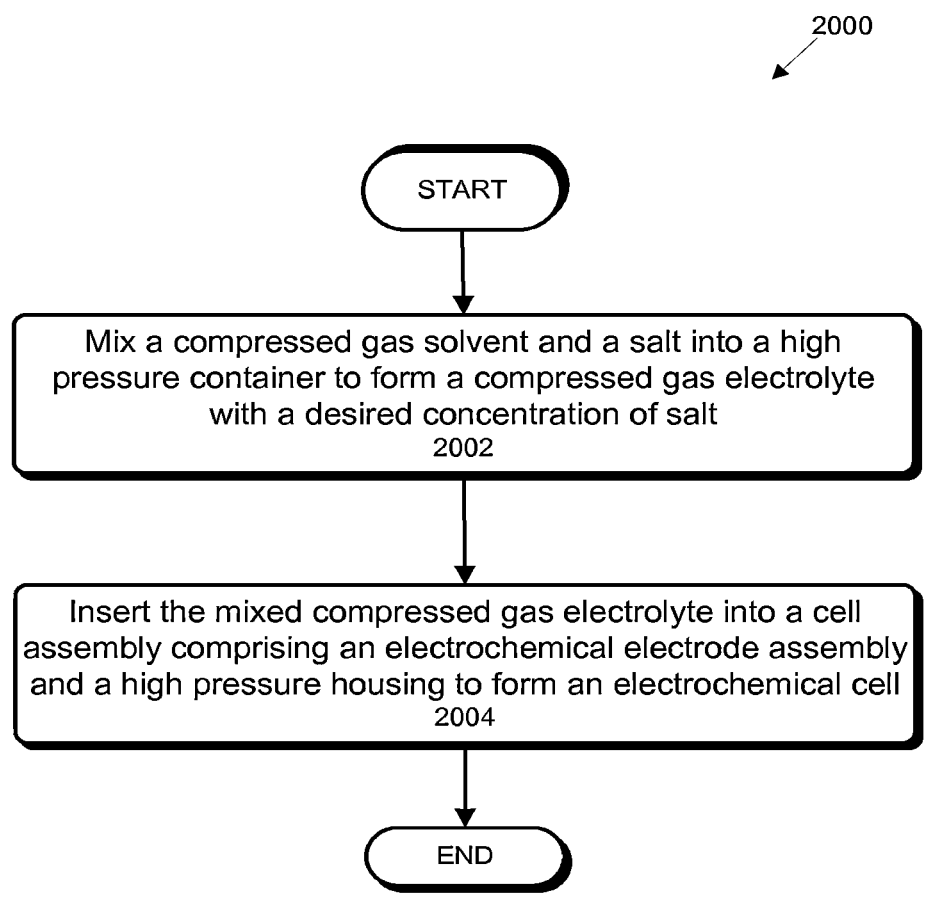
FIG. 20 presents a flowchart illustrating a process of filling the electrochemical electrode assembly and housing, such as the one described in FIG. 19 with a compressed gas electrolyte, in accordance with some embodiments.

FIG. 20 presents a flowchart illustrating a process 2000 of filling the electrochemical electrode assembly and housing, such as the one described in FIG. 19 with a compressed-gas electrolyte, in accordance with some embodiments. One may first mix a compressed-gas solvent and a salt into a high-pressure container to form a compressed-gas electrolyte with a desired concentration of salt (2002). Then, the mixed compressed-gas electrolyte is inserted into an electrochemical cell assembly comprising an electrochemical electrode assembly and a high-pressure housing, thereby forming an operating electrochemical cell (2004).

Figure 21:
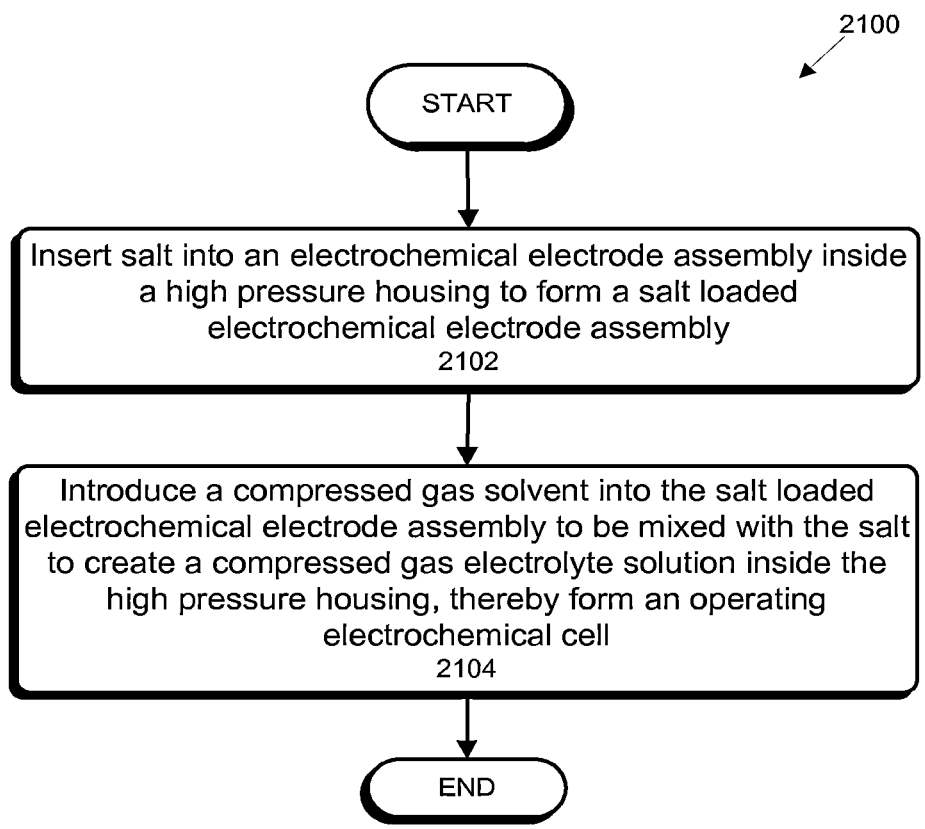
FIG. 21 presents a flowchart illustrating another process of filling the electrochemical electrode assembly and housing, such as the one described in FIG. 19, with a compressed-gas electrolyte solution in accordance with some embodiments.

FIG. 21 presents a flowchart illustrating another process 2100 of filling the electrochemical electrode assembly and housing, such as the one described in FIG. 19 with a compressed-gas electrolyte, in accordance with some embodiments. In this technique, a salt is first inserted into an electrochemical electrode assembly inside the rigid housing to form a salt-loaded electrochemical electrode assembly (2102). Next, a compressed-gas solvent is introduced into the salt-loaded electrochemical electrode assembly to be mixed with the salt to create the compressed-gas electrolyte inside the rigid housing, thereby forming an operating electrochemical cell (2104). Note that in both techniques 2000 and 2100, introducing the compressed-gas electrolyte or the compressed-gas solvent into the electrochemical electrode assembly may be aided by the use of a temperature differential between the compressed-gas electrolyte or the compressed-gas solvent and the respective electrochemical electrode assembly.

Example #1

Multiple electrochemical cells containing compressed gas solvent-based electrolytes created by process 2100 are assembled into batteries and electrochemical double layer capacitors, and their properties are evaluated.

Figure 22:
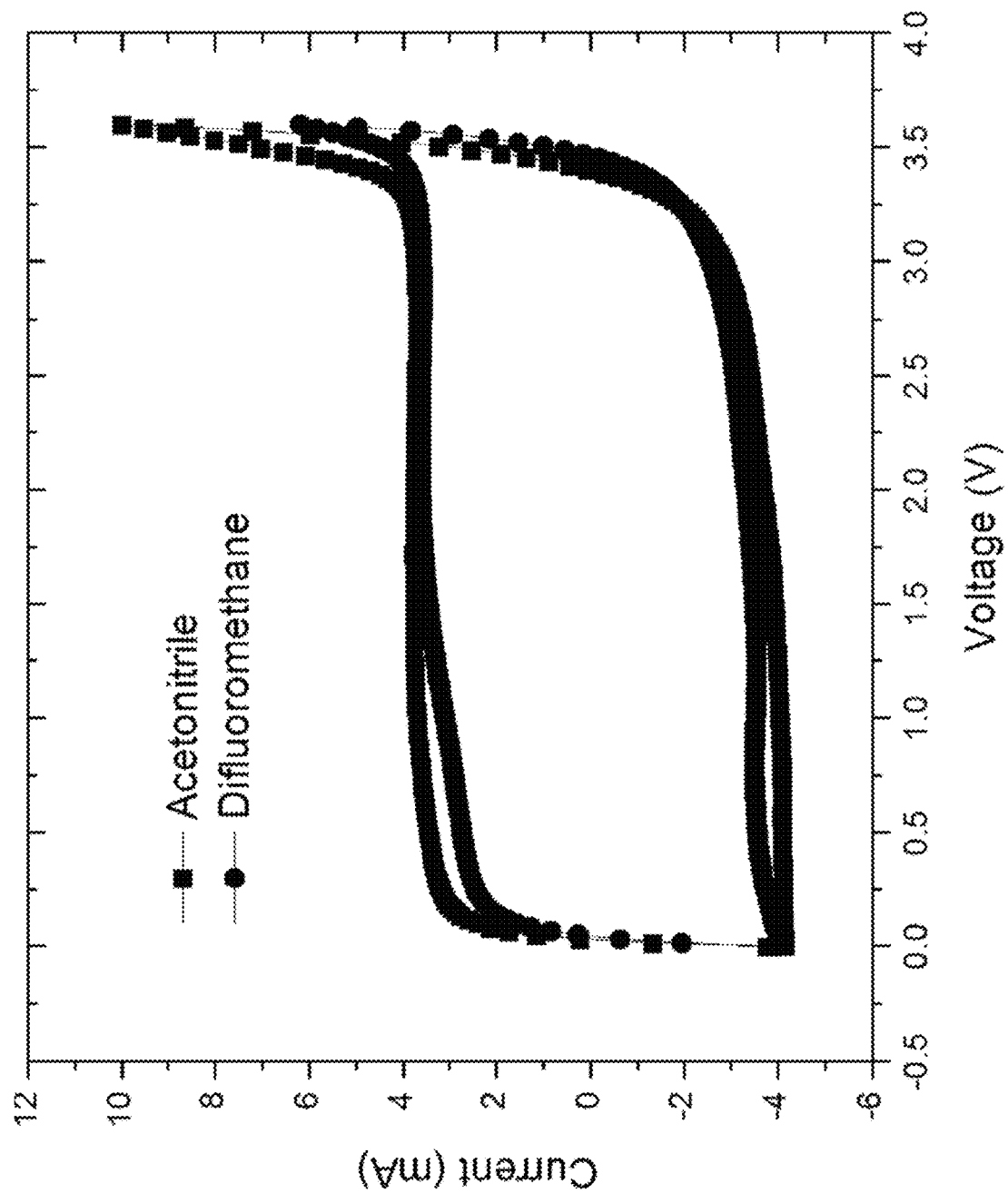
FIG. 22 shows cyclic voltammetry curves of two electrochemical double-layer capacitors with equal mass electrodes using different solvents containing 0.5 M TBAPF6 salt measured at room temperature with a scan rate of 10 mV/s in accordance with some embodiments.

FIG. 22 shows cyclic voltammetry curves of double-layer capacitor devices using different solvents containing 0.5 M TBAPF6 salt measured at room temperature with a scan rate of 10 mV/s, in accordance with some embodiments.

FIG. 22 shows cyclic voltammetry curves of two electrochemical double-layer capacitors with equal-mass electrodes using different solvents containing 0.5 M TBAPF6 salt measured at room temperature with a scan rate of 10 mV/s, in accordance with some embodiments. More specifically, one device is filled with a compressed-gas electrolyte with a difluoromethane solvent and 0.5 M TBAPF6 salt, and the other device with an acetonitrile solvent with 0.5 M TBAPF6 salt. The very similar shapes of the cyclic voltammetry curves and charge discharge currents indicate similar capacitances and resistances in both devices.

Figure 23:
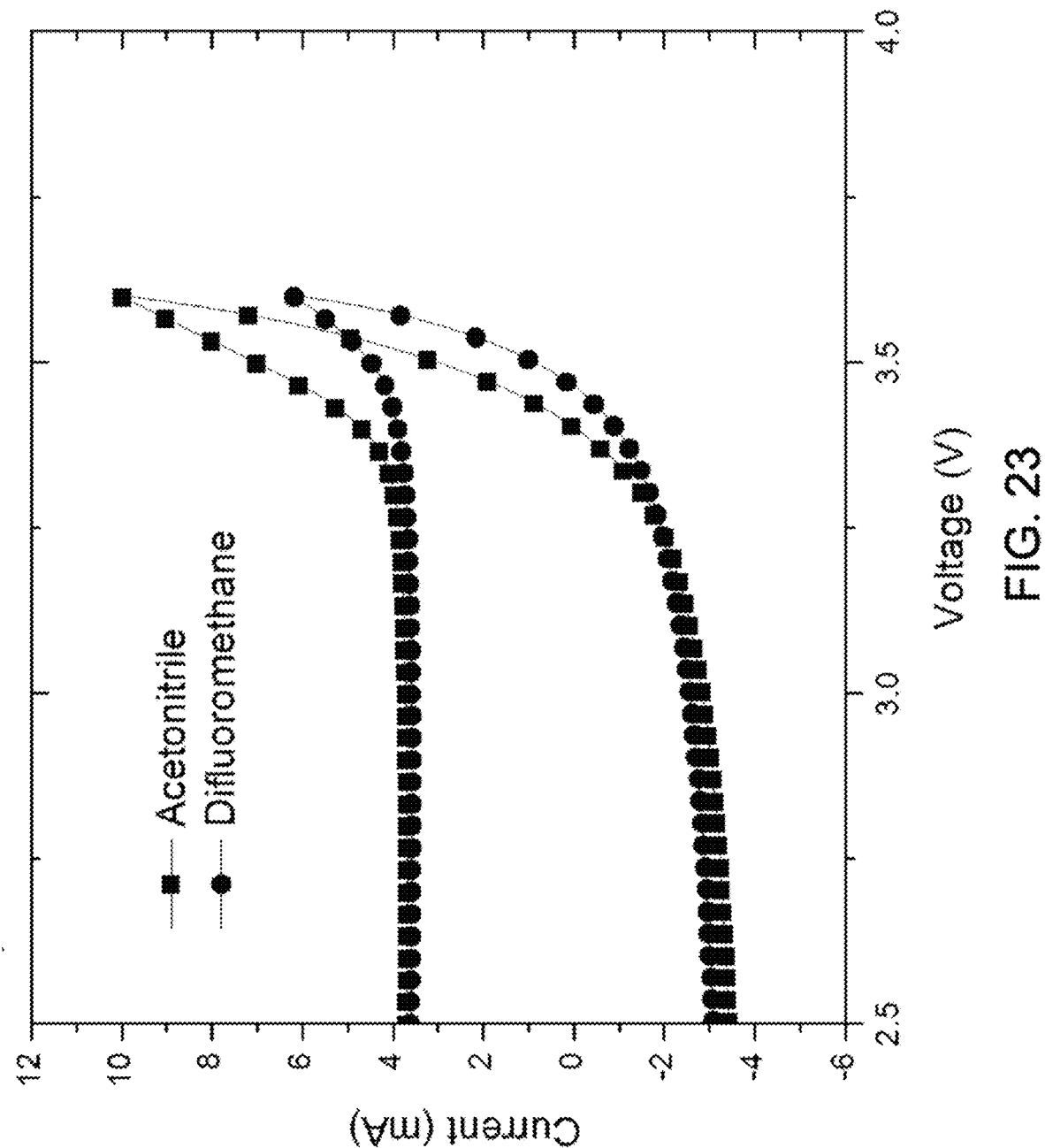
FIG. 23 shows a zoomed-in view of the cyclic voltammetry curves in FIG. 22, in accordance with some embodiments.

FIG. 23 shows a zoomed in view of the cyclic voltammetry curves in FIG. 22, in accordance with some embodiments. As can be seen in FIG. 23, the acetonitrile-based device begins to show high electrolyte decomposition at about 3 V, while the difluoromethane device begins to show high electrolyte decomposition at about 3.3 V. These high-potential windows indicate that these devices can operate with desirably higher working voltages due to the used of compressed gas solvent-based electrolytes.

Higher voltage supercapacitors provide higher energy-storage capability as the amount of energy stored is generally proportional to the square of the operational voltage. For example, comparing with conventional supercapacitors having a standard 2.7V operation voltage, the disclosed compressed gas electrolyte-based supercapacitors shown in FIG. 22 operable at 3.3 V would provide $[3.3^2/2.7^2] \times 100 = \sim 50\%$ increase in supercapacitor energy storage capability. In some embodiments, the disclosed supercapacitors having compressed gas solvent-based electrolyte is capable of higher operating voltage of at least 3V, preferably at least 3.2V, even more preferably at least 3.5V, with corresponding increase of energy-storage capability of ~23%, ~40%, ~68%, respectively.

Figure 24:
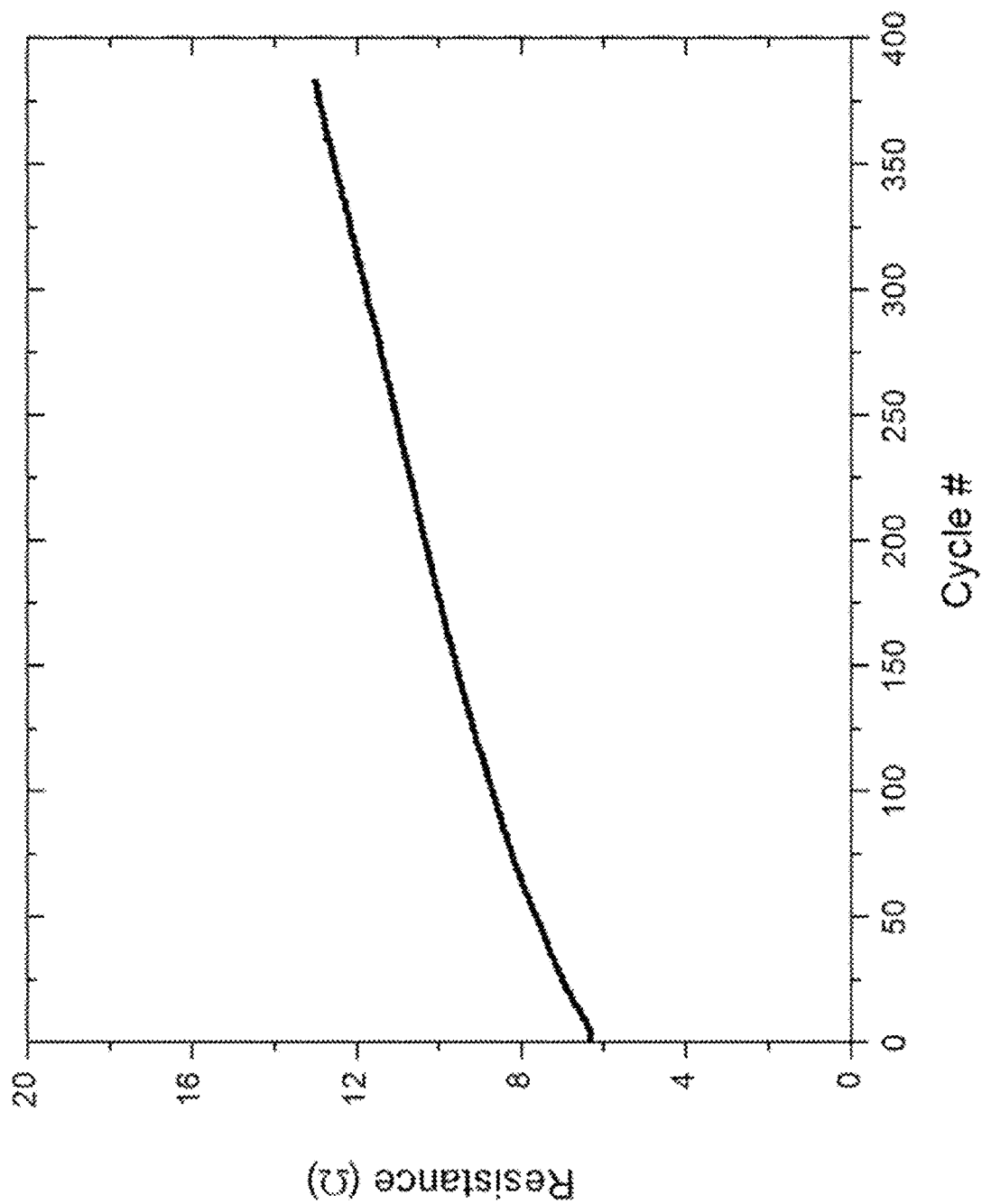
FIG. 24 shows the resistance vs. cycle number curve of the double-layer capacitor device containing difluoromethane and 0.5 M TBABF4 salt held at 3V for 1 hour at room temperature, in accordance with some embodiments.
Figure 25:
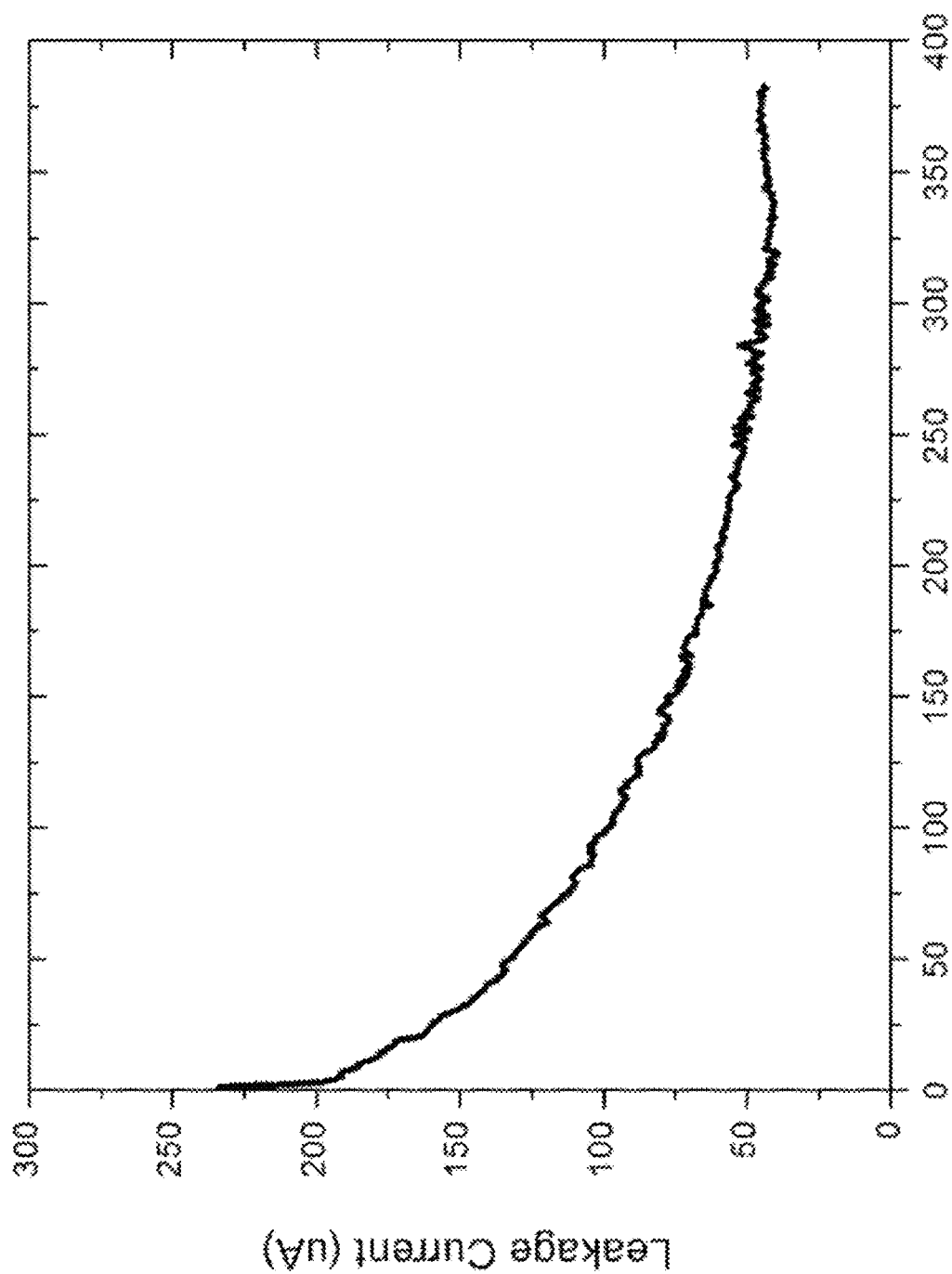
FIG. 25 shows the leakage current vs. cycle number curve of the double-layer capacitor device containing difluoromethane and 0.5 M TBABF4 salt held at 3V for 1 hour at room temperature, in accordance with some embodiments.
Figure 26:
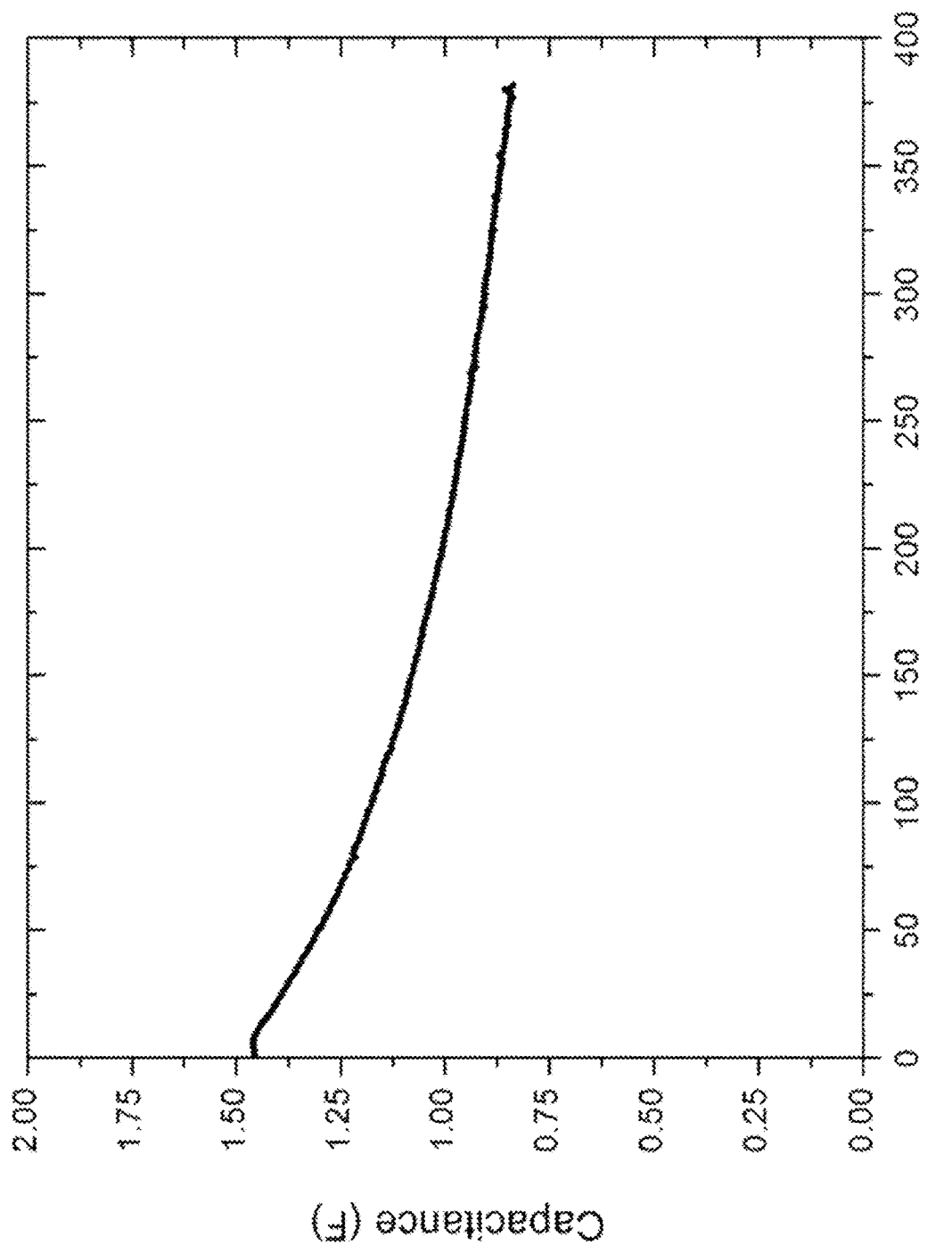
FIG. 26 shows the capacitance vs. cycle number curve of the double-layer capacitor device containing difluoromethane and 0.5 M TBABF4 salt held at 3V for 1 hour at room temperature, in accordance with some embodiments.
Figure 27:
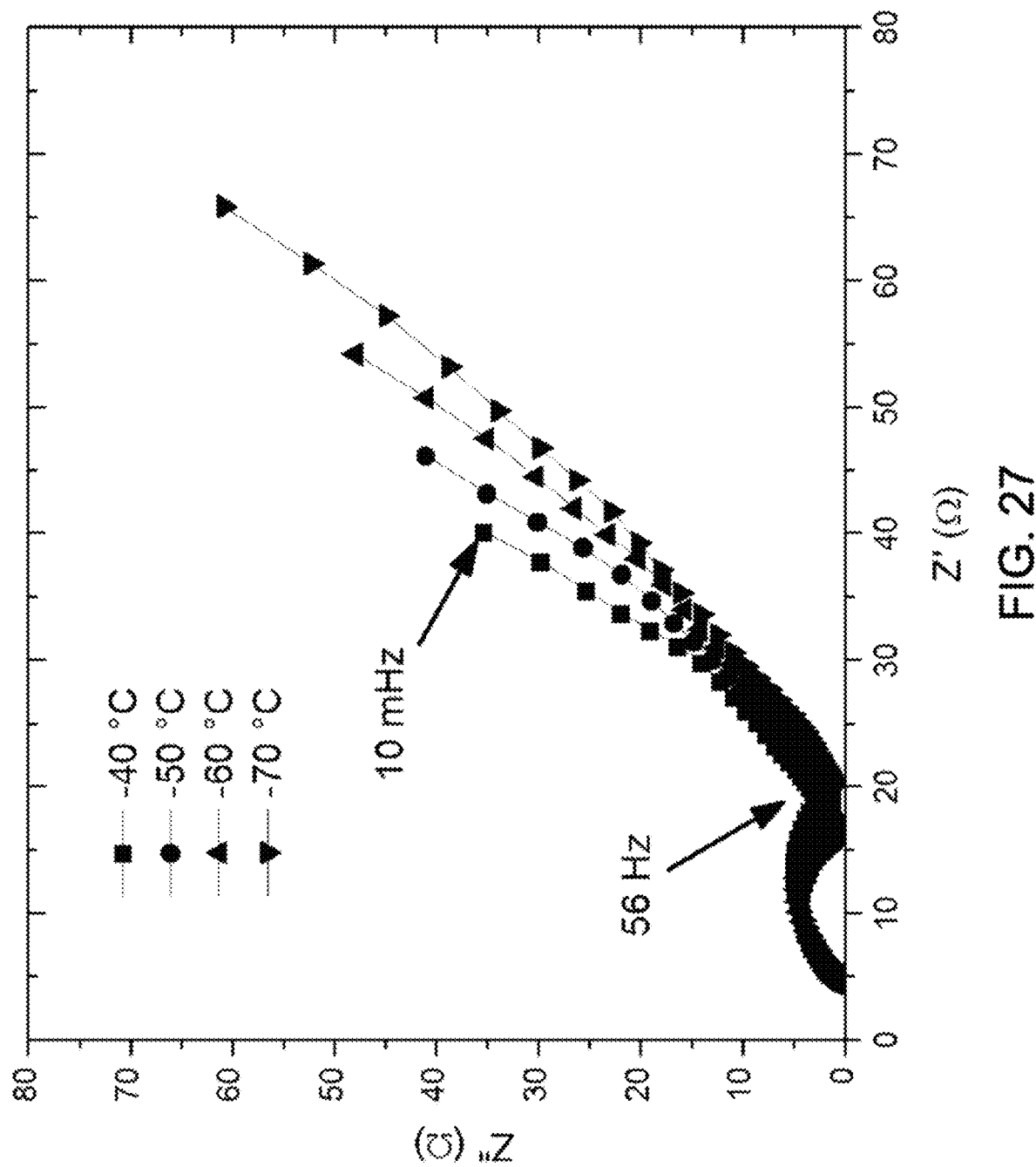
FIG. 27 shows the impedance spectra of the double-layer capacitor device containing difluoromethane and 0.5 M TBABF4 salt held at 3V for 1 hour at low temperatures, in accordance with some embodiments.

Another exemplary electrochemical supercapacitor composed of a compressed-gas electrolyte containing difluoromethane and 0.5 M TBABF4 salt was constructed and tested by charging at 20 mA to 3 V, held at 3 V for one hour, and discharged to 0 V at 20 mA rate at room temperature. FIG. 24 shows the resistance vs. cycle number curve of the double-layer capacitor device containing difluoromethane and 0.5 M TBABF4 salt, in accordance with some embodiments. As can be seen in FIG. 24, resistance value increases with the number of cycles. FIG. 25 shows the leakage current vs. cycle number curve of the same device containing difluoromethane and 0.5 M TBABF4 salt, in accordance with some embodiments. As can be seen in FIG. 25, resistance value decreases and stabilizes after about 300 cycles. FIG. 26 shows the capacitance vs. cycle number curve of the same device containing difluoromethane and 0.5 M TBABF4 salt, in accordance with some embodiments. As can be seen in FIG. 26, the capacity of the same device decreases over an increasing cycle number. The declining capacity and increasing resistance are thought to be due to impurities in the electrolyte, which are known to be detrimental to cell performance. This exemplary supercapacitor device was not optimized in terms of materials, structures and assembly methods, thus showing some increase in resistance and some current leakage. However, the data shown in FIGS. 24-26 clearly demonstrate the principle that the compressed gas electrolyte-based supercapacitor functions in cycling operations. FIG. 27 shows the impedance spectra of the same device at low temperatures, in accordance with some embodiments. The semi-circle portion of the curves is due primarily to the electrical resistance within the carbon electrodes, and it remains relatively unchanged with decreasing temperature. The low-frequency portion of the curves is primarily a measure of the electrolyte diffusion-resistance and is seen to increase in resistance at lower temperature, as expected with lower mobility of ions in the electrolyte. While existing supercapacitors based on an acetonitrile solvent have difficulties in operating at temperatures below −40° C., the disclosed difluoromethane-based electrolyte allows operation at temperatures as low as −70° C.

Figure 28:
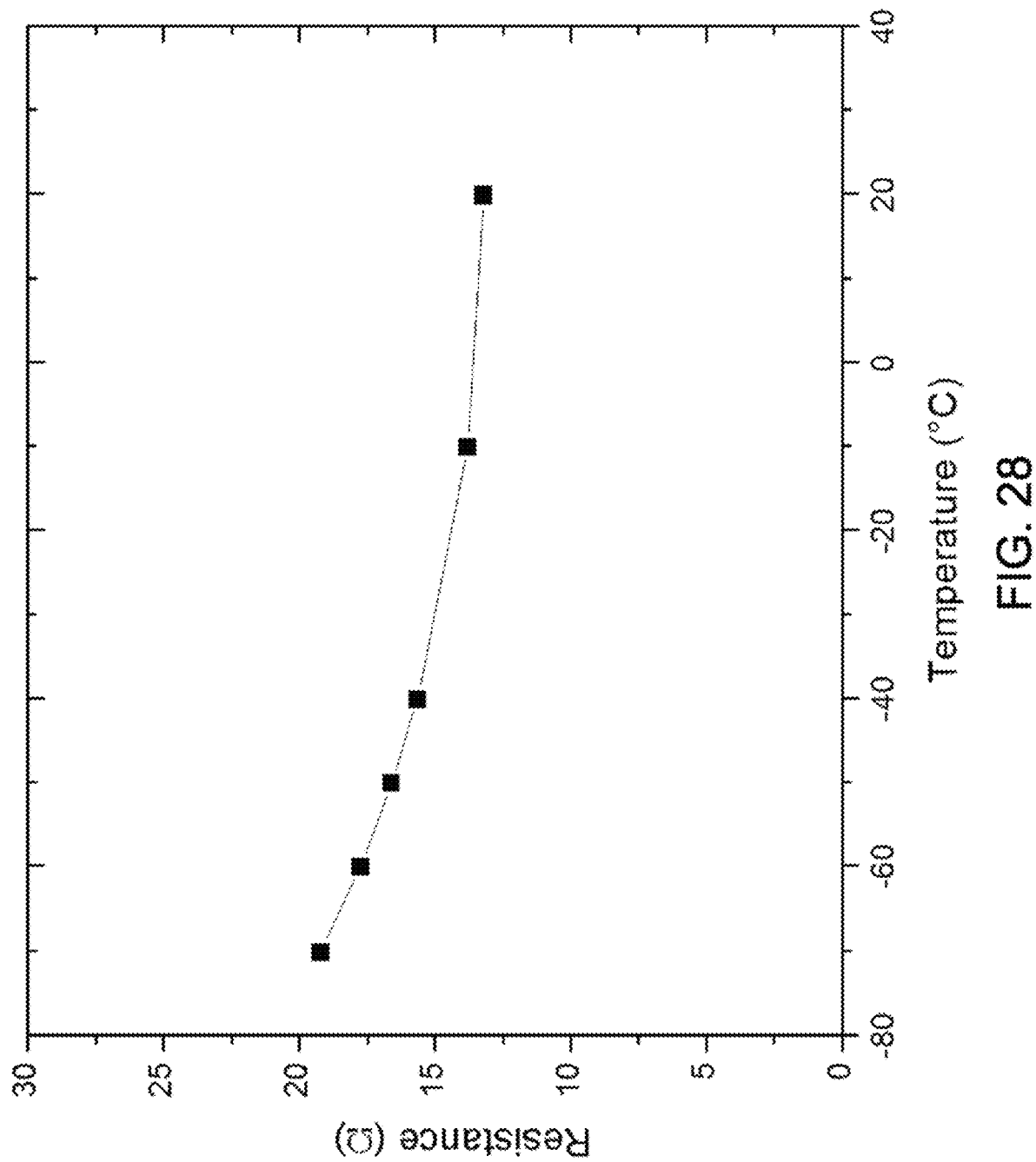
FIG. 28 shows the resistance vs. temperature curve of the double-layer capacitor device containing difluoromethane and 0.5 M TBABF4 salt held at 3V for 1 hour at various temperatures, in accordance with some embodiments.
Figure 29:
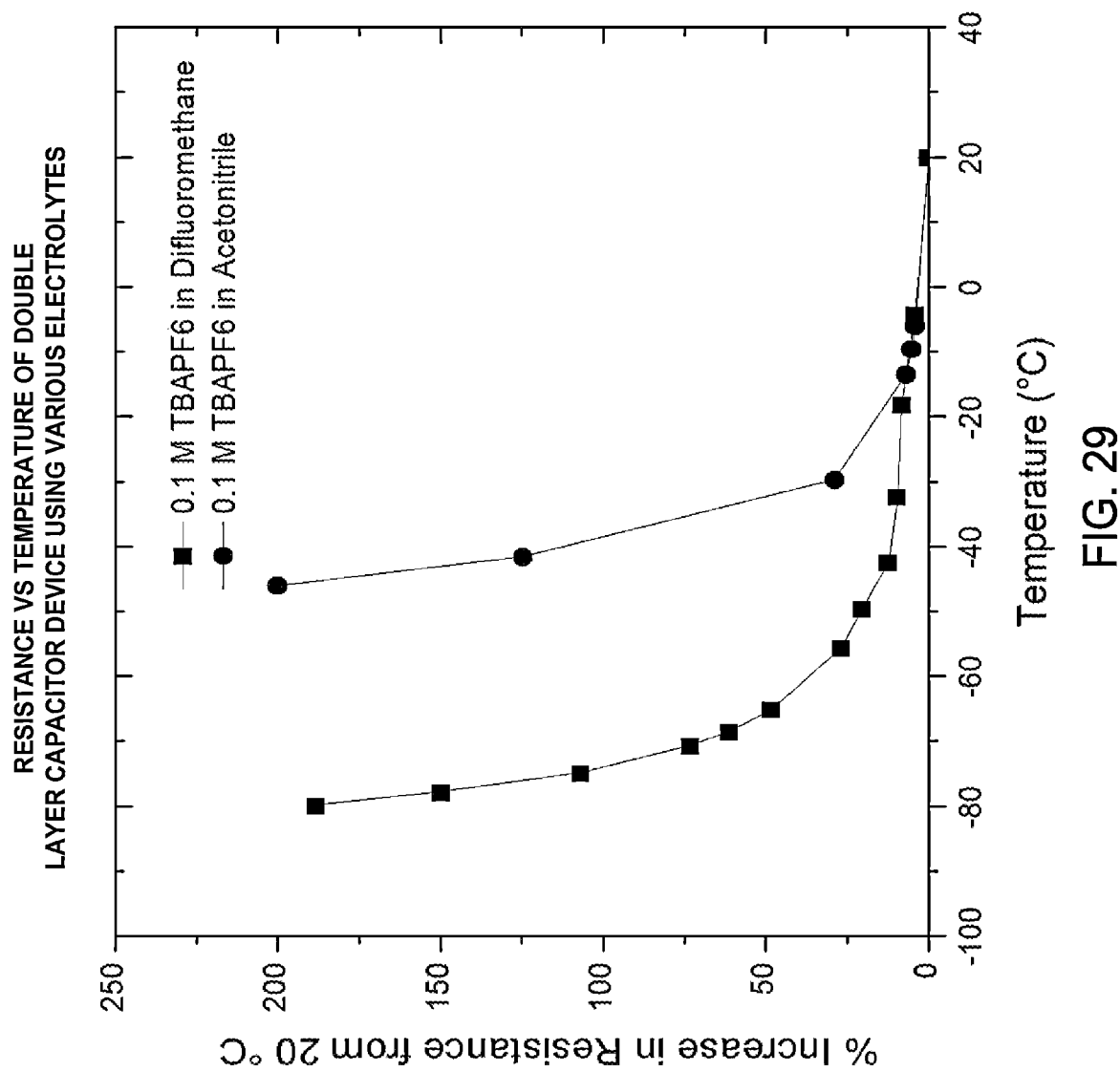
FIG. 29 shows percent increase in resistance (%) vs. temperature curves of double-layer capacitor devices using difluoromethane and acetonitrile-based electrolytes, in accordance with some embodiments.

FIG. 28 shows the resistance vs. temperature curve of the same device, in accordance with some embodiments. As can be seen in FIG. 28, the resistance value increases approximately 40% from room temperature to −70° C. FIG. 29 shows increase in resistance (%) vs. temperature curves of double-layer capacitor devices using difluoromethane and acetonitrile-based electrolytes, in accordance with some embodiments. As can be seen in FIG. 29, the acetonitrile-based devices start increasing in resistance considerably at −40° C., while the disclosed difluoromethane-based devices continue to operate well down to −70° C. This difference in difluoromethane-based devices is a significant improvement over the existing devices and can be very useful in applications requiring low-temperature operation of electrochemical energy-storage devices. The operability of supercapacitors at a low temperature well below −40° C. is highly desirable, for example, for the operation of automobiles, aerospace transportations, military equipment in cold weather regions, in the high-altitude atmosphere, and so forth.

Hence, the disclosed supercapacitor devices based on compressed-gas electrolytes enable high-performance supercapacitor operation at temperatures below −20° C., more preferably below −40° C., even more preferably below −60° C.

Among the existing supercapacitors, acetonitrile solvent-based supercapacitors are considered to be state-of-the-art supercapacitors in terms of supercapacitor performance, though it is not widely used for critical applications due to possible flammability and other issues. FIG. 22 shows exemplary cyclic voltammetry curves of electrochemical double-layer capacitor devices using acetonitrile solvent vs using compressed-gas solvent difluoromethane at room temperature. It can be seen that the two types of solvents offer comparable voltammetry performances, indicating the feasibility of constructing supercapacitors based on compressed-gas solvent. The tail portion of the cyclic voltammetry curves in FIG. 22 near the higher side voltage was expanded and shown in FIG. 23. It can be seen that the compressed gas solvent-based supercapacitor exhibits cyclic voltammetry curves that extend further toward higher voltages than does the acetonitrile-based supercapacitor.

Example #2

Figure 30:
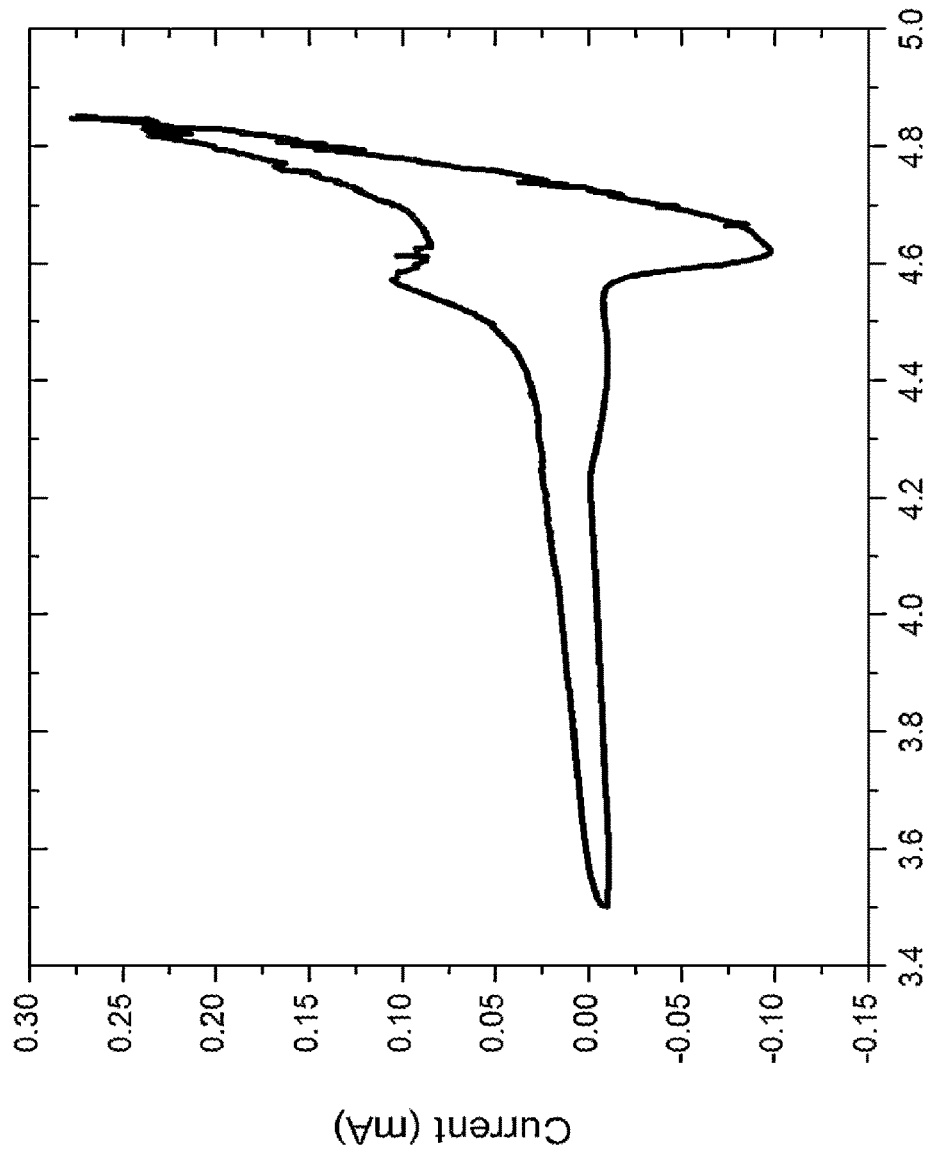
FIG. 30 shows a cyclic voltammetry curve of the battery device using a fluoromethane compressed-gas solvent containing 0.1 M LiTFSI salt measured with a sweep rate of 0.03 mV/s at room temperature, in accordance with some embodiments.
Figure 31:
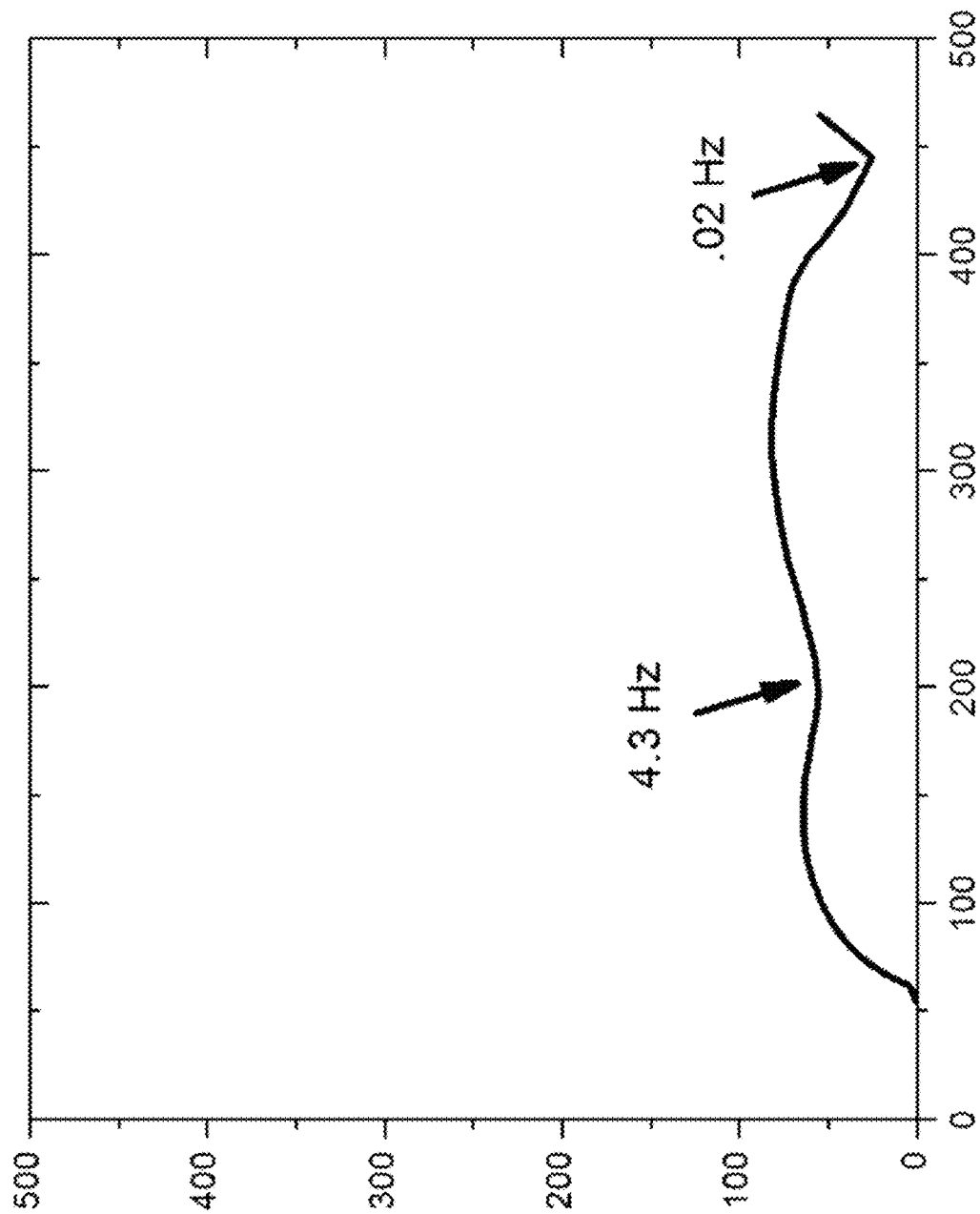
FIG. 31 shows an impedance spectrum of a battery using fluoromethane compressed-gas solvent containing 0.1 M LiTFSI salt with an LMNO positive electrode and a lithium metal negative electrode (i.e., the same device as in FIG. 30) measured at room temperature, in accordance with some embodiments

A device composed of a lithium-metal negative electrode and lithium-nickel-manganese oxide (LMNO) positive electrode was assembled with 0.1 M LiTFSI salt solvated in a fluoromethane compressed-gas solvent to form an electrochemical lithium-based battery device. FIG. 30 shows a cyclic voltammetry curve of the battery device using fluoromethane compressed-gas solvent containing 0.1 M LiTFSI salt, measured with a sweep rate of 0.03 mV/s at room temperature, in accordance with some embodiments. As can be seen in FIG. 30, the first oxidation peak and the reduction peak indicate lithium intercalation into and out of the LMNO positive electrode, respectively. Although the Li-ion battery structure tested was not optimized in terms of construction and performance, this cyclic voltammogram demonstrates that a working Li-ion battery device using a compressed-gas electrolyte system is feasible. FIG. 31 shows an impedance spectrum of the same device as in FIG. 30, in accordance with some embodiments. As can be seen in FIG. 31, the high-frequency circle shows the impedance of what is considered to be a surface-electrolyte interface on the positive and negative electrode, and the medium-frequency semicircle shows what is considered to be charge-transfer resistance within the electrode. The low-frequency straight line shows the Wardburg diffusion resistance of ions' movement.

Figure 32:
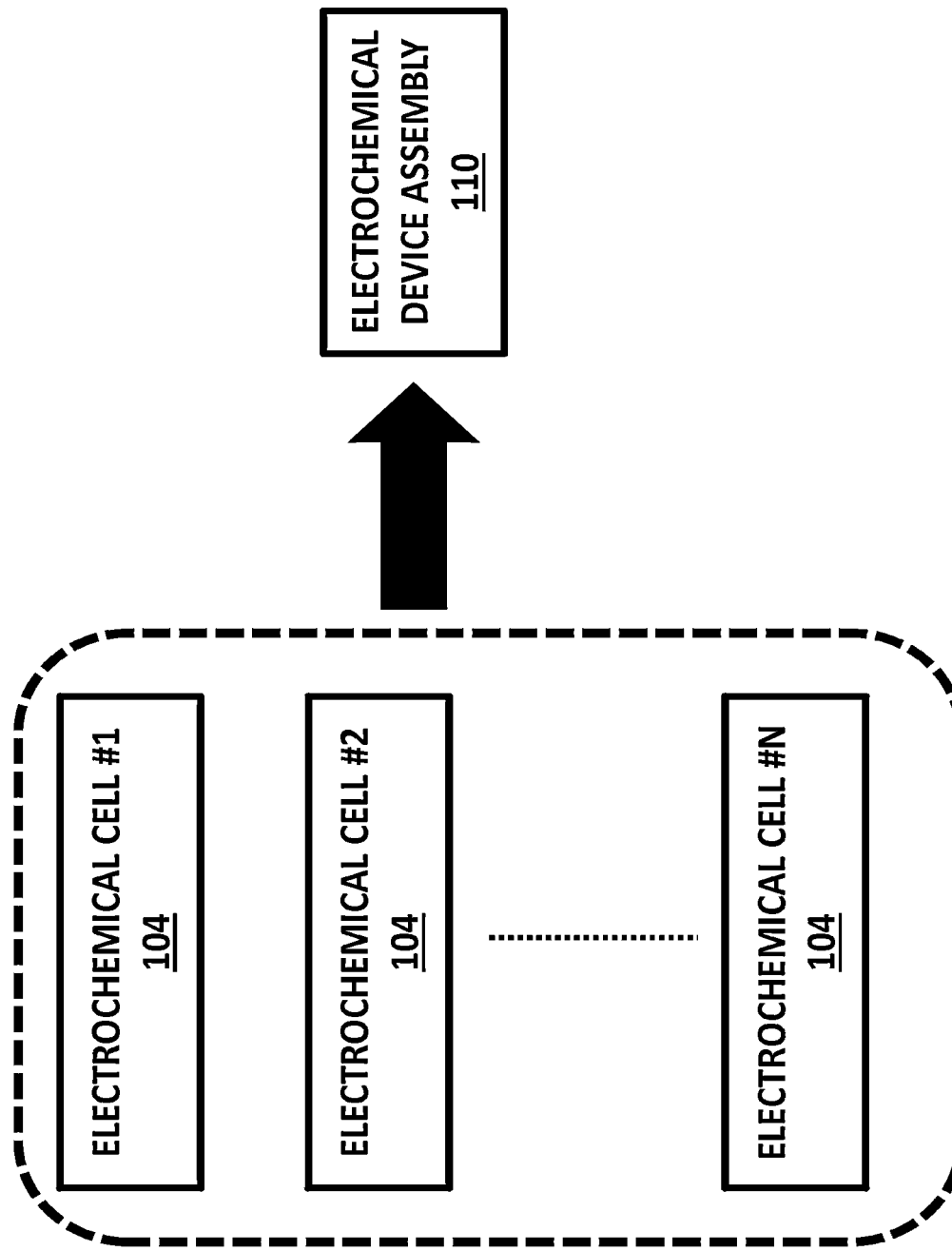
FIG. 32 illustrates packaging multiple electrochemical cells into a single device assembly, in accordance with some embodiments.

In energy storage devices such as batteries or supercapacitors, it is sometimes desirable to obtain higher voltage and/or higher current by connecting multiple individual cells in series or in parallel to form a packaged assembly. The compressed gas electrolyte-based energy storage devices can also be assembled into more powerful systems. FIG. 32 illustrates packaging multiple electrochemical cells into a single device assembly, in accordance with some embodiments. As can be seen in FIG. 32, multiple electrochemical cells 104, each of which can be constructed using either the process described in FIG. 20 or the process of FIG. 21, are packaged into electrochemical device assembly 110. The assembly 110 may be composed of batteries, electrochemical capacitors, or a combination of batteries and electrochemical capacitors, that are electrically coupled in series or in parallel.

Figure 33:
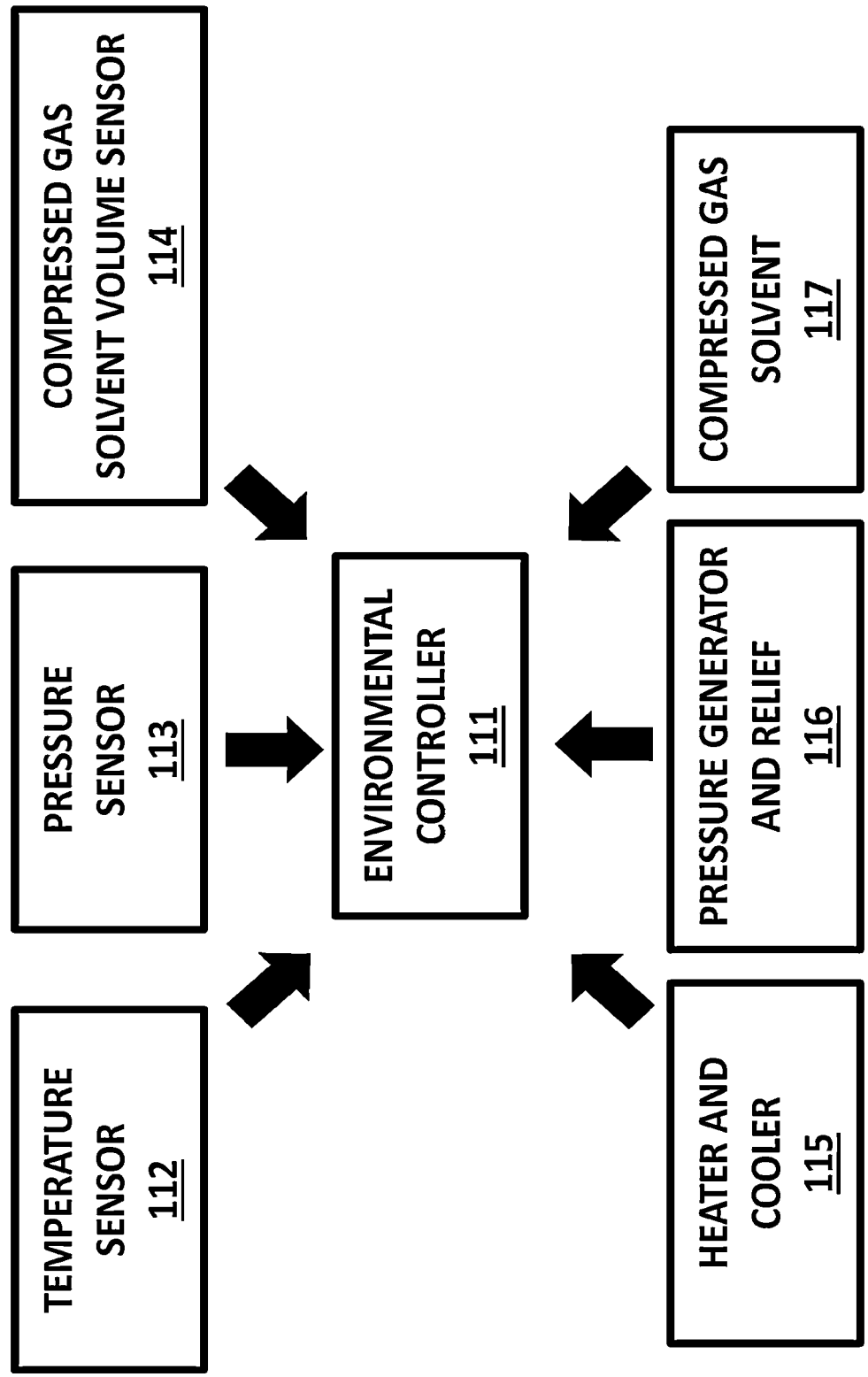
FIG. 33 illustrates an electrical controller composed of multiple environmental sensors and devises, in accordance with some embodiments.

FIG. 33 illustrates an electrical controller 111 composed of multiple environmental sensors and devices, in accordance with some embodiments. As can be seen in FIG. 33, the electrical controller 111 includes multiple sensors, including a temperature sensor 112, a pressure sensor 113, and a compressed-gas solvent volume sensor 114. Electrical controller 111 also includes additional modules, including heater and cooler 115 for temperature control, pressure generator and relief 116 for pressure control, and compressed-gas solvent module 117 for the solvent fill level control within an electrochemical cell assembly. Such an electrical controller 111 can be used to control environmental conditions of the electrochemical cell to prolong the cell life or to produce better device performance such as improving power, energy or temperature capabilities.

Figure 34:
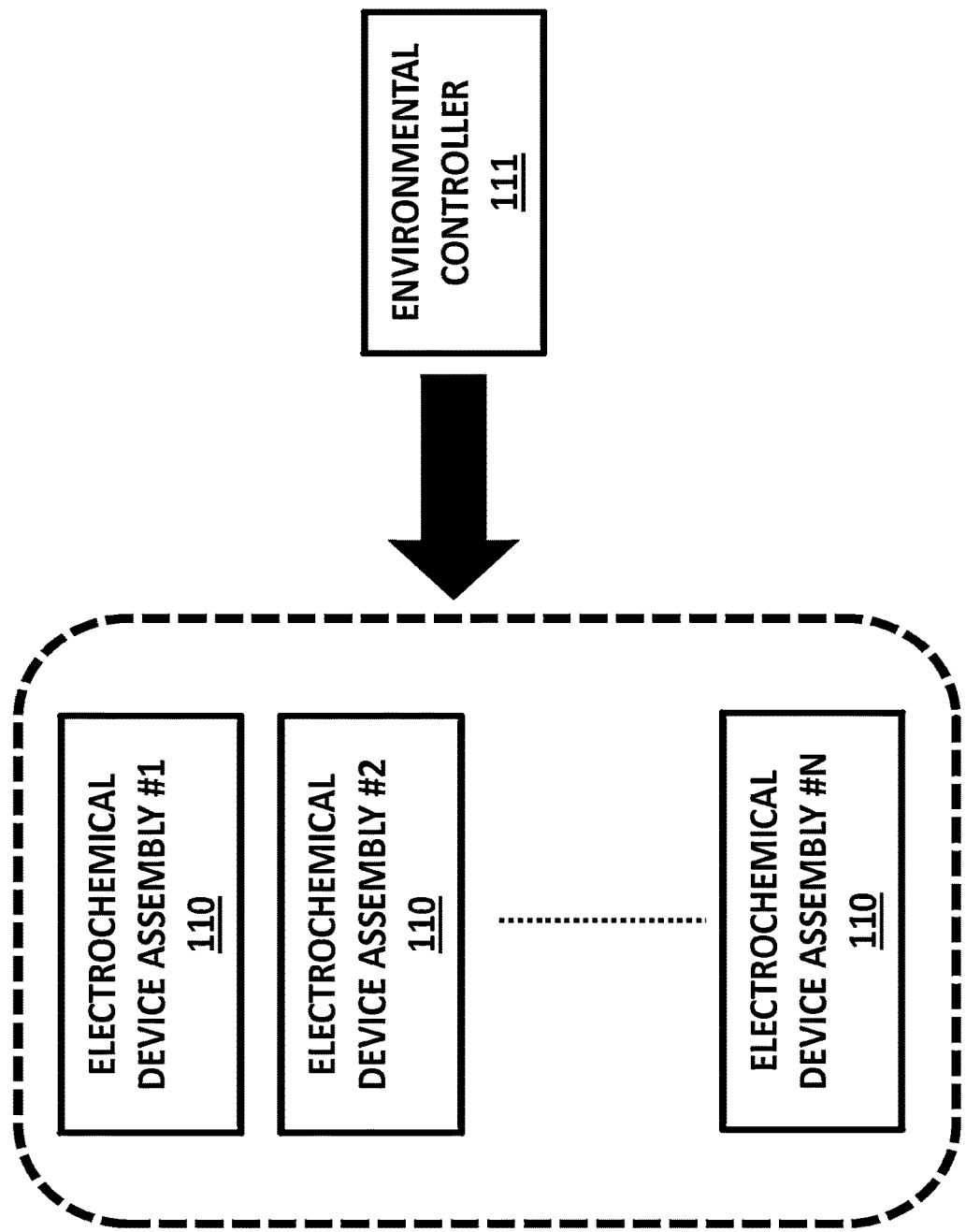
FIG. 34 shows using an environmental controller to monitor multiple electrochemical device assemblies, in accordance with some embodiments.

FIG. 34 shows using an environmental controller 111 to monitor multiple electrochemical device assemblies 110, in accordance with some embodiments. As can be seen in FIG. 34, an electrical controller 111, such as the one described in FIG. 33, monitors one or more electrochemical device assemblies 110, each of which is composed of one or more individual electrochemical cells 104 (referring to FIG. 32). It can be beneficial to use a single electrical controller 111 to monitor and to control multiple cell assemblies 110 to lower cost, reduce overall size, and increase energy efficiency of the fully packaged and assembled device.

Figure 35:
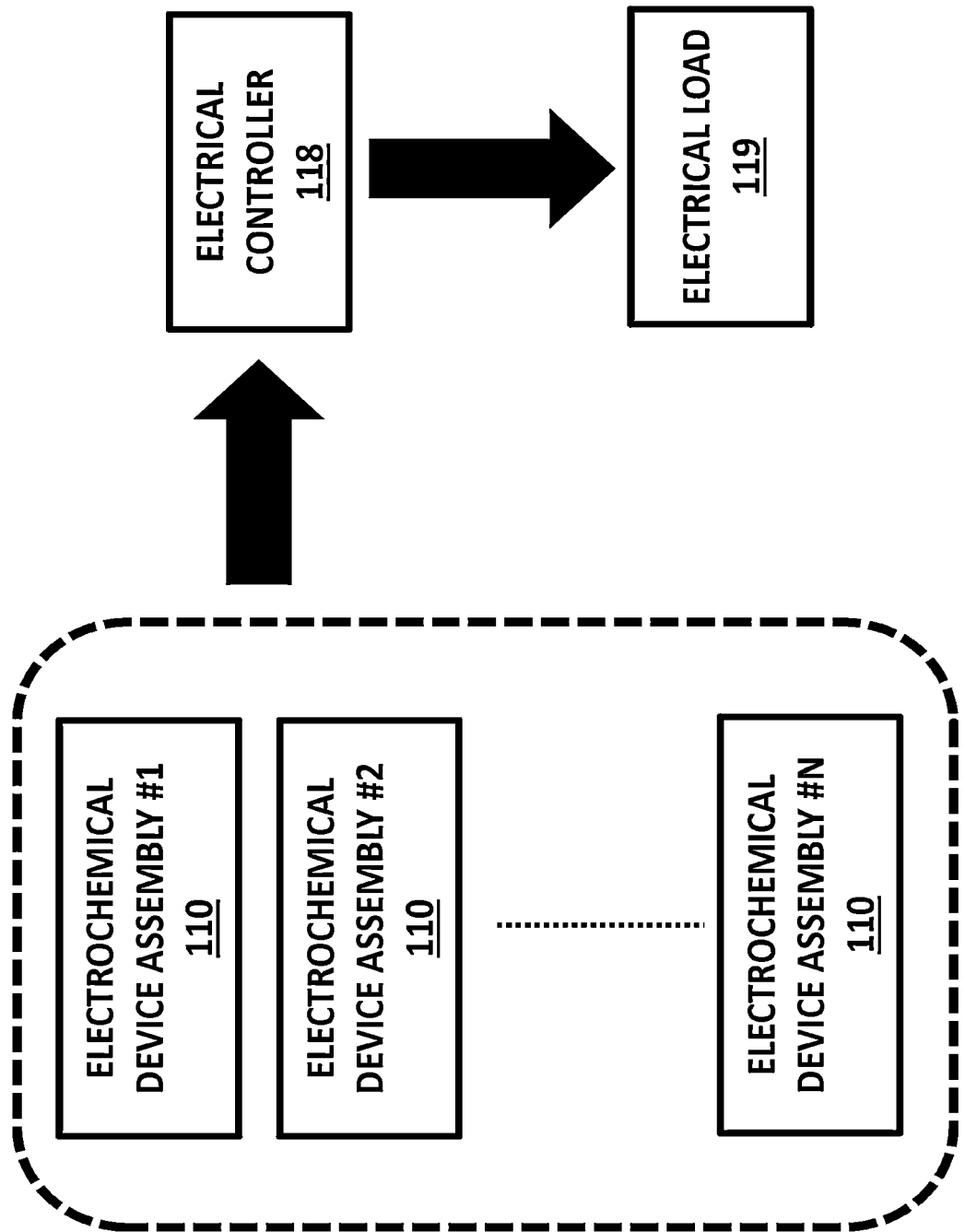
FIG. 35 shows that multiple electrochemical device assemblies can be used to power an electrical load under the control of an electrical controller, in accordance with some embodiments.

FIG. 35 shows that multiple electrochemical device assemblies 110 can be used to power an electrical load 119 under the control of an electrical controller 118, in accordance with some embodiments. In some embodiments, multiple electrochemical device assemblies 110 can be controlled by electrical controller 118 to discharge current or energy into an electrical load 119. The electrical load 119 may be used to produce work to drive an electrical motor on a vehicle, or to power any other application that requires dissipated electrical energy.

Because of the unique features of the described high-pressure compressed-gas electrolytes, such as the high-pressure characteristic, it may be possible that the electrolyte can penetrate electrode nanopores that are otherwise inaccessible to conventional liquid solvent-based electrolytes. This high pressure may overcome the capillary pressure within the pores to allow the high surface areas within nanopores to become more accessible.

Figure 36:
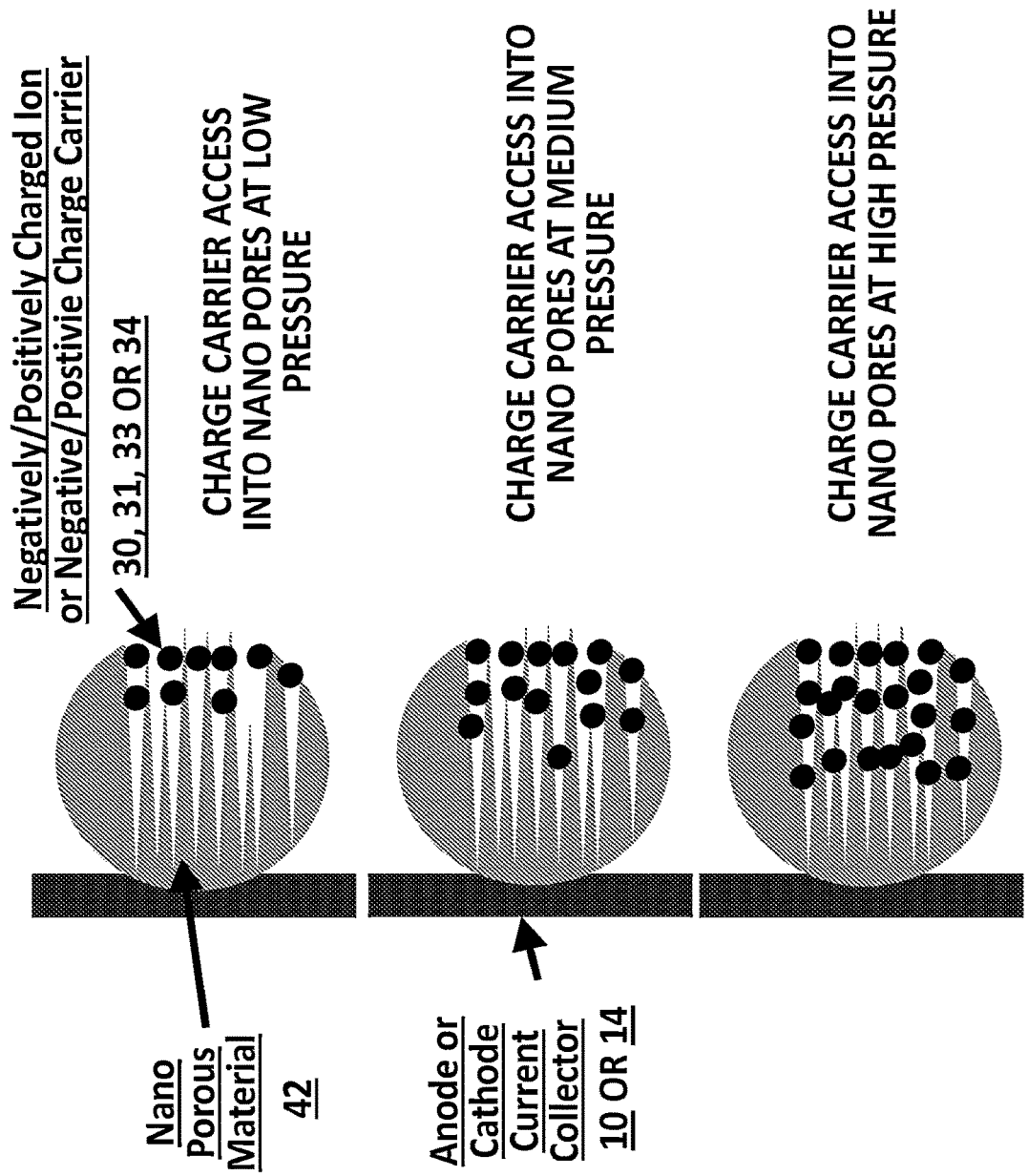
FIG. 36 illustrates how charged carriers or ions in the high-pressure electrolyte can gain access to smaller nanopores of a high surface area charged electrode surface by means of a higher-pressure system, in accordance with some embodiments.

FIG. 36 illustrates how charged carriers or ions in the high-pressure electrolyte can gain access to smaller nanopores of a high surface area charged electrode surface by means of a higher-pressure system, in accordance with some embodiments. As can be seen in FIG. 36, different types of charged particles, including negatively/positively-charged carriers and negatively/positively-charged ions, can penetrate into the nanopores in nanoporous material 42 on the surface of anode- or cathode-current collector 10 or 14. This penetrating nature is especially beneficial in electrochemical capacitor applications, where liquid solvent-based electrolytes may not access nanopores in the high-surface-area electrode, lowering the potential capacitance of the device. With the increased pressure of the compressed-gas electrolytes, higher capacitance may be realized with this increased pressure. Furthermore, an external pressure generator device 116, as shown in FIG. 33, may be used to control the pressure, thereby controlling a degree of access into the nano-pores to achieve desired device performance. In some embodiments, proposed electrochemical devices can use the supercritical properties of the compressed-gas electrolyte. More specifically, at high-enough pressures and temperatures, the electrolyte can become supercritical, which can increase wettability to high surface areas with nano-pores, and can have other beneficial properties, such as higher ionic conductivity.

As discussed above, the performance of electrochemical devices such as supercapacitors and Li-ion batteries are dependent on total surface area of the electrodes, and hence it is highly desirable to incorporate nanostructured anodes and cathodes, wherein nanostructures can include nanofibers, nanopillars, nanoparticle aggregates, nanoporous structures, or combinations of the above. Within such nanostructured anodes and cathodes, a feature dimension of diameter or pore can be less than 500 nm, preferably less than 50 nm, even more preferably less than 5 nm. In some embodiments, the preferable dimension is about 1 nm. The desired electrode structures have a large surface area, with the surface area being at least 100 $m^2/g$, preferably at least 500 $m^2/g$, even more preferably at least 2,000 $m^2/g$.

Hence, the proposed electrochemical devices, such as supercapacitors and Li-ion batteries, enable nanopore penetration by means of high-pressure, compressed-gas solvent electrolytes, thereby producing improved devices having well-penetrated electrolyte. In some embodiments, this high pressure is greater than the atmospheric pressure of 100 kPa, preferably 10× the atmospheric pressure, or more preferably 20× the atmospheric pressure. This feature results in supercapacitors or batteries to have at least 10% enhanced energy storage capacity, and may reach at least 30% enhanced energy storage capacity as compared to an electrochemical device having substantially identical nanostructured electrodes, but with liquid-state electrolytes instead of high-pressure compressed-gas electrolytes. Furthermore, the proposed electrochemical devices can include a pressure controller to control the pressure of the compressed-gas solvent electrolytes to achieve an optimal nanopore penetration. Moreover, the compressed-gas solvent can be selected to have a high vapor pressure to facilitate higher ion access to the nanopores by at least 10% more, preferably 30% more, and even more preferably 50% more.

Solid Electrolyte Interfaces (SEI) Layers and Electrode Surface Protection

In Li-ion batteries, solid electrolyte interfaces (SEI) layers often form on the surface of the battery electrodes, primarily due to certain side-chemical reactions caused by reduction or oxidation of solvents at the surface of anodes and cathodes. Such SEI layers are not necessarily bad, as they may also serve as a protective layer. The SEI layers can vary depending on the type of electrolyte and the nature of the electrode material. Sometimes, a composite inorganic-organic SEI layer can form to serve as a protective coating layer on the electrode. An adjustable or self-healing SEI layer during charging-discharging, which also accommodates the associated electrode-volume change, can be highly desirable. An important benefit of having such an SEI is to prevent electrolyte decomposition by means of electrically insulating the electrolyte from the electrode surface, while allowing good ionic conduction. In some embodiments, an SEI layer may be artificially introduced for its beneficial properties.

In some embodiments, using a metallic anode, such as lithium, sodium, or magnesium anodes, allows for a significantly higher energy density. For instance, moving from a carbon-based anode (360 mAh/g) to a lithium metal anode (3,860 mAh/g) can lead to a large increase in energy density. However, problems with dendrite formation often prevent the use of such metallic anodes. On repeated cycling, metallic dendrites may form that can punch through the electrically insulating separator and electrolyte, and can thus cause a short circuit between the anode and cathode. There have been many attempts to mitigate formation of such dendrites. It has been shown that adding lithium halides, such as lithium fluoride, to the surface of the lithium anode may prevent dendrite formation and may stabilize lithium metal-cycling behavior. Furthermore, adding compressive pressure or a polymer surface layer to the lithium-metallic anode can prevent dendrite growth. In some embodiments, the undesirable dendrite formation in the high-pressure compressed-gas solvent-based Li-ion battery is reduced by a factor of 2 in terms of the average dendrite growth length, preferably by a factor of 5, even more preferably by a factor of 10 as compared to the regular Li-ion battery in which the solvent pressure is not high.

As is well-known, there is a spontaneous chemical reaction between lithium metal and the solvent and salts comprising conventional electrolytes due to the high reduction potential of the lithium metal. This reaction often forms many lithium-containing compounds, including lithium fluoride and polymers. These compounds make up a portion of the SEI layer on the lithium metal surface. Similarly, lithium metal submersion into a compressed-gas solvent or compressed-gas electrolyte can have this same SEI layer-formation effect. What is unique in the case of some fluorinated compressed-gas solvents is the strong formation of lithium fluoride or fluorocarbon polymers. More specifically, because there is no oxygen in these systems, aside from common contamination, the SEI layer is substantially "oxygen-free." An oxygen-free SEI layer may have additional benefits, such as higher ionic conductivity or better prevention of dendrite formation. In some embodiments, dendrite formation is suppressed by 50%, or even to just one third, or even possible to just one tenth comparing to that of a typical SEI layer, thereby prolonging the cyclability of the lithium-metal anode.

Example #3

Figure 38:
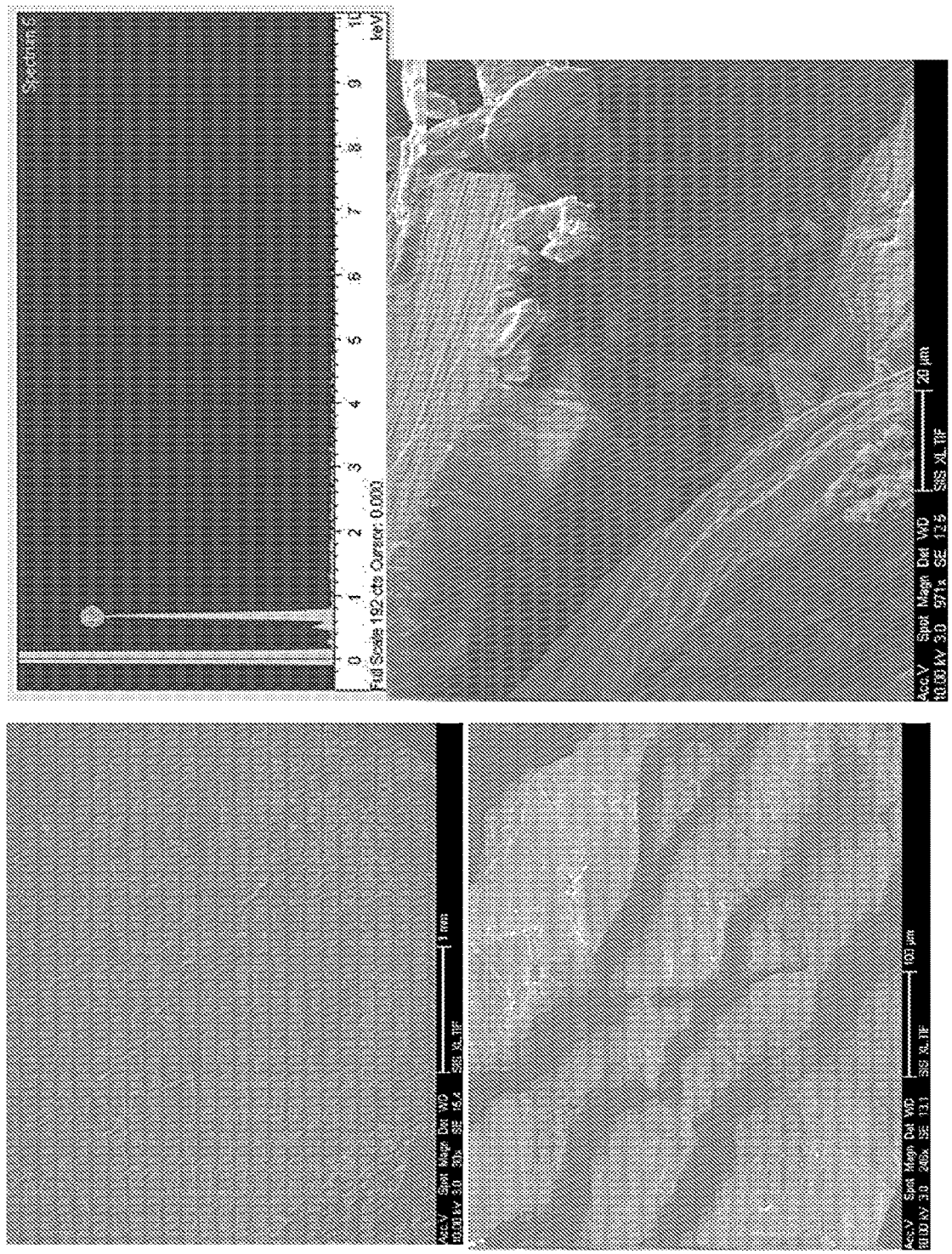
FIG. 38 shows the SEM images and XPS data of the surface of lithium metal after submersion into fluoromethane for five days at room temperature, in accordance with some embodiments.

FIG. 37 shows example reactions and reaction products from different compressed-gas solvents and lithium-metal chemical reactions. These products are only some of the possible products from the possible chemical reactions in accordance with some embodiments. As can be seen in FIG. 37, lithium fluoride is possibly created from reaction with the compressed-gas solvents together with a number of other materials, including strong polymerization. As an example, lithium metal was submerged into compressed-gas solvents for five days at room temperature, and scanning electron microscope (SEM) images were then taken from the metal surface to observe different features. FIG. 38 shows the SEM images and XPS data of surface of lithium metal after submersion into fluoromethane for five days at room temperature in accordance with some embodiments. As can be seen in FIG. 38, the SEM image (the lower right one) shows strong cracking and what appears to be lithium-fluoride formation. Elemental analysis by XPS shows a strong presence of elemental fluoride, indicating that lithium fluoride is a possible reaction product.

Figure 40:
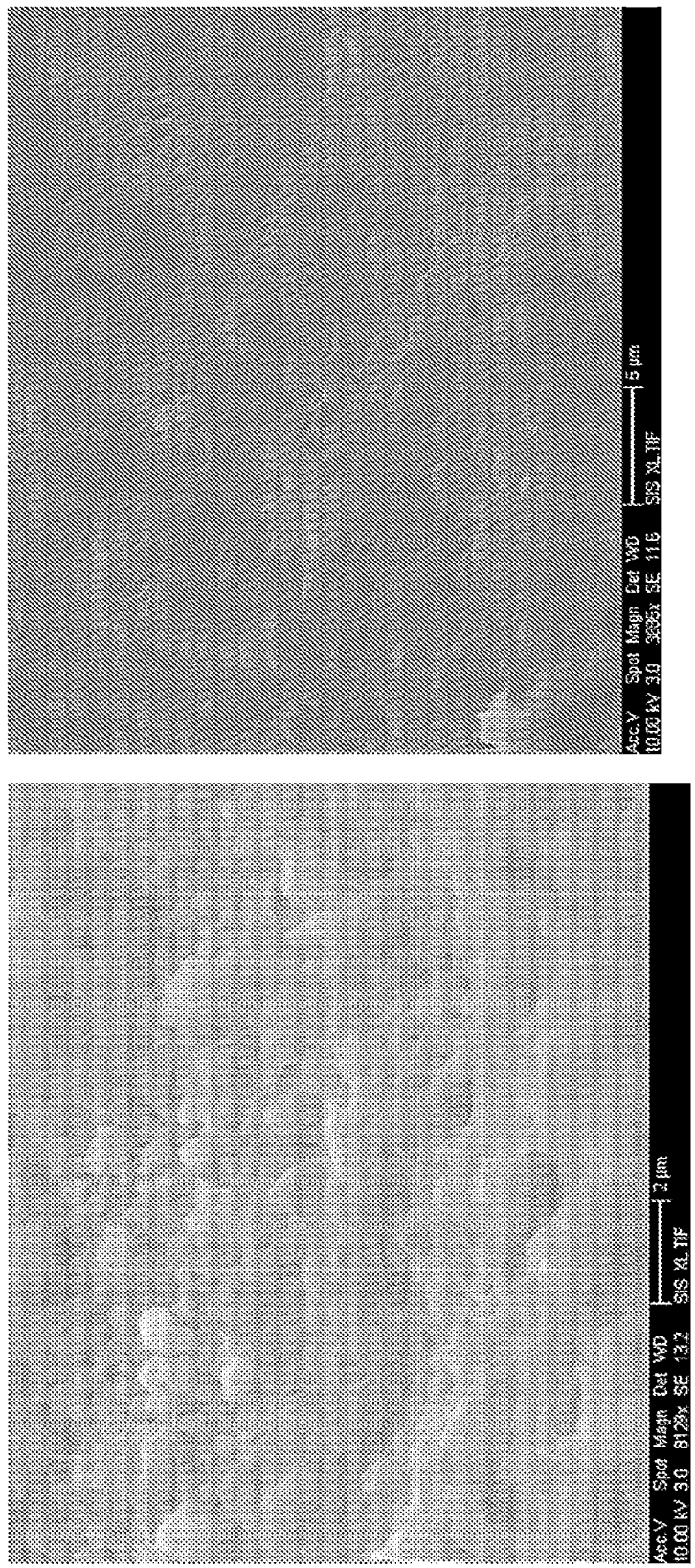
FIG. 40 shows SEM images of the surface of lithium metal after submersion into tetrafluoroethane for five days at room temperature, in accordance with some embodiments.

FIG. 39 shows SEM images of the surface of lithium metal after submersion into difluoromethane for five days at room temperature, in accordance with some embodiments. As can be seen in FIG. 39, the relatively smooth lithium metal surface has what appears to be light polymerization. Moreover, FIG. 40 shows SEM images of the surface of lithium metal after submersion into tetrafluoroethane for five days at room temperature, in accordance with some embodiments. As can be seen in FIG. 40, the relatively rough lithium metal surface has what appears to be strong polymerization. The combination of lithium fluoride and polymerization on the lithium-metal surface can help preventing dendritic formation on lithium-metal anodes, improving cyclability and energy density of current lithium-based batteries.

Furthermore, chemical reaction with the compressed-gas solvent or compressed-gas electrolyte may create a SEI layer of tens of microns substantially thicker than those found in conventional electrolytes of only 1-100 nanometers. For example, FIG. 38 shows a porous layer of approximately 30 microns in thickness of lithium fluoride on the surface of lithium metal that was created by soaking lithium metal in fluoromethane for five days. The porous nature of the layer, shown by many cracks in the layer, could serve as high ionic conduction pathways down to the base lithium metal but also prevents dendrite formation, prolonging the life of a battery using a lithium-metal anode.

Hence, some embodiments of this patent document include pretreating the electrode materials in electrochemical energy-storage devices with a compressed-gas solvent to develop a beneficial SEI layer. This specially-generated SEI layer is useful in energy-storage devices, particularly lithium-ion batteries, because this SEI layer provides an ionically-conducting interface on the electrode such that ions can pass through it but electrons cannot, thereby slowing or eliminating parasitic side reactions, including electrolyte breakdown by oxidation or reduction. Typically, the SEI layer is formed when an external voltage is applied to the device, oxidizing and reducing the electrolytes on the respective electrodes. With strongly-reducing metals such as lithium metal, chemical (or electrochemical) reactions occur more easily, and hence little or no external voltage is required to develop the SEI layer, because submersion of the metal into an electrolyte automatically carries out reduction without an externally-applied voltage. Typically, SEI layers are formed within the already fully-assembled device upon the first charge, and continue to gradually develop with subsequent charge cycles. Some embodiments of this patent document use compressed gas solvent-based electrolytes to develop this SEI formation in the already-assembled device.

Figure 41:
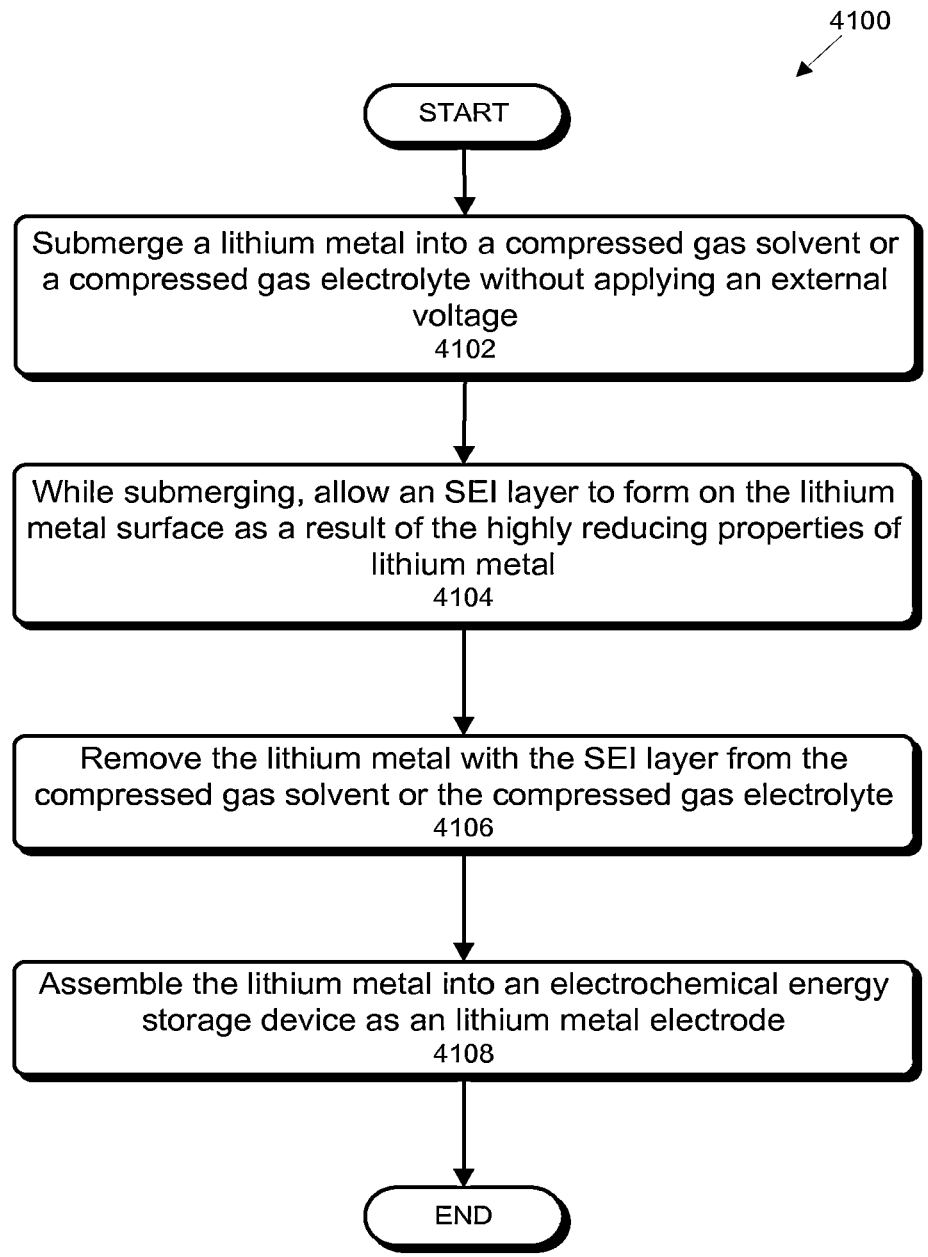
FIG. 41 presents a flowchart illustrating a process of preparing a lithium metal electrode for an electrochemical energy storage device, in accordance with some embodiments.

FIG. 41 presents a flowchart illustrating a process 4100 of preparing a lithium-metal electrode for an electrochemical energy-storage device, in accordance with some embodiments.

The process 4100 includes submerging a lithium metal into a compressed-gas solvent or a compressed-gas electrolyte without applying an external voltage (4102). Next, while submerging, the process allows a SEI layer to form on the lithium-metal surface as a result of the highly-reducing properties of lithium metal (4104). In some embodiments, the SEI layer on the lithium-metal surface is oxygen-free. The lithium metal with the SEI layer is then removed from a compressed-gas solvent or a compressed-gas electrolyte (4106), and subsequently assembled into an electrochemical energy-storage device as a lithium-metal electrode (4108). While lithium metal is the preferred for its very high reduction properties, other metals can be used in place of lithium metal, including magnesium, sodium and other metals with high-reduction properties.

Figure 42:
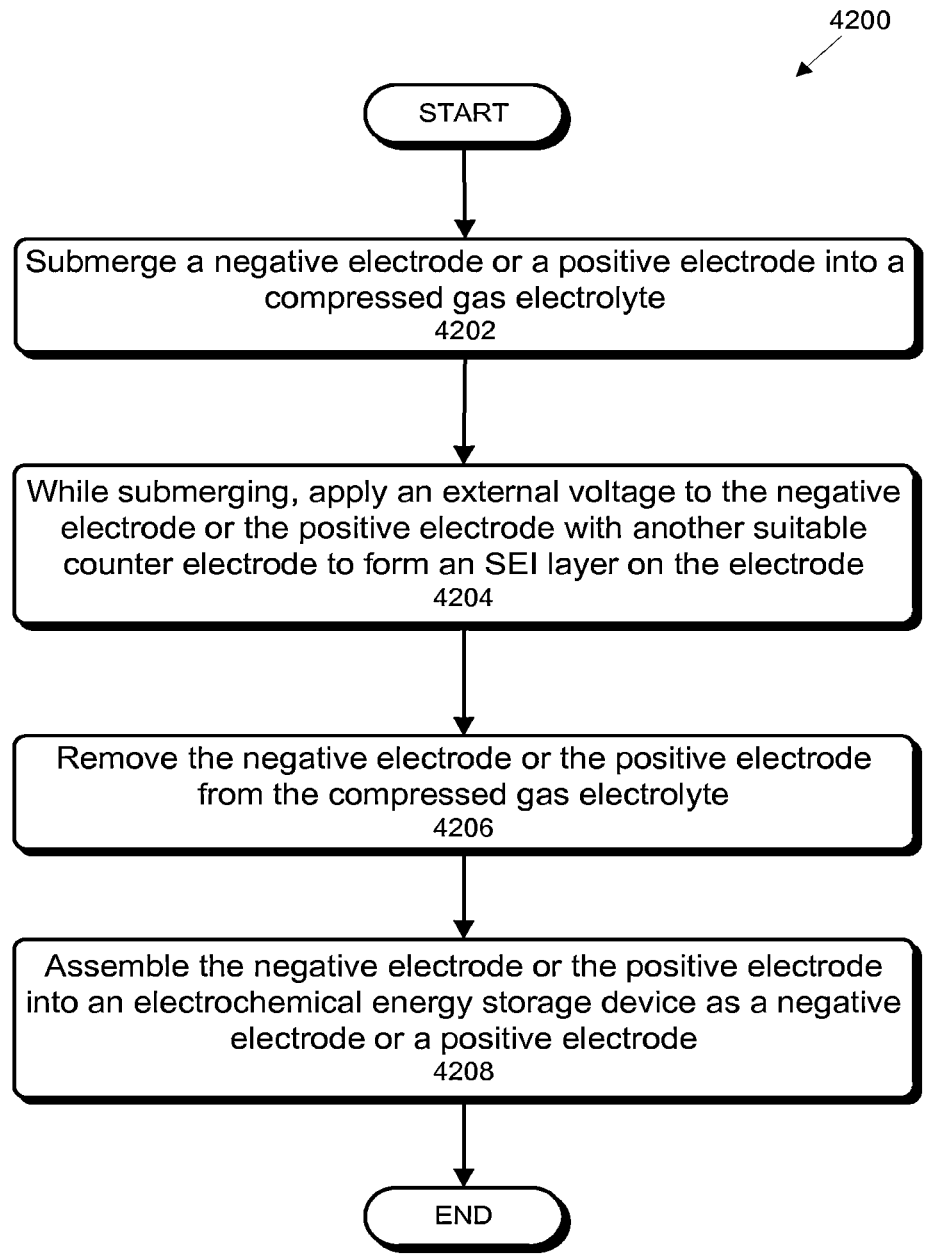
FIG. 42 presents a flowchart illustrating a process of preparing electrodes for an electrochemical energy storage device, in accordance with some embodiments.

FIG. 42 presents a flowchart illustrating a process 4200 of preparing electrodes for an electrochemical energy-storage device, in accordance with some embodiments. The process 4200 includes submerging a negative electrode or a positive electrode into a compressed-gas electrolyte (4202). Next, an external voltage is applied to the negative electrode or the positive electrode, with another suitable counter-electrode to form an SEI layer on the electrode (4204). The negative electrode or the positive electrode is then removed from the compressed-gas electrolyte (4206) and subsequently assembled into an electrochemical energy-storage device as a negative electrode or as a positive electrode (4208).

According to some embodiments of this patent disclosure, the benefit to using a compressed-gas solvent or a compressed-gas electrolyte to build an SEI layer can include beneficiary SEI properties, such as thinner or thicker SEI, improved ion conductivity, improved electrical resistance, improved cycle life, oxygen-free SEI, carbon-free SEI, or other SEI free from certain unwanted elements, or other such beneficial SEI properties.

Compressed-Gas Electrolytes Based on Compressed-Gas Solvent Mixtures

Another aspect of this patent document includes using co-solvents to form compressed-gas electrolytes. Mixtures of two or more compressed-gas solvents or mixtures of a single or multiple compressed-gas solvents with a single or multiple liquid solvents is considered to also be a compressed-gas solvent and can have beneficial properties for an electrochemical device. For example, a single-component compressed-gas solvent may have higher solubility of a salt whereas a second single-component compressed-gas solvent may have improved temperature performance. Further, mixtures may lower or eliminate the flammability of the electrolyte system. The two may be mixed to give optimal properties. Any number of compressed-gas solvents may be mixed to optimize device properties.

Figure 43:
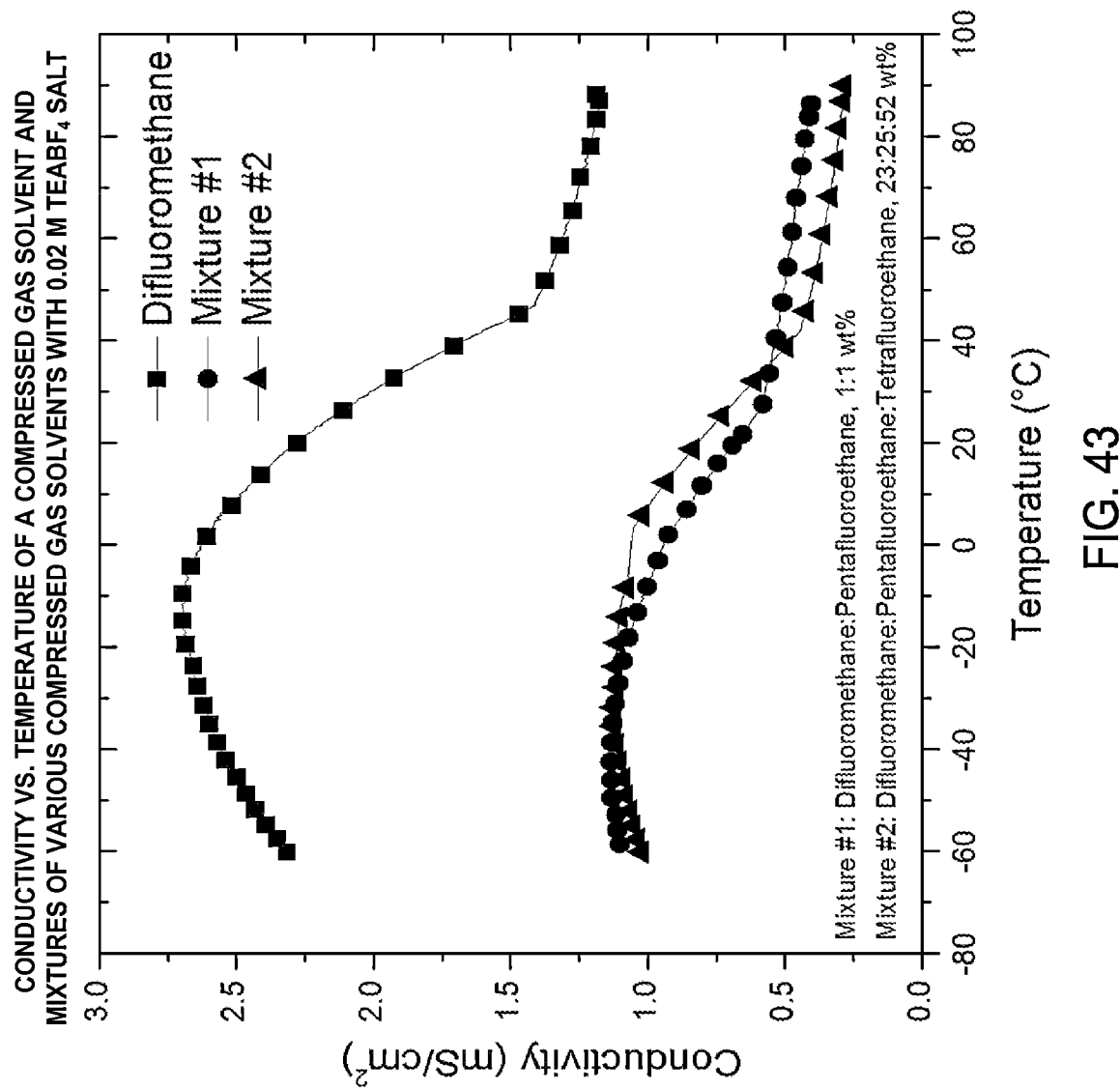
FIG. 43 shows conductivity vs. temperature data of a compressed-gas solvent (without mixing) and two mixtures of various compressed-gas solvents with 0.02 M $TEABF_4$ salt, in accordance with some embodiments.

FIG. 43 shows conductivity vs. temperature data of a compressed-gas solvent (without mixing) and two mixtures of various compressed-gas solvents with 0.02 M $TEABF_4$ salt, in accordance with some embodiments. As can be seen in FIG. 43, the three different compressed-gas electrolytes are (1) difluoromethane, (2) difluoromethane and pentafluoroethane, and (3) difluoromethane, pentafluoromethane and tetrafluoromethane with the latter two at different mixing levels. The two mixtures are shown to still form ionically-conducting electrolytes, though not as highly conducting as the single compressed-gas solvent, may have other beneficial properties such as SEI formation, wider potential window, better thermal properties, or other beneficial properties.

For example, existing battery and supercapacitor technology often uses highly flammable electrolytes. These concerns have only been heightened after batteries in electric vehicles have ignited and caused vehicles to catch fire, even with high safety standards. Various compressed-gas solvents for electrolytes may be rendered non-flammable with mixtures with other compressed-gas solvents. For example, difluoromethane is a flammable solvent; however, mixtures of this with pentafluoroethane, tetrafluoroethane, or a number of other compressed-gas solvents would create a non-flammable and safe mixture. The mixtures may be used as electrolytes with non-flammable properties.

Protective Coating on Electrodes in Compressed Gas Electrolyte-Based Energy Storage Devices The gradual degradation of Li-ion batteries (LIBs) operated at high potential tends to limit the widespread and long-term applications of such batteries. The interface between the solid electrode and the electrolyte interface (i.e., the SEI layer) needs to be improved to ensure desired long-term stability and safety. Stabilization of the electrode surfaces can be accomplished by electrolyte additives and surface coatings with a deposition of metal oxides or phosphates by a chemical process or by conformal atomic layer deposition (ALD) coating. A thin, amorphous and conformal ALD coating of $Al_2O_3$ layer is typically achieved by using trimethylaluminum (TMA) precursor, with a typical growth rate of 0.1 nm per cycle, which is well-established. The ALD coating can be applied onto either the surfaces of particles that make up the electrodes or onto the final electrode surface.

In some embodiments of this disclosure, the electrodes (anode, cathode or both) in compressed gas electrolyte-based batteries and supercapacitors are improved by surface coatings for at least partial protection from corrosion or undesirable side chemical reactions. This can include a thin coating of carbon base material or preferably a thin atomic layer deposition (ALD) coating with aluminum oxide or other metal oxide or metal nitride. In some embodiments, the thickness of the coating is at most 10 nm. In other embodiments, the thickness of the coating is at most 3 nm. In yet other embodiments, the thickness of the coating of at most 1 nm is preferred. Have such a coating can reduce the formation of undesirable soluble byproducts and can minimize the battery life degradation.

Electroplating of Difficult-to-Electroplate Metals and Alloys

Another aspect of this patent document includes using compressed-gas electrolytes for electroplating metals. Electroplating is a metal-deposition process that uses electrical current to reduce dissolved metal cations so that they form a coherent metal coating on an electrode. Electroplating is often used to enhance the surface properties of an object (e.g., for corrosion resistance, wear resistance, improved appearance, and the addition of materials to a surface for various purposes.

In electroplating or electrodeposition, a power supply provides a direct current to the anode, oxidizing the metal atoms in the anode and allowing them to dissolve in the solution. At the cathode, the dissolved metal ions in the electrolyte solution are reduced at the interface between the solution and the cathode, such that they "plate out" onto the cathode. Some electroplating processes may use a non-consumable anode, such as carbon or platinum.

Typically, metals (e.g., Cr, Ni, Cu, Au) are electroplated in aqueous electrolytes because their plating potential is within, or close to, the potential limits of water in acidic or basic conditions. Electroplating of corrosion-resistant or mechanically stronger metals such as Al, Ti and W, as well as semiconductor materials Si, Ge, etc. for facile electronic device manufacturing. However, electrodeposition of these solvents in aqueous electrolytes is limited by the breakdown of water at high potentials. For example, electrodeposition of germanium is difficult because it requires a high cathodic potential, making electroplating from aqueous solutions almost impossible. Some metals, such as aluminum, are not capable of being plated in aqueous conditions, because they extend too far past this limit and or are quickly oxidized due to the aqueous environment. Other metals that have yet to have significant technical progress in electroplating are titanium, tungsten, silicon, gallium and germanium, along with others. The high reduction potential needed for some metals, including titanium, make them incompatible in aqueous plating media and even in many organic solvent media. Some compressed-gas solvents may show lower reduction potentials capable of plating metallic titanium.

Example #4

Figure 44:
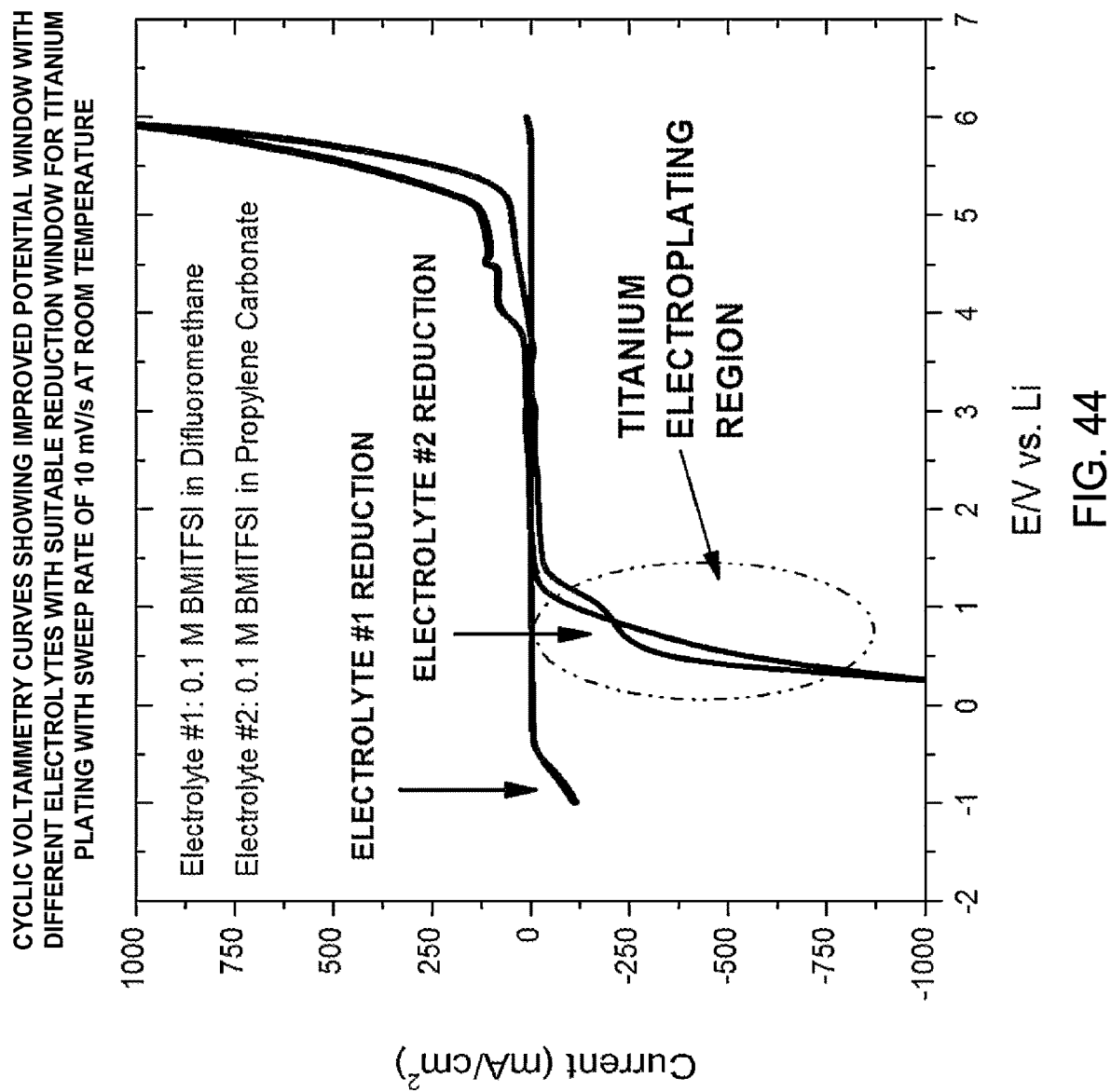
FIG. 44 shows measurements of cyclic voltammetry curves of improved potential windows for two electrolytes composed of 0.1 M 1-Butyl-3-methylimidazolium Bis(trifluoromethylsulfonyl) Imide (BMITFSI) salt in compressed-gas solvent difluoromethane and liquidous propylene carbonate, in accordance with some embodiments.

FIG. 44 shows measurements of cyclic voltammetry curves of improved potential windows for two electrolytes composed of 0.1 M 1-Butyl-3-methylimidazolium Bis(trifluoromethylsulfonyl) Imide (BMITFSI) salt in compressed-gas solvent difluoromethane and liquidous propylene carbonate, in accordance with some embodiments. As can be seen in FIG. 44, the reduction potential of the propylene carbonate-based electrolyte occurs at a much higher reduction potential of 1.5 V vs. Li, whereas difluoromethane-based electrolyte has lower reduction potentials of −0.5 V vs. Li. Because of the higher reduction potential of propylene carbonate, titanium electroplating is incompatible in this media, whereas with the difluoromethane-based electrolyte, electroplating may be made possible.

Note that the high accessibility into nano-sized pores of fluorinated compressed-gas solvents can allow for electrodeposition on nanoscale features otherwise inaccessible to typical electroplating solutions. In some embodiments of the patent disclosure, the nanopore accessibility of the compressed gas solvent-based energy storage or electroplating devices is improved by at least 10%, preferably by at least 30%, even more preferably by at least 100% as compared to the pore accessibility of regular liquid solvent-based electrolytes. Furthermore, the high conductivity of such solutions can allow for fast and efficient electroplating of surfaces.

Figure 45:
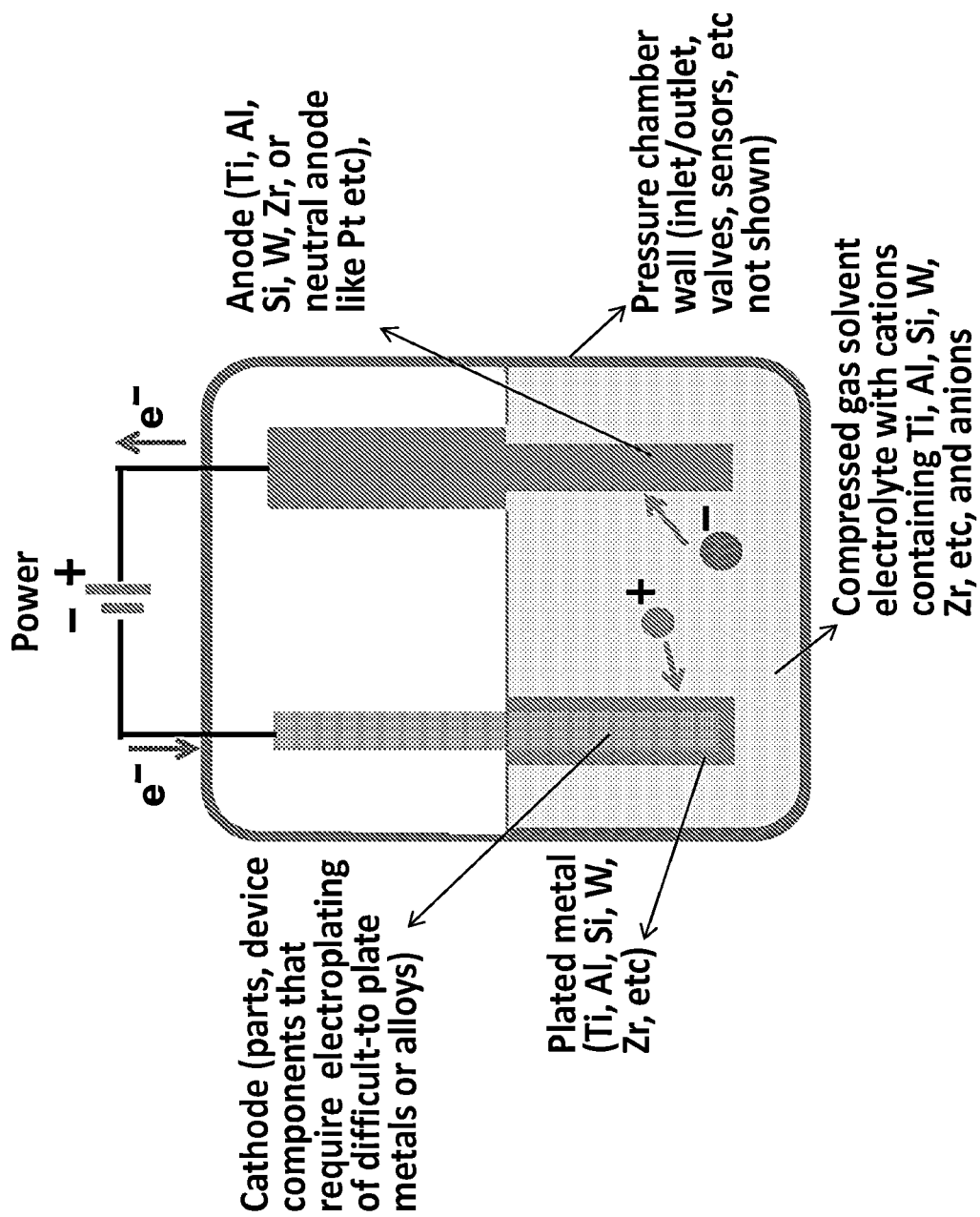
FIG. 45 illustrates an exemplary electroplating device structure for depositing difficult-to-deposit metals or alloys, using compressed gas solvent-based electrolytes with lowered reduction potential, in accordance with some embodiments.

FIG. 45 illustrates an exemplary electroplating device structure for depositing difficult-to-deposit metals or alloys, using compressed gas solvent-based electrolytes having a lowered reduction potential, in accordance with some embodiments. As can be seen in FIG. 45, the hard-to-electroplate elements (Ti, Al, Si, W, Zr, Pt, etc.) can be electroplated inside the compressed-gas electrolyte that can dissolve the metal-containing salt, which enables higher redox potential for the electroplating electrochemical reaction. Note that the electroplating device includes a pressure chamber wall including inlet/output, valves, and sensors to contain the compressed-gas electrolytes. Besides Ti, Si, Ge, Ga or their alloys, other related elements such as Zr, Hf, V, Nb, Ta or their alloys may also be considered capable of electroplating when using proper compressed-gas electrolytes and optimized plating conditions. Embodiments of the disclosed techniques can reduce the reduction potential, by at least 5%, preferably 10%, even more preferably 20% than in the case of electroplating without using compressed-gas solvent for the relevant metallic salts.

Figure 46:
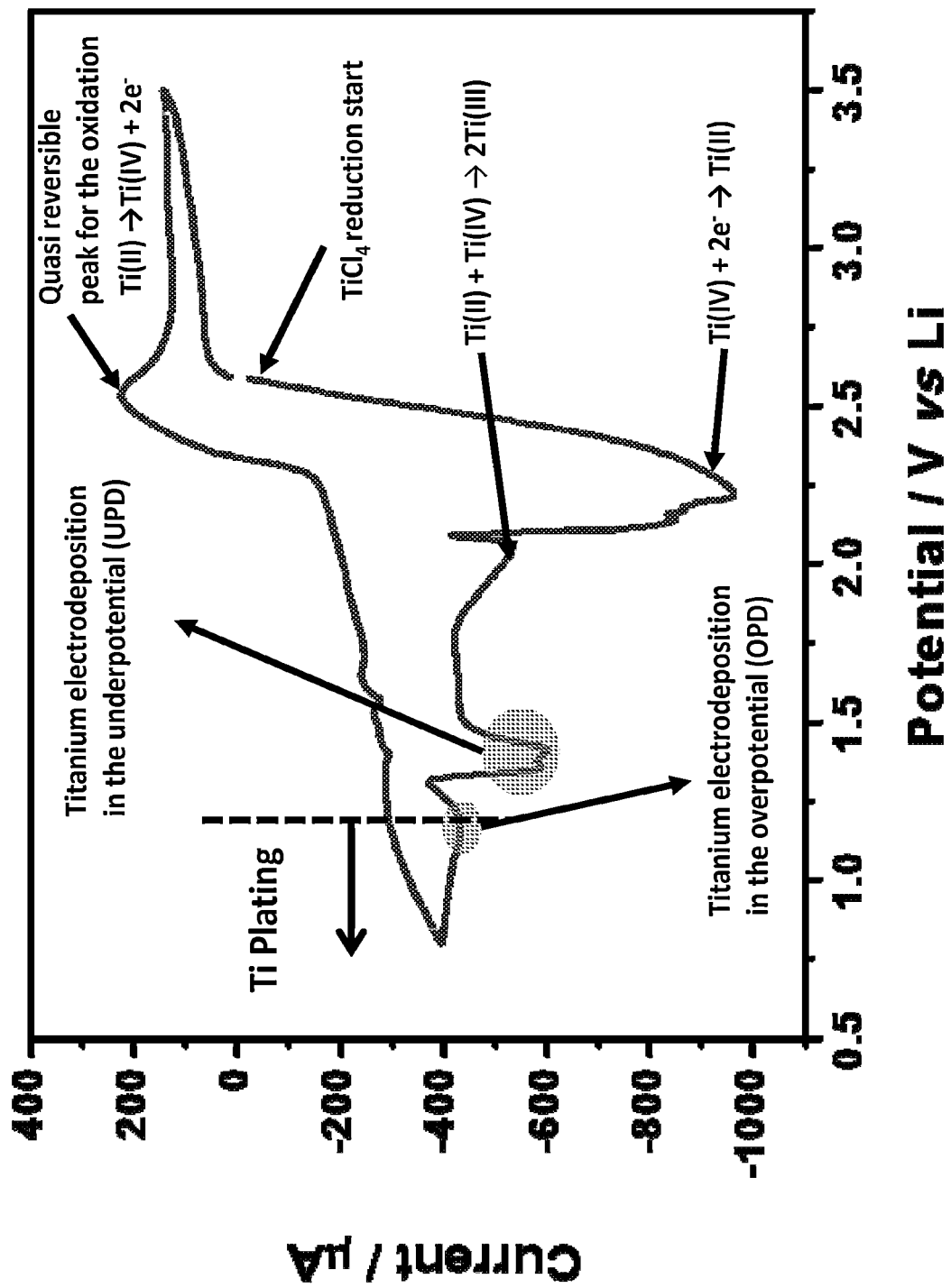
FIG. 46 shows a cyclic voltammogram of the electroplating of titanium by reduction of $TiCl_4$ at a platinum metal surface in a compressed-gas electrolyte composed of electrolyte comprising of 0.1 M BMITFSI, 0.1 M $TiCl_4$ in difluoromethane, in accordance with some embodiments.

For example, FIG. 46 shows a cyclic voltammogram of the electroplating of titanium by reduction of $TiCl_4$ at a platinum-metal surface in a compressed-gas electrolyte composed of electrolyte comprising 0.1 M BMITFSI, 0.1 M $TiCl_4$ in difluoromethane, in accordance with some embodiments. In this example, the working and counter electrodes are platinum metal, and the reference electrode is lithium metal with a 10 mV/s sweep rate. FIG. 46 shows many marked peaks in the cyclic voltammogram, corresponding to reduction of the $TiCl_4$ to the many oxidation states of titanium with metallic titanium plating, shown to occur at potentials lower than 1.2 V vs. Li. Further optimization of the plating can include faster, more uniform or purer titanium-plating processes.

Figure 47:
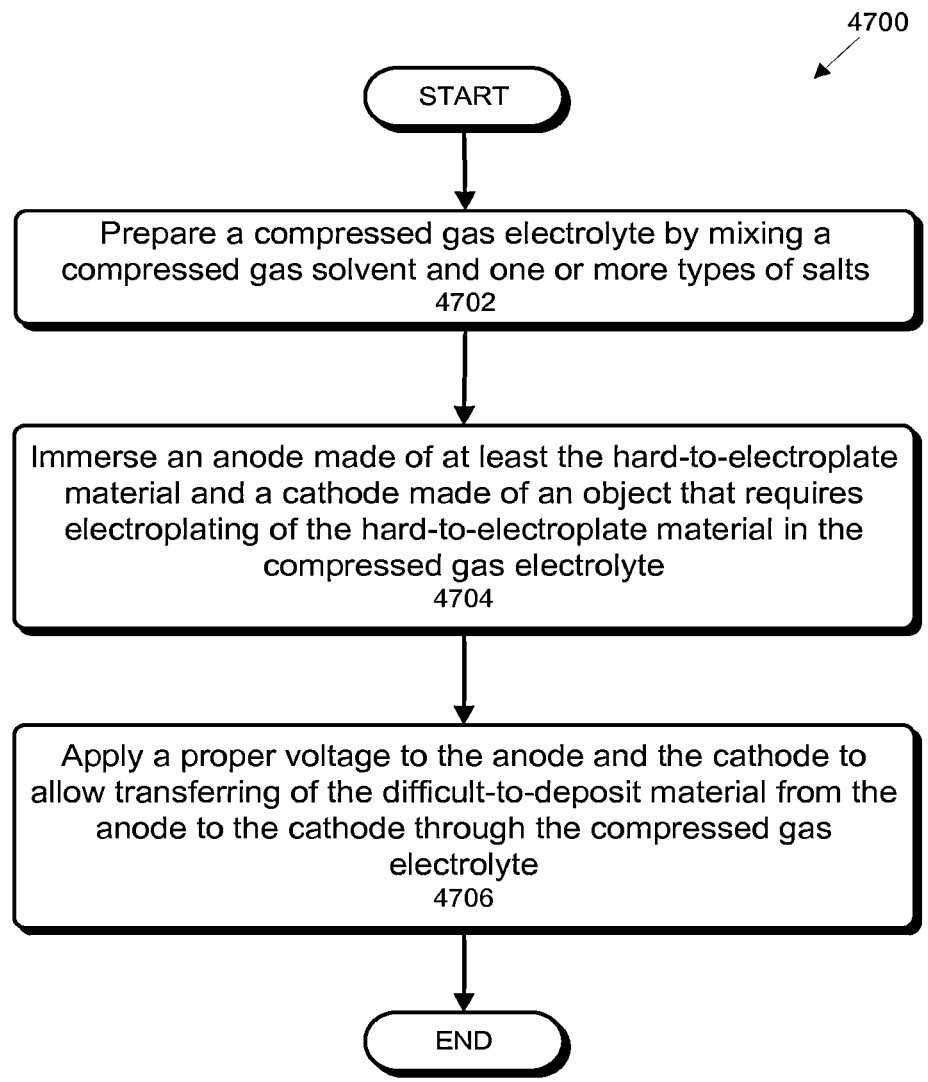
FIG. 47 presents a flowchart illustrating a process of electroplating difficult-to-deposit metals or alloys using compressed-gas electrolytes as an electroplating bath, in accordance with some embodiments.

FIG. 47 presents a flowchart illustrating a process 4700 of electroplating difficult-to-deposit metals or alloys using compressed-gas electrolytes as an electroplating bath in accordance with some embodiments. As shown in FIG. 47, to electroplate a difficult-to-deposit material on an object, a compressed-gas electrolyte is first prepared by mixing a compressed-gas solvent and one or more types of salts (4702), the compressed-gas solvent used has the various properties as described above. Next, using the compressed-gas electrolyte as an electrodepositing bath, an anode made of at least the hard-to-electroplate material is immersed the compressed-gas electrolyte (4704). A cathode made of an object that requires electroplating of the hard-to-electroplate material is also immersed in the compressed-gas electrolyte (4704). Next, a proper voltage is applied to the anode and to the cathode to allow transferring of the difficult-to-deposit material from the anode to the cathode through the compressed-gas electrolyte (4706). Moreover, the compressed-gas electrolyte, the anode and the cathode are placed inside a pressure chamber, which provides the required pressure to keep the compressed-gas solvent in the liquid phase.

Improved EDLC Double Layer Supercapacitor Device Using Compressed Gas Solvents

Figure 48:
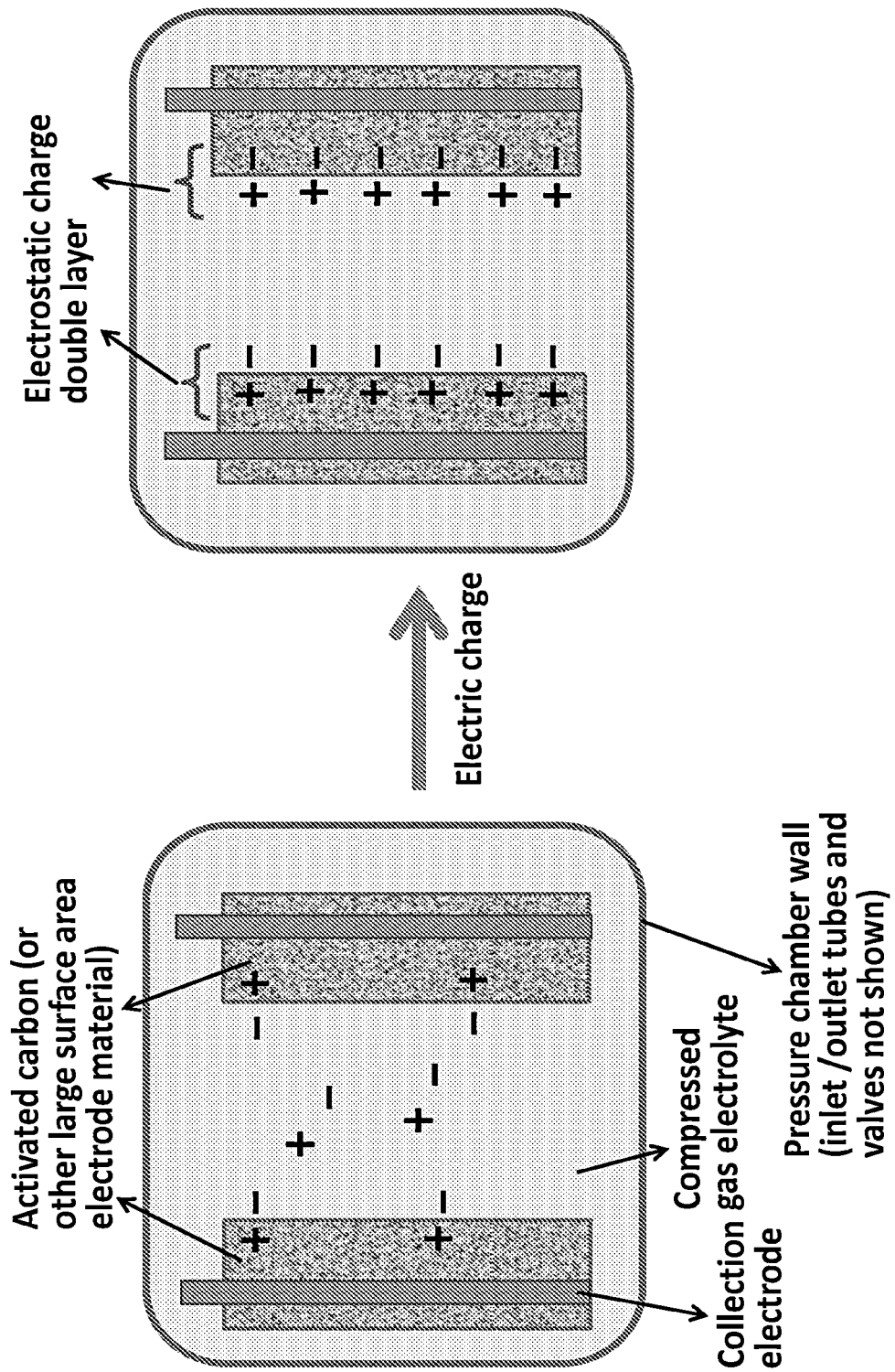
FIG. 48 illustrates an exemplary higher-voltage supercapacitor device (including electrochemical double-layer capacitors) using compressed-gas electrolytes having wider potential windows, in accordance with some embodiments.

In some embodiments of this disclosure, an improved EDLC supercapacitor device can be constructed using compressed-gas electrolytes, and such an EDLC supercapacitor device can exhibit wider redox potential and associated higher energy-storage capability. FIG. 48 illustrates an exemplary higher-voltage supercapacitor device including electrochemical double-layer capacitors and using compressed-gas electrolytes having wider potential windows, in accordance with some embodiments.

Figure 49:
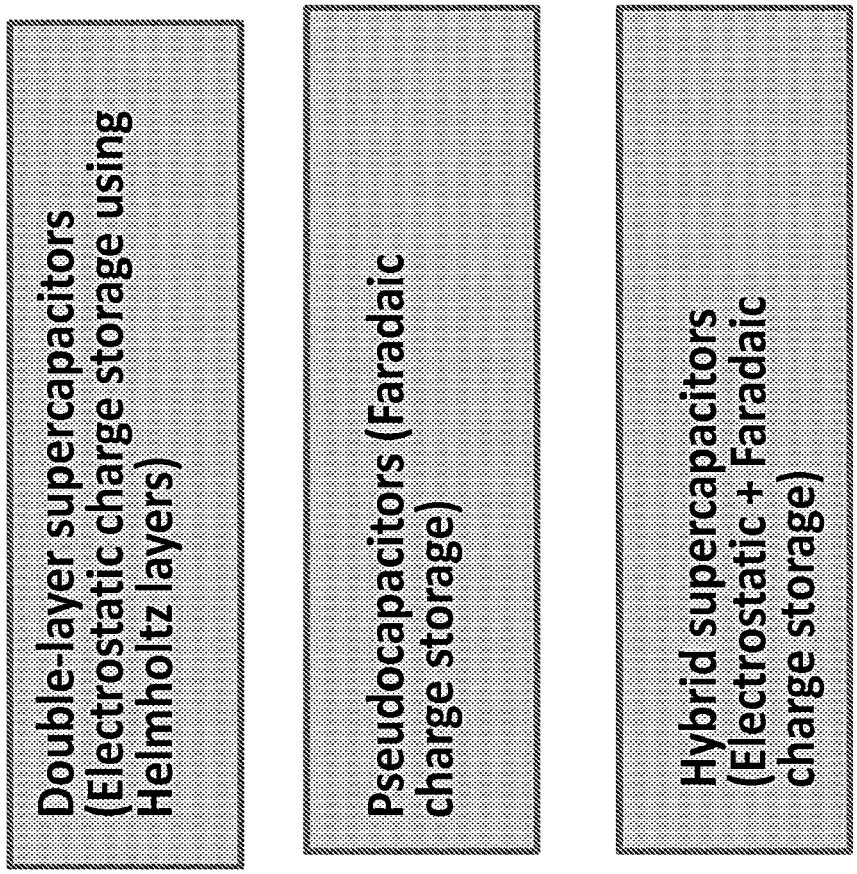
FIG. 49 shows three types of higher-voltage supercapacitor devices using compressed gas solvent-based electrolytes having wider potential windows, in accordance with some embodiments.

FIG. 49 shows three types of higher-voltage supercapacitor devices using compressed gas solvent-based electrolytes having wider potential windows, in accordance with some embodiments. As shown in FIG. 49, these higher-voltage supercapacitor devices include double-layer supercapacitors (i.e., electrostatic charge storage), pseudocapacitors (i.e., faradaic charge storage), and hybrid supercapacitors (i.e., both electrostatic and faradaic charge storage).

Figure 50:
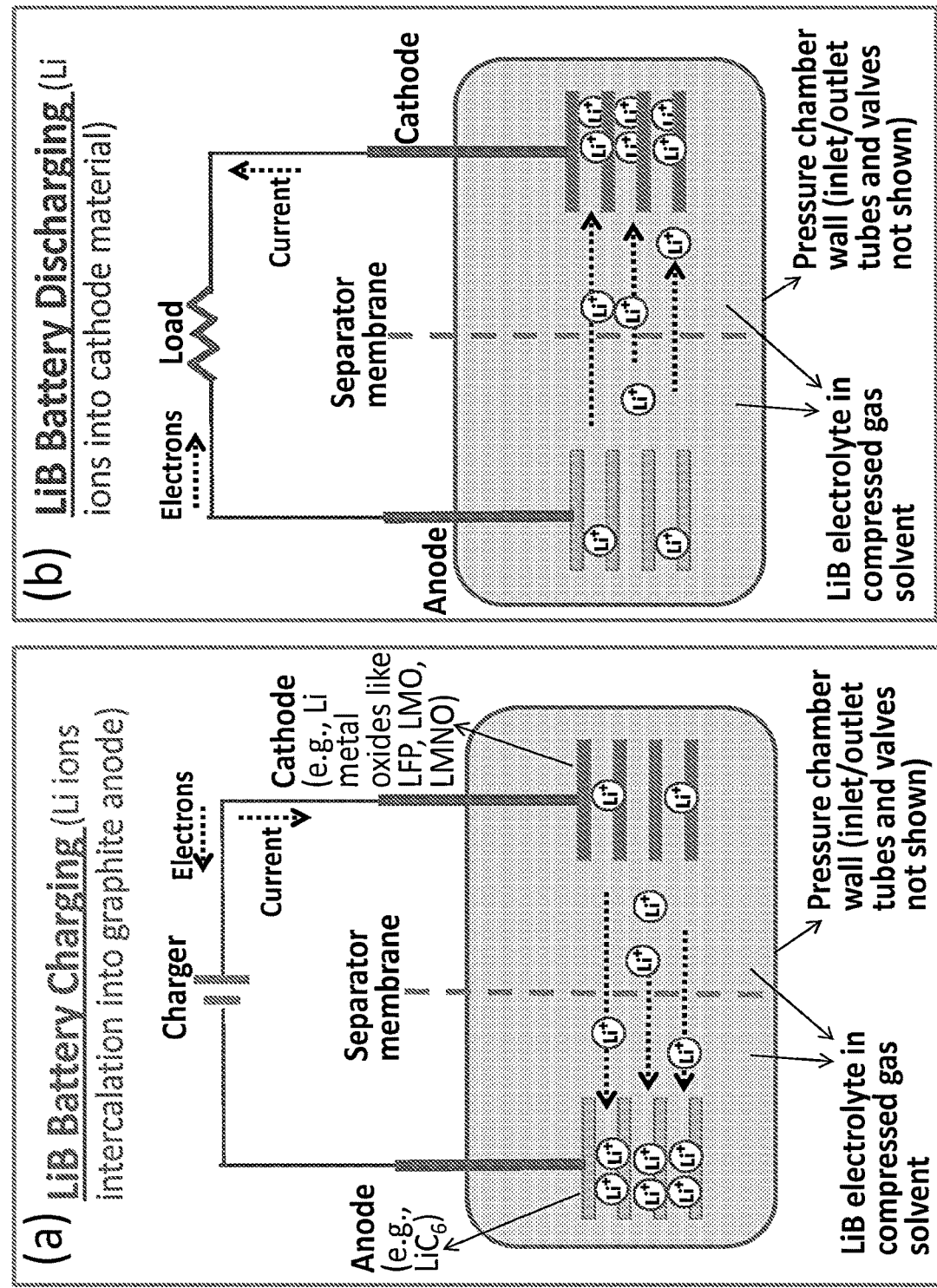
FIG. 50 illustrates a schematic of such an LIB energy storage device incorporated within a pressure chamber structure, with battery charging vs discharging reactions illustrated, in accordance with some embodiments.

Improved Rechargeable Batteries Including Li-ion Batteries Using Compressed-Gas Solvents In some embodiments of this disclosure, an improved Li-ion battery can be constructed, which exhibits wider redox potential and associated higher energy-storage capability. FIG. 50 illustrates a schematic of such a LiB energy-storage device incorporated within a pressure chamber structure, with battery charging vs discharging reactions, in accordance with some embodiments. In the improved Li-ion batteries using compressed gas solvent-based electrolytes, the electrode performances can be further improved in terms of longer-life usage, with optional surface protection by artificial, preferably oxygen-free SEI layer, and optionally comprising a thin inorganic layer, such as an ALD deposited $Al_2O_3$ layer, which have been described above.

In some embodiments, batteries not based on lithium chemistry can also be constructed using compressed-gas electrolytes. Such batteries may be based on hydrogen, sodium or magnesium ion transfer (or their mixtures of ions) between electrodes or another similar battery chemistry that can store energy electrochemically. Consequently, disclosed embodiments include similarly constructed devices, techniques of device fabrication and construction, mode of operation and applications of such non-Li-ion batteries.

In some embodiments, rechargeable batteries either based on lithium chemistry or not based on lithium chemistry can be constructed using compressed-gas electrolytes. In some embodiments, a disclosed rechargeable battery includes an anode selected from carbon-containing materials including: graphite, nanocarbon, carbon nanotubes, graphene, titanium-oxide-containing material such as nanostructured titanium oxides or spinel lithium titanate, silicon and silicon alloys, tin and tin alloys, tin-cobalt alloys. In other embodiments, a disclosed rechargeable battery includes a composite anode that is made of one or more carbon-containing materials, including one or more of the following materials: graphite, nanocarbon, carbon nanotubes, graphene, titanium-oxide-containing material such as nanostructured titanium oxides or spinel lithium titanate, silicon and silicon alloys, tin and tin alloys, tin-cobalt alloys, and/or one or more conversion type materials such as phosphides, nitrides, oxides, and sulfides.

In some embodiments, a disclosed rechargeable battery based on the compressed-gas electrolytes includes an anode that is made of nanostructures selected from nanofibers, nanopillars, nanoparticle aggregates, nanoporous structures, or a combination of the above, and having a feature dimension of diameter or pore desirably less than 500 nm, preferably less than 100 nm, even more preferably less than 60 nm.

In some embodiments, a surface of the anode of the disclosed rechargeable battery is protected from corrosion or undesirable side-chemical reactions by a thin coating of carbon base material or preferably a thin atomic layer deposition (ALD) coating with aluminum oxide or other metal oxide or metal nitride, having a thickness of at most 10 nm, preferably at most 3 nm, even more preferably at most 1 nm, so as to reduce the formation of undesirable soluble byproducts and to minimize the battery-life degradation.

In some embodiments, the anode of the disclosed rechargeable battery has a large surface area at least 500 $m^2/g$, preferably at least 1,000 $m^2/g$, even more preferably at least 2,000 $m^2/g$, with an optional branch or hierarchical structure.

In some embodiments, the anode of the disclosed rechargeable battery includes nanopores, and the compressed-gas electrolyte sufficiently penetrates into the nanopores by means of a high pressure of the compressed-gas solvent to effectuate at least 10% enhanced energy-storage capacity of the rechargeable battery, preferably at least 30% enhanced energy-storage capacity, as compared to an identical nanostructured electrode based-on liquid-state electrolytes instead of the high-pressure compressed gas solvent-based electrolytes.

In some embodiments, the disclosed rechargeable battery includes a cathode made of a cathode material selected from lithium cobalt oxide, lithium nickel manganese cobalt oxide, spinel-type lithium manganese oxide, lithium manganese nickel oxide, Olivine type lithium iron phosphate, lithium iron silicate, lithium iron fluoro sulfate, or selected from a group of conversion type cathode materials.

In some embodiments, the cathode is made of a cathode material selected from conversion type metal fluorides of $FeF_3$, $CrF_3$, $CrF_4$, $VF_3$, $VF_4$, $FeF_2$, $NiF_2$, $CoF_3$, $CuF_2$, $MnF_3$, $TiF_4$, and $BiF_3$ in a bulk form, in a nanostructured form or as nanocrystalline composites embedded in a conductive carbon matrix.

In some embodiments, the cathode is made of a cathode material selected from silicates of $Li_2MSiO_4$ type formula where M is a transition metal such as Fe, Ni, Co, Mn, or selected from sulfates of $LiMSO_4O$ (M=Fe, Ni, Co, Mn), or selected from phosphates of $LiMPO_4O$ (M=Fe, Ni, Co, Mn).

In some embodiments, a disclosed rechargeable battery has an operating battery redox potential window that is at least 4.5V, preferably at least 4.8 volt, even more preferably at least 5.2V.

In some embodiments, a surface of the cathode of the disclosed rechargeable battery is protected from corrosion or undesirable side-chemical reactions by a thin coating of carbon base material or preferably a thin ALD coating with aluminum oxide or other metal oxide or metal nitride, having a thickness of at most 10 nm, preferably at most 3 nm, even more preferably at most 1 nm, so as to reduce the formation of undesirable soluble byproducts and to minimize the battery-life degradation.

In some embodiments, the cathode of the disclosed rechargeable battery has a large surface area at least 500 $m^2/g$, preferably at least 1,000 $m^2/g$, even more preferably at least 2,000 $m^2/g$, with an optional branched or hierarchical structure.

In some embodiments, the disclosed rechargeable battery exhibits higher capacity by at least 50%, preferably by a factor of at least two, as compared to graphite-anode type Li-ion battery which is effectuated by: (1) incorporating an anode made of metallic Li, or an alloy of Li metal containing at least atomic 50% Li, or a incorporating a composite anode containing at least atomic 50% Li; and (2) having the anode metal electrode surface protected by a thin layer coating of $Al_2O_3$ at most 10 nm, preferably at most 3 nm, even more preferentially at most 1 nm, so as to minimize undesirable chemical reaction or corrosion reactions.

In some embodiments, the rechargeable battery exhibits higher capacity by at least 50%, preferably by a factor of at least two, as compared to graphite-anode type Li-ion battery, which is effectuated by the anode that is coated with a protective material having a thickness of at most 20 nm, preferably at most 6 nm, even more preferentially at most 2 nm, that allows passage of Li-ions. This anode is an ionic conductor in nature, with the coating material comprising a polymeric component or a complex oxide component. In some embodiments, the protective material is a solid-electrolyte-interface (SEI) layer that contains no oxygen for enhanced long-term reliability.

Global Warming Potential Aspect

Some of the hydrofluorocarbon and related compounds are known to function like a greenhouse gas and contribute to the global warming, and hence there is an effort to reduce or to eliminate use of such hydrofluorocarbon compounds. Global-warming potential (GWP) is a relative measure of how much heat a greenhouse gas traps in the atmosphere. It compares the amount of heat trapped by a certain mass of the gas in question to the amount of heat trapped by a similar mass of carbon dioxide. GWP is expressed as a factor of carbon dioxide (whose GWP is standardized to 1).

In an aspect of this patent disclosure, compressed-gas solvents having a relatively low GWP value is desirable (see the table entry in FIG. 12). For example, the hydrofluorocarbon molecule of the compressed-gas solvent having preferably two or less fluorine atoms, or preferably having one fluorine atom, is desirable, such as in the case of fluoromethane, fluoroethane, fluoropropane rather than difluoromethane or difluoroethane or difluoropropane (though use of two-fluorine atom compressed-gas solvents is not excluded). For example, Li salt has been shown to conduct well in at least two compressed gas solvents having low GWP, such as fluoromethane (GWP=90) and fluoroethane (GWP is only 12). Fluoropropane solvent (GWP possibly<12) may be another possibility.

High-Pressure Aspects in Compressed-Gas Solvent Devices

The various compressed-gas solvents used in the disclosed compressed gas solvent-based electrolyte devices including supercapacitors, batteries, electroplating systems are inherently non-toxic, safe, and commercially available (therefore relatively inexpensive), and can be made non-flammable, when mixed in well-known azeotropic mixtures of fluorinated compressed-gas solvents. With a compressed-gas solvent, high-pressure containment is an aspect that needs some attention. However, even the most volatile of the compounds in this class of hydrofluorocarbon-type solvents has a room temperature vapor pressure of ~400 psi (~27.2 atmosphere), a moderate pressure at best. It is noteworthy that there are automobiles that run on regular compressed air, for example Tata's cars in India, which operate with pressures of up to ~5,000 psi (~340 atmosphere), that are safely contained in cylinders. In order to provide some safety margin, the compressed gas solvent-based electrolyte devices can be limited to operate at a pressure less than 1,000 atmospheres, preferably less than 200 atmospheres, even more preferably less than 50 atmospheres.

In some aspects of the disclosed technology, disclosed are new electrolytes, and methods for fabricating and implementing devices using such electrolytes, based on compressed-gas solvents. Such devices may have wide electrochemical potentials, high conductivity, low temperature capability or beneficial high-pressure solvent properties. Some exemplary applications include electrochemical energy-storage devices such as batteries or supercapacitors, electroplating and electrochemical sensing.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. An electrochemical device comprising:
an ionically conducting electrolyte comprising a salt;
a liquefied gas solvent comprised of hydrofluoroolefin, the liquified gas solvent having a vapor pressure above 100 kPa at a temperature of 293.15 K;
a housing enclosing the ionically conducting electrolyte under a pressurized condition to maintain the compressed-gas solvent at a pressure higher than 100 kPa at a room temperature of 293.15 K;
an anode, a cathode, and a separator layer in contact with the ionically conducting electrolyte.

2. The device of claim 1, wherein the hydrofluoroolefin is a hydrofluoropropene.

3. The device of claim 2, wherein the hydrofluoropropene is 2,3,3,3-Tetrafluoropropene, 1,3,3,3-Tetrafluoropropene, or combinations thereof.

4. The device of claim 1, wherein the hydrofluoroolefin has a Global Warming Potential (GWP) of less than 100.

5. The device of claim 4, wherein the GWP is less than 200.

6. The device of claim 4, wherein the GWP is less than 20.

7. The device of claim 1, wherein the housing encloses the anode, the cathode and the separator layer.

8. The device of claim 1, wherein the anode is selected from the group consisting of: carbon-containing materials including: graphite, nanocarbon, carbon nanotubes, graphene, titanium-oxide-containing material such as nanostructured titanium oxides or spinel lithium titanate, silicon and silicon alloys, tin and tin alloys, and tin-cobalt alloys.

9. The device of claim 1, wherein the anode is made of nanostructures selected from the group consisting of: nanofibers, nanopillars, nanoparticle aggregates, nanoporous structures, any combination of the above, and wherein the anode has a feature dimension of diameter or pore less than 500 nm.

10. The device of claim 1, wherein the cathode is selected from the group consisting of: lithium cobalt oxide, lithium nickel manganese cobalt oxide, spinel type lithium manganese oxide, lithium manganese nickel oxide, Olivine type lithium iron phosphate, lithium iron silicate, lithium iron fluoro sulfate, and conversion-type cathode materials.

11. The device of claim 1, wherein the housing comprises a venting mechanism that allows for the release of the liquified gas solvent solution and lowering the conductivity of the electrolyte when the device.

12. A method of constructing an electrochemical device, comprising:
providing a housing enclosure and a pair of electrodes;
adding salt to the housing enclosure; and
mixing a liquefied gas solvent with the salt within the housing to form an ionically conducting electrolyte, wherein the liquefied gas solvent is comprised of hydrofluoroolefin and has a vapor pressure above 100 kPa at a temperature of 293.15 K; and
wherein the housing maintains the ionically conducting electrolyte under a pressurized condition to maintain the compressed-gas solvent at a pressure higher than 100 kPa at a room temperature of 293.15 K.

13. The method of claim 12, further comprising placing the liquefied gas solvent under a compressive pressure equal to, or greater than, the compressed gas solvent's vapor pressure at a temperature when the compressive pressure is applied, thereby keeping the liquified gas solvent in a liquid phase.

14. The method of claim 13, further comprising sealing the housing enclosure to prevent the liquified gas solvent from escaping the housing.

* * * * *